United States Patent

[11] 3,618,045

[72] Inventors Donald J. Campbell
Lansdale;
William J. Heffner, Robesonia, both of Pa.
[21] Appl. No. 821,811
[22] Filed May 5, 1969
[45] Patented Nov. 2, 1971
[73] Assignee Honeywell Information Systems, Inc.

[54] MANAGEMENT CONTROL SUBSYSTEM FOR MULTIPROGRAMMED DATA PROCESSING SYSTEM
10 Claims, 54 Drawing Figs.

[52] U.S. Cl. .......... 340/172.5
[51] Int. Cl. .......... G06f 9/06
[50] Field of Search .......... 340/172.5

[56] References Cited

UNITED STATES PATENTS

| | | | |
|---|---|---|---|
| 3,229,260 | 1/1966 | Falkoff | 340/172.5 |
| 3,297,999 | 1/1967 | Shimabukuro | 340/172.5 |
| 3,317,898 | 5/1967 | Hellerman | 340/172.5 |
| 3,337,854 | 8/1967 | Cray et al. | 340/172.5 |
| 3,359,544 | 12/1967 | Macon et al. | 340/172.5 |
| 3,412,382 | 11/1968 | Couleur et al. | 340/172.5 |

*Primary Examiner*—Paul J. Henon
*Assistant Examiner*—R. F. Chapuran
*Attorneys*—Edward W. Hughes, Frank L. Neuhauser, Oscar B. Waddell and Lewis P. Elbinger

ABSTRACT: A multiprogrammed data processing system, wherein working storage space in which user programs are executed is also employed for executing certain portions of the operating system in providing the management control functions required to implement the multiprogrammed function of the data processing system.

INVENTOR.
DONALD J. CAMPBELL
WILLIAM J. HEFFNER
BY
ATTORNEY

WORKING STORAGE TOPOLOGY

EXPANDED
SLAVE SERVICE AREA
(SSA)

WORD STRUCTURE-SSA ENTRIES

DATA PROCESSOR

MANAGEMENT CONTROL SUBSYSTEM FOR MULTIPROGRAMMED DATA PROCESSING SYSTEM

TABLE OF CONTENTS

| | |
|---|---|
| Abstract of Disclosure | cov. |
| Background of the Invention | 1 |
| Summary of the Invention | 4 |
| Brief Description of the Drawing | 5 |
| Description of the Preferred Embodiment | 5 |
| Operating System, General | 7 |
| Classes of Programs | 11 |
| Working Store Topology | 12 |
| Resident Monitor | 13 |
| Slave Service Area | 15 |
| Operation of the Slave Service Area—General | 22 |
| Employment of Single SSA Module | 23 |
| Employment of SSA Module Chain | 25 |
| Data Processor | 30 |
| Operation of Slave Service Area—Detailed | 36 |
| Instruction Functions | 36 |
| Slave Service Area Operation | 42 |
| Fault Processing | 43 |
| Reentering SSA Module | 53 |
| Obtaining SSA Module from Auxiliary Storage | 54 |
| Execution of SSA Module | 57 |
| Return to Slave Program | 65 |

BACKGROUND OF THE INVENTION

This invention relates to multiprogrammed data processing systems and more particularly to a management control subsystem for multiprogrammed data processing systems.

A multiprogrammed data processing system provides simultaneous execution of a number of user programs. In the modern multiprogrammed data processing system each of the one or more data processors thereof alternately executes successive portions of a plurality of user programs. In such system, a data processor assigned to execute a particular user program continues until the program either voluntarily relinquishes control of the data processor or is involuntarily interrupted. A program relinquishes control when it cannot continue until after the occurrence of some future event, such as the receipt of input data or when it terminates. The released processor is immediately assigned to execute another waiting and ready program, either commencing initial execution of a new program, or execution of a program from its last point of relinquishment or interruption. The processor again continues this program in execution until a new point is reached wherein the program relinquishes the processor or the program is interrupted. Meanwhile the voluntarily relinquishing programs stand by, awaiting the occurrences of their respective required events, whereupon they again become candidates for further execution. The interrupted programs, on the other hand, usually are immediate candidates for execution, but must wait assignment of a data processor according to a predetermined rule designed to maintain maximum system efficiency.

A program comprises a series of instructions for directing the assigned data processor to execute in sequence the individual steps necessary to perform a particular data processing operation. The data processor communicates with the working store of the system to retrieve from respective cells thereof each instruction to be executed and data items to be processed and to store therein data items which have been processed. Most of the instructions comprise an order portion denoting the type of operation the data processor must execute and an address portion representing the location of a cell in working storage from which a data item is to be retrieved for processing or into which a processed data item is to be inserted. Moreover, the data processor supplies an address representation to denote the cell from which the next instruction is to be obtained.

Because the retrieval and storage time of working storage must be very short for compatibility with the very rapid rate of instruction execution of the modern data processor, the cost of working storage capacity is relatively great. Therefore, economical reasons limit the size of the fast operating working store and, accordingly, the number of programs and quantity of information it can store at a particular time. In the large modern multiprogrammed data processing systems supplemental storage must be provided for holding all user programs received from input devices and awaiting scheduling for execution, user program "libraries," and data files. This supplemental storage is provided by mass quantities of relatively inexpensive and slow "auxiliary storage." The auxiliary store is coupled for communication with the working store to supply programs and information to working storage as they are required for processing. Additionally, the auxiliary store relieves working storage of processed data, providing temporary storage prior to transmittal of the processed data to an output device.

In order that the data processors can perform efficiently the required sequential and fragmented execution of user programs in a multiprogrammed data processing system, at least a portion of each of the user programs currently in process must be held in the working storage portion of the system. A data processor is thereby enabled instantly to retrieve from working storage and execute the next following instruction of the user program it is currently executing or the first required instruction of the user program that succeeds the relinquishment by or interruption of another user program. Therefore, the following definition provides a functional picture of the nature and operation of a modern multiprogrammed data processing system:

> The operation of a data processor so as to process a set of user programs effectively concurrently by alternating and interleaving their execution, wherein the working store contains simultaneously at least a subset of said set of programs.

To implement multiprogramming, a management control subsystem including a group of management control programs, program parts, and subroutines is required for exercising supervisory control over the data processing system. The group of management control programs, program parts, and subroutines is termed an "operating system." The primary purpose of the operating system is to maintain the user programs in efficient concurrent execution by effective allocation of the limited system resources to the programs, these resources including the data processors, working store, and input and output equipment. The operating system performs the following characteristic functions:

1. Scheduling, dispatching, and coordinating programs, and loading programs, program parts, and subroutines into working storage.
2. Retrieving programs, program parts, subroutines, and information from auxiliary storage when required.
3. Allocating and overlaying working storage.
4. Assigning input/output (I/O) channels and devices to programs.
5. Initiating I/O operations and supervising the termination of these operations.
6. Removing a program from working storage when it terminates or when certain error conditions occur.
7. Maintaining a program library and a user file system.
8. Maintaining a log of system operation and preparing accounting information.

For simplicity, the terms "program" and "program part" will be used interchangeably hereinafter to mean a program, program part or subroutine. The term "module" will be used hereinafter to mean an operating system program part or subroutine.

In the prior art multiprogrammed data processing systems, a portion of working storage is reserved for holding all operating system programs and modules which are in execution. User programs, on the other hand, loaded into and executed from any available region of the nonreserved portion of working storage. A number of operating system programs and modules are permanently resident in one region of the reserved portion of working storage, whereas the remainder of the reserved portion is occupied by a variable number of different operating system programs and modules that are transferred from auxiliary storage to the reserved portion of working storage as they are required. The permanently resident portion of the operating system consists of those programs and modules which are most frequently required and which must be available immediately for maintaining most efficient continued operation of the multiprogrammed system. The permanently resident programs include, for example, the dispatcher, which queues user programs and dispatches them to data processors for execution, and the working storage allocator, which maintains a continuous surveillance of the assigned and available working storage space and allocates available working storage space to programs. The temporarily resident modules include those which perform direct service functions for user programs, functions which the user programs, themselves, are unable or are not permitted to perform. The temporarily resident modules include, for example, a module which obtains for a user program the identity of the I/O apparatus assigned to serve such program, and the program termination subroutine, which provides for the orderly completion of terminating programs.

The amount of working storage space reserved in these prior art multiprogrammed systems is sufficient to hold all of the essential operating system programs and modules that may be required to be in simultaneous execution. If adequate working storage space is not made available for the operating system, the data processing system may be greatly slowed or even may be unable to continue in operation. Accordingly, these prior art management control subsystems reserve permanently a very large portion of the working store for the operating system, in order to accommodate the working storage space requirements for the anticipated worst-case conditions. With such a large portion of working storage reserved for the operating system, only a limited number of user programs can occupy the remaining nonreserved portion of working storage. This adversely affects the overall performance of these prior art data processing systems, because their primary function is to execute user programs, and often there is no user program in working storage ready for execution. In such instance either a data processor must stand idle, awaiting the occurrence of one of the events required for the resumption of a user program, or at least one of the waiting user programs in the working store must be "swapped" with another user program in the auxiliary store. However, considerable nonproductive time is expended in swapping one user program for another, because the I/O system usually must return to auxiliary storage at least part of the user program being replaced and must then load the next user program into the released region of working storage. Therefore, it is a particular disadvantage of these prior art management control subsystems to reserve a large portion of working storage space for the operating system.

Another disadvantage of the aforementioned prior art management control subsystems is that much of the large reserved portion of the working storage is often idle, because most of the time only a few of the operating system programs and modules are required to be is that much execution. This reservation of a large amount of idle working storage space, which is not available for the waiting user programs, is inconsistent with a operating system's primary purpose of effective allocation of system resources to maintain user programs in efficient concurrent execution.

Accordingly, it is desirable to provide means to reduce the amount of working storage space reserved for holding operating system programs and modules so as to free space for user programs, yet to provide sufficient working storage space for all essential operating system programs and modules required to be in simultaneous execution. Moreover, it is desirable to provide means to reduce the amount of idle working storage space not available for user programs.

Therefore, it is the principal object of this invention to provide an improved management control subsystem for a multiprogrammed data processing system.

Another object of this invention is to provide an improved operating system for a multiprogrammed data processing system.

Another object of this invention is to provide a management control subsystem for a multiprogrammed data processing system which affords more effective utilization of working storage.

Another object of this invention is to provide a management control subsystem which minimizes the amount of working storage reserved for the operating system.

Another object of this invention is to provide a management control subsystem which minimizes the amount of idle working storage space not available for user programs.

Another object of this invention is to provide a management control subsystem which minimizes the amount of idle storage space reserved for the operating system.

SUMMARY OF THE INVENTION

The foregoing objects are achieved according to the instant invention by providing, in a multiprogrammed data processing system, a management control subsystem having a subset of programs which can be executed similarly to user programs. According to one embodiment of the instant invention, the programs of this subset allocated working storage space in the same manner as user programs.

Only a few of the most essential programs of the operating system, such as the dispatcher, are maintained as permanent residents of working storage in a fixed reserved portion thereof. Other programs of the operating system, comprising the above-mentioned subset and which are termed privileged slave programs herein, are held permanently in the auxiliary store. Whenever a privileged slave program must be executed it is temporarily allocated, loaded into, and executed from any available region of the nonreserved portion of working storage in the manner of a user program.

However, although privileged slave programs are allocated and loaded in the manner of user programs, the instant invention provides for the data processor executing these privileged slave programs to operate selectively in two modes, whereas a processor executing a user program is confined to but one mode. Thus, a processor executing a user program does not have complete freedom, being prohibited from executing certain instructions in its instruction repertory, and is confined to accessing only the cells of working storage allocated to the particular user program. On the other hand, a processor executing an operating system program may execute any instruction and have access to the entire working store. Processors executing privileged slave programs, therefore, may be controlled to selectively operate in the user program mode, wherein it is confined in instruction capability and working storage access, or in the operating system mode, wherein it is confined in neither manner.

Each privileged slave program has stored therewith in working storage an indicium which designates the associated program as a privileged slave program, whereas user programs are not provided with such indicia. The presence of these indicia enable a processor executing a privileged slave program to selectively operate in either of the aforementioned modes. Thus, these indicia enable processors which execute certain predetermined instructions to transfer from operation in one mode to operation in the other mode. However, execution of such instructions by a user program is ineffective because there is no associated indicium to enable the mode change.

Therefore, the instant invention, by minimizing the number of operating system programs required to operate from a reserved region of working storage, and by providing operating system programs which can be loaded into and executed from the regions of working storage wherein user programs are executed, enables the most efficient operation of the multiprogrammed data processing system.

BRIEF DESCRIPTION OF THE DRAWING

The invention will be described with reference to the accompanying drawing, wherein.

DESCRIPTION OF THE PREFERRED EMBODIMENT

The management control subsystem of the instant invention manages and supervises the efficient multiprogrammed operation of a data processing system. One data processing system suitable for the practice of the instant invention is shown in FIG. 1; however, the instant invention is not limited to the system of FIG. 1, but may be practiced in any one of many different data processing systems, a number of which are available commercially.

The organization and operation of the system of FIG. 1 will be described in detail to the extent necessary to provide an understanding of the operation of the instant invention in managing and supervising multiprogramming in a data processing system. The system of FIG. 1 is the subject of a U.S. Pat. application by F. B. Banan et al., Ser. No. 731,681, for COMMUNICATION APPARATUS IN A COMPUTER SYSTEM, filed May 17, 1968, this application being a continuation of U.S. Pat. application Ser. No. 552,981, filed May 25, 1966. The above-identified applications are assigned to the assignee of the instant application. A more detailed description of the organization and operation of the data processing system of FIG. 1 is to be found in U.S. Pat. application, Ser. No. 731,681.

Figure 1:
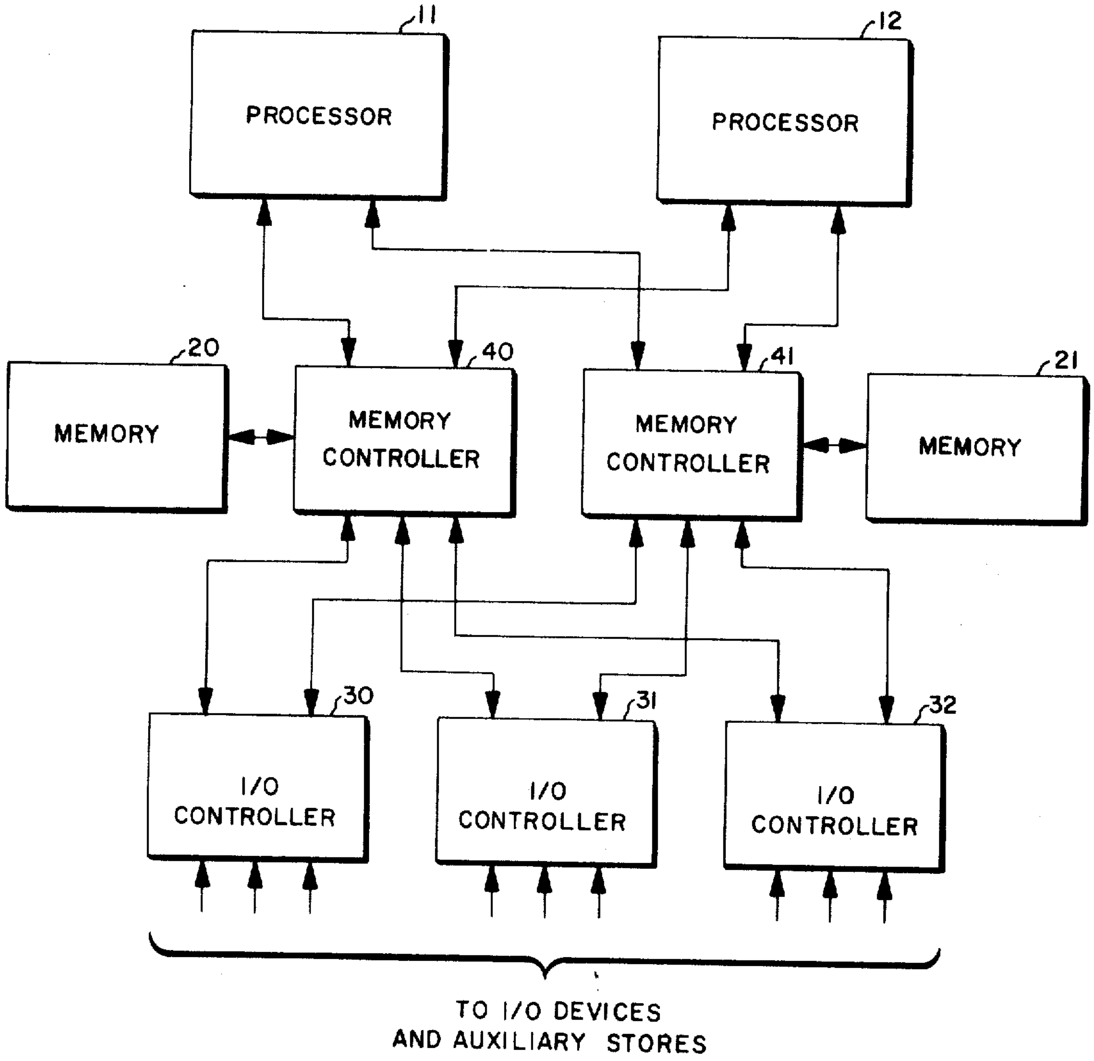
FIG. 1 is a block diagram of a data processing system to which the instant invention is applicable.

The data processing system of FIG. 1 comprises a pair of Data Processors 11 and 12, each of which responds to the succession of instructions comprising a program (i.e., a program, program part, or subroutine) to perform a particular data processing operation on information received thereby. A pair of Memories 20 and 21, such as random-access, magnetic-core memories, store data words representing information which is to be processed, data words representing information which is the result of processing, and data words representing instructions of the programs to be executed by the Data Processors. Each data word in Memories 20 and 21 is stored in a discrete location, termed a "cell." Memories 20 and 21 comprise the "working store" of the Data Processors because they supply individual instructions and data words when required and in the order required by the Data Processors. Thus, each Processor communicates with either one of Memories 20 and 21 to receive data words therefrom. Following execution of certain steps of the data processing operations, each Processor transmits the resulting data words to either one of the Memories for storage.

Figure 2:
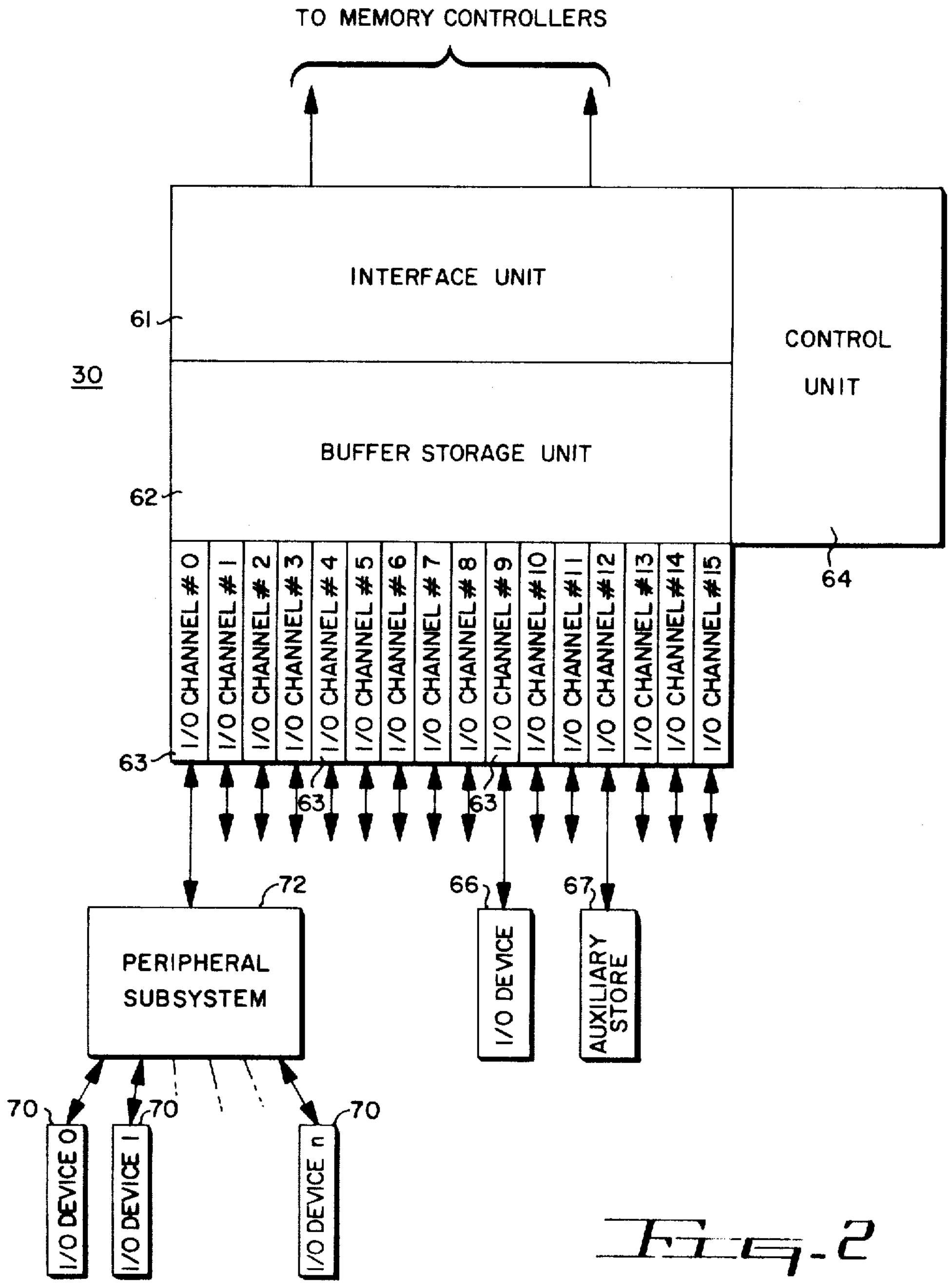
FIG. 2 is a block diagram of an I/O Controller useful in the system of FIG. 1.

A plurality of I/O Controllers 30, 31, and 32 respond to special instructions to provide communication between Memories 20 and 21 and a plurality of I/O devices and one or more auxiliary stores (FIG. 2). The I/O devices supply information for processing, supply programs to process the information, and receive the processed result information. Some I/O devices function as sources of information and programs, such as magnetic tape handlers and punched card readers. Each of these source I/O devices receives information and programs in the form of mechanical or magnetic representations on storage media and converts these representations to corresponding electrical signals for transmission to the I/O Controllers. Other I/O devices function to receive the processed information signals and convert them to a form useful to the system user. For example, magnetic tape handlers and card punches receive processed information signals from an I/O Controller and convert these signals to mechanical or magnetic representations on storage media for subsequent use, whereas high-speed printers, cathode ray devices, and electric typewriters convert these signals to a visible form for immediate use. The I/O Controllers transmit electrical signals representing input information and programs to the Memories and receive electrical signals representing processed information from the Memories.

The auxiliary stores, such as magnetic disc or drum devices, supplement the working store by providing mass amounts of relatively inexpensive storage space. An auxiliary store holds user programs received from I/O devices and awaiting scheduling for execution, user program libraries and data files, and the operating system programs. The auxiliary store transmits programs, and information, as they are required for processing through an I/O Controller to one of Memories 20 and 21. The auxiliary store also relieves Memories 20 and 21 of processed information, providing temporary storage for the processed information prior to its transmittal to an I/O device.

A Memory Controller 40 is connected for communication with Processors 11 and 12, Memory 20, and I/O Controllers 30–32. Memory Controller 40 directs and schedules all communication between the Processors and I/O Controllers on the one hand and Memory 20 on the other hand. When a Processor or I/O Controller requires to retrieve one or more data words from Memory 20 or to store one or more data words in Memory 20, the Processor or I/O Controller transmits a corresponding request to Memory Controller 40. Memory Controller 40 services all such requests by successively coupling Memory 20 to the requesting Processors and I/O Controllers for communication and by transmitting data words between the coupled Processor or I/O Controller and Memory 20. Another Memory Controller 41 is connected for communication with Processors 11 and 21, Memory 21, and I/O Controllers 30–32. In a manner similar to the operation of Memory Controller 40, Memory Controller 41 directs and schedules all communication with Memory 21 by the Processors and I/O Controllers.

The organization of an I/O Controller is shown in FIG. 2. By way of example, this I/O Controller is shown connected to a plurality of I/O devices and an auxiliary store. The I/O Controller comprises an Interface Unit 61, a Buffer storage Unit 62, a plurality of I/O channels 63, and a Control Unit 64. Interface Unit 61 is connected to transmit data words to and receive data words from Memory Controllers 40 and 41. Accordingly, Interface Unit 61 is provided with appropriate data transmitters and receivers for communicating with the Memory Controllers. Interface Unit 61 is also provided with a data transmission register for temporarily holding the data word being transmitted and a data-receiving register for accepting and temporarily holding the data word being received.

Each of I/O channels 63 is coupled to receive data words from and transmit data words to I/O devices or an auxiliary store. For example, I/O channel #9 provides communication with a single I/O device 66, such as a high-speed printer. I/O channel #12 provides communication with an auxiliary store 67 of the type described previously. On the other hand, I/O channel #0 provides communication with a plurality of I/O devices 70, such as magnetic tape handlers. Because an I/O channel is adapted to communicate with only one I/O device at a time, a peripheral subsystem 72 is connected between I/O channel 0 and I/O devices 70. Peripheral subsystem 72 functions as a form of switching device, being controlled to connect any one of I/O devices 70 to I/O channel #0 for communication.

Buffer Storage Unit 62 provides temporary storage for data being received from and transmitted to I/O channels 63. As information is received from each of the I/O channels, it is held in Buffer Storage Unit 62 until the information is ready for transmission to a Memory Controller. Buffer Storage Unit 62 thereupon transfers the stored information to Interface Unit 61. Conversely, Buffer Storage Unit 62 receives information for each I/O channel 63 from Interface Unit 61 and prepares it for transmission to the appropriate one of the I/O channels.

Control Unit 64 generates timing and control signals to control and coordinate the operation of Interface Unit 61, Buffer Storage Unit 62, and I/O channels 63.

OPERATING SYSTEM, GENERAL

Multiprogramming is effected in the data processing system of FIGS. 1 and 2 by an operating system. The operating system, which comprises a set of programs and modules, manages and supervises the data processing system to maintain a plurality of user programs in efficient concurrent execution in each of Data Processors 11 and 12. The user programs in concurrent execution are stored in Memories 20 and 21. One of Memories 20 and 21 also holds the permanently resident operating system programs and modules. All other operating system programs and modules that are in current execution are held in Memories 20 and 21. User programs are alternated and interleaved in execution of each Data Processor by the aforementioned techniques of relinquishment and interruption. Interspersed among these user programs, operating system programs and modules are executed when required. For example, immediately following each suspension of execution of a user program in a Processor, as by relinquishment or interruption, an operating system module begins execution in that Processor to determine the reason for the suspension, to take any remedial or management steps necessary, and to dispatch the next user program to the Processor for execution.

User programs awaiting scheduling for execution are held in the auxiliary store. The auxiliary store also holds the user program library, user files, and the complete operating system. When a user program is scheduled for execution, it is transferred from auxiliary store through an I/O Controller to one or both of Memories 20 and 21, according to the size of the program and the available space in the Memories. Similarly, when an operating system program or module is required for execution and is not then resident in working storage, a copy is retrieved from auxiliary store and transferred through an I/O Controller to one or both of Memories 20 or 21.

A summary description of certain portions of the operating system will now be presented in order to provide a better understanding of the instant invention. More detailed information on operating systems is provided in DATAMATION, May 1964, pp. 26–45, and EDP ANALYZER, Vol. 4 No. 3, Mar. 1966.

The operating system comprises four main units. A user program that is executed successfully from start to proper conclusion is managed and supervised in succession by each of these units. Therefore, these main units of the operating system are termed "phases" and are the Program Input phase, the Program Scheduling and Resource Allocation phase, the Program Dispatching phase and the Program Termination phase.

The Program Input phase receives, processes, and queues requests for the performance of user programs. Program requests are received from a source I/O device, such as a card reader. Each program request includes control information identifying the I/O equipment and working storage space required during execution and indicating the relative urgency of the program for performance. The Input phase assigns a unique number to the program and enters the program number and control information into auxiliary storage. An entry relative to the program is also inserted into an "input table" for use by the Allocation phase. The input table holds an entry for each program request from the time the Input phase handles the request until the Allocation phase first analyzes the request, each such entry comprising the program number and a representation of the location in auxiliary storage of the corresponding control information. The input table may be held in working storage or auxiliary storage. If the program accompanies the request information from the source I/O device, it is entered temporarily into the auxiliary store; otherwise the program will be obtained from the program library in the auxiliary store. The programs and modules comprising the Program Input phase are not maintained permanently in Memories 20 and 21, but are called from auxiliary storage when required to process newly arriving program requests.

The Program Scheduling and Resource Allocation phase schedules programs for execution from the input stack created by the Program Input phase. Programs are evaluated for scheduling according to their priorities, the I/O equipment and working storage requirements of these programs, and the totality of other programs being executed by the system. A program is scheduled for execution after its I/O equipment requirements have been satisfied from an inventory of I/O equipment and its working storage requirements have been satisfied from a list of available working storage space.

The objective of program scheduling in a multiprogrammed system is to provide maximum performance by effecting fast delivery of results and efficient equipment utilization. To achieve effective scheduling, the operating system is provided the capability of selecting from among a number of waiting user programs. The scheduling procedure analyzes the entire program queue, resource requirements and program priorities in the control information to effect fast delivery of results and efficient equipment utilization.

The Scheduling and Allocation phase comprises two subphases, the Peripheral Allocation Subphase and the Working Storage Allocation subphase. The Scheduling and Allocation phase is entered when a change occurs in either the input table or the total resources utilization, or when a program terminates. The highest priority program represented in the input table is selected first for an attempted allocation of resources. The Peripheral Allocation subphase then attempts to allocate I/O equipment to satisfy the requirements of the program selected. If its I/O equipment requirements are satisfied, a program is advanced to the Working Storage Allocation subphase for satisfaction of its working storage requirements. The Scheduling and Allocation phase continues in process until resource allocation has been attempted for all programs in the input table, in decreasing order of priority. However, as soon as allocation for a program is successfully completed, the program is scheduled for execution by entering an identification of the program in a "schedule table," which is a table of programs awaiting execution and in execution, and by loading the program into working storage. The program then is ready to begin execution when it is selected by the Dispatching phase. If allocation cannot be completed for a program, the Allocation phase passes on to the next program.

The Peripheral Allocation subphase assigns I/O devices to the files of a program. A "channel use table," which is an inventory of the I/O equipment of the system and its availability for assignment, is examined to determine whether the required types of I/O devices are available on any I/O channel. If the program requires more I/O devices of one type than are in the system complement or a type not in the system complement, the program is aborted. As each I/O device is assigned to a program, a corresponding "flag" is set in a peripheral assignment table (PAT) and the device is marked as not available in the channel use table. Peripheral assignment table entries are constructed by this subphase from the program request control information as each I/O device is assigned. If magnetic tape handler reel mounting instructions are required, another "flag" is set. Actual mounting instructions are not issued, however, until all I/O devices have been allocated for the program.

If a determination is made that a particular required I/O device cannot be allocated at any point during the allocation process, all I/O equipment already assigned to the program are released.

After all required I/O devices have been allocated to a program, necessary magnetic tape reel mounting instructions are issued to the operator. From this point on all allocated I/O equipment is committed to the program and normally cannot be released without permission of the program itself.

The allocation process continues for all programs identified in the input table, in order of their priorities.

The Working Storage Allocation subphase assigns working storage space for the execution of a program. The Working Storage Allocation subphase is entered to serve a program as soon as the entire complement of I/O equipment assigned to that program is ready for operation. The Working Storage Allocator program of this subphase initiates the process of allocating working storage by comparing the working storage list, which is an inventory of each set of contiguous working storage cells not assigned, with the program's working storage requirements. One of the following actions is taken: (a) sufficient contiguous working storage space is available and is assigned to the program, (b) allocation is not made because sufficient working storage space is not available, or (c) allocation is not made because, although sufficient working storage is available, it is not contiguous.

As soon as working storage space is assigned to a program this subphase deletes the assigned space from the working storage list. The program is then scheduled for execution by entering its program number into the schedule table.

If the available working storage space is insufficient, the priority of the program is incremented, provided working storage allocation has been unsuccessful for a predetermined time interval. When a program is passed over because of insufficient working storage, the next allocation process for that program will be resumed at the working storage allocation point because the PAT entries for the program provide notice that its I/O allocation is complete.

If the available working storage space is sufficient, but not contiguous, this subphase initiates "compaction" of working storage space. Compaction moves the occupied portions of working storage together, thereby making the free regions of working storage contiguous. All I/O operations in the working storage region to be compacted are halted. Programs are shifted either upwardly or downwardly in working storage, according to which direction of compaction will most readily provide the necessary space. After a sufficient number of program movements have been completed to provide the required contiguous working storage space, the waiting program is assigned the space created.

The programs and modules comprising the Program Scheduling and Resource Allocation phase are not maintained permanently in Memories 20 and 21, but are called from auxiliary storage when required.

The Program Dispatching phase places programs in execution and exercises supervision over all programs which are scheduled for execution and have not yet terminated. The Dispatcher program of this phase selects a program for execution from among those programs identified in the schedule table that can make effective use of the system resources, and assigns a Data Processor to the selected program. User programs and certain operating system programs, termed "control" programs, can be entered only from the Dispatcher. However, operating system modules, termed "subordinate" modules, can be entered directly from user programs, operating system control programs, and other operating system subordinate modules. Subordinate modules are charged directly to the program or module from which they are entered. Therefore, to the Dispatcher there is no change in the program being executed when a subordinate module is entered.

The Dispatcher is entered when any one of the following events occurs:

a. an operating system program is completed or has nothing further to do, b. a user program has used up a predetermined allotted time interval and is interrupted, c. a program voluntarily relinquishes control because it requires the completion of at least one I/O operation before it can proceed efficiently.

Each time the Dispatcher obtains control from a user program, it is afforded the opportunity to give control to another program in working storage that can make effective use of the system resources.

The Dispatcher selects a program for execution according to criteria which include the program's priority and its relinquishment status. The Dispatcher examines first the highest priority scheduled program. Each operating system control program has a higher urgency than any user program. Therefore, the Dispatcher first examines the scheduled operating system programs, if any, in sequence according to their relative priorities, after which the user programs are examined.

The relinquishment status of the examined program must be correct for the program to be selected for execution. For example, a program which has been suspended recently by a relinquishment will not be selected immediately following its suspension. Instead, such program will be bypassed by the Dispatcher until at least one of the program's I/O requests has been satisfied.

Finally, a program will not be selected for execution by assignment of one of the Processors thereto if the program is presently in execution in another Processor.

After the Dispatcher selects a program for execution it marks the program "in execution" in the schedule table, sets a base address register of the assigned Processor to identify the region of working storage holding the program, resets an interval timer for the Processor, prepares the other registers of the Processor, and then transfers control to the selected program.

The operating system receives all requests for I/O operations and initiates the required operations. An I/O subphase performs I/O operations for all user and other operating system programs. Therefore, every request for an I/O operation, whether originating in an operating system or user program, is referred to the I/O subphase. The requesting program is momentarily suspended and the I/O subphase initiates or queues the requested I/O operation. An I/O operation, once initiated, continues under sole direction of one of I/O controllers 30–32. Therefore, following the initiation of the I/O operation, control is returned to either the suspended program of the Dispatcher.

Recognition and processing of the termination of I/O operations is also a function performed only by the operating system. When an I/O operation terminates, with notification usually provided by a "program interrupt" signal from the I/O Controller involved, a program in execution will be suspended and the termination process referred to an I/O termination module of the I/O subphase.

The Dispatcher program is permanently held in working storage. Portions of the I/O subphase programs are also permanently held in working storage.

The Program Termination phase provides for the orderly termination of user programs. This phase is entered when a terminating program calls the operating system Termination module. All I/O devices which have not been released by the user program prior to the termination call are now released. All working storage space assigned to the terminating program also is released. Control is then transferred to the Dispatcher.

Portions of the Termination phase modules are permanently held in working storage.

CLASSES OF PROGRAMS

Among the different types of programs executed by the data processing system of FIG. 1, four classes of programs play a particularly significant part in the operation of the instant invention. These four classes of programs are RM programs, slave programs, privileged slave programs, and SSA modules. A brief description of each class will now be provided, although a more complete understanding of the nature and mode of operation of each such class will be supplied by the ensuing description.

RM program: An operating system program or module executed from the portion of working storage reserved solely for the operating system. This reserved portion of working storage is known as the Resident Monitor (RM) region. Only the most urgent and important of the operating system programs and modules are RM programs. RM programs can execute any type of processor instruction and such instructions can address any cell of working storage.

Slave program: A user program. User programs constitute the workload of a multiprogrammed data processing system and perform useful data processing functions for the customers of the system. User programs are supplied to the data processing system at irregular times and in random order as the work product of these programs in required by different customers. However, user programs do not have complete freedom in execution. Thus, the user program is prohibited from executing certain instructions in the instruction repertory of Processors 11 and 12. Instead, when the functions of these prohibited instructions are required, the user program must call on the operating system for assistance. Additionally, the user program is entirely confined to a region of the working store assigned to it by the operating system. The operating system allocates an available block of cells in working storage into which awaiting user program is loaded, and during execution in such block the instructions of the user program are permitted to address no other cells in working storage than those of the confining block. Thus, because the user program is subservient in execution to the operating system it is termed a slave program.

Privileged Slave program: An operating system program executed similarly to slave program. A number of types of operating system programs are executed externally to the Resident Monitor region. Such programs, like slave programs, are allocated to an available block of cells outside the Resident Monitor region. Such programs, like slave programs, are allocated to an available block of cells outside the Resident Monitor region by other portions of the operating system. Thus, these programs have some characteristics of slave programs. However, the programs of this class are not prohibited from executing the complete repertory of instructions of the processors. Moreover, the instructions of these programs are permitted to address any cell in working storage. Since a program of this type is executed similarly to slave programs but has some of the privileges of operating system programs, it is termed a privileged slave program.

SSA module: An operating system program part or subroutine which provides services for a slave or privileged slave program and which is executed from the management control block that is adjacent to the corresponding slave or a privileged slave program. The management control block reserved adjacent to a slave or privileged slave program is termed a Slave Service Area (SSA). The SSA module is loaded into the Slave Service Area of the slave or privileged slave program which it is to serve and, when executed, the SSA module provides direct management services for the adjacent program. The SSA module is permitted to execute any instruction in the processors' instruction repertory and such instructions can address any cell of working storage.

WORKING STORE TOPOLOGY

The working store of the instant data processing system comprises Memories 20 and 21. Each of Memories 20 and 21 may be any one of the many well-known commercially available coincident-current random-access magnetic core memories. Each of Memories 20 and 21 holds instructions, data items which are to be processed, data items which have been processed, and data items for assisting in processing, such as constants and management control items. All such data items and instructions are termed "data words."

The data word of the instant embodiment comprises 36 information-bearing binary digits, or "bits." In certain components of the data processing system, including Memories 20 and 21, additional bits, such as parity bits, are employed with each data word to provide for testing the correctness of the data word after it has been transferred from one location to another. A description of the employment of these additional bits is not necessary to an understanding of the instant invention, and therefore only the basic 36 bits of the data word will be considered in this description.

Each data word is held in the working store in a respective addressable cell. The address of each cell is unique, so that a data word may be entered into or retrieved from any cell by specifying the address of such cell. The addresses of all the cells of working storage comprise a succession of numbers in the octal numeral system, commencing with the address "0" and continuing with successively increasing integers to represent each cell of the working store, whether it is in Memory 20 or 21.

Figure 3:
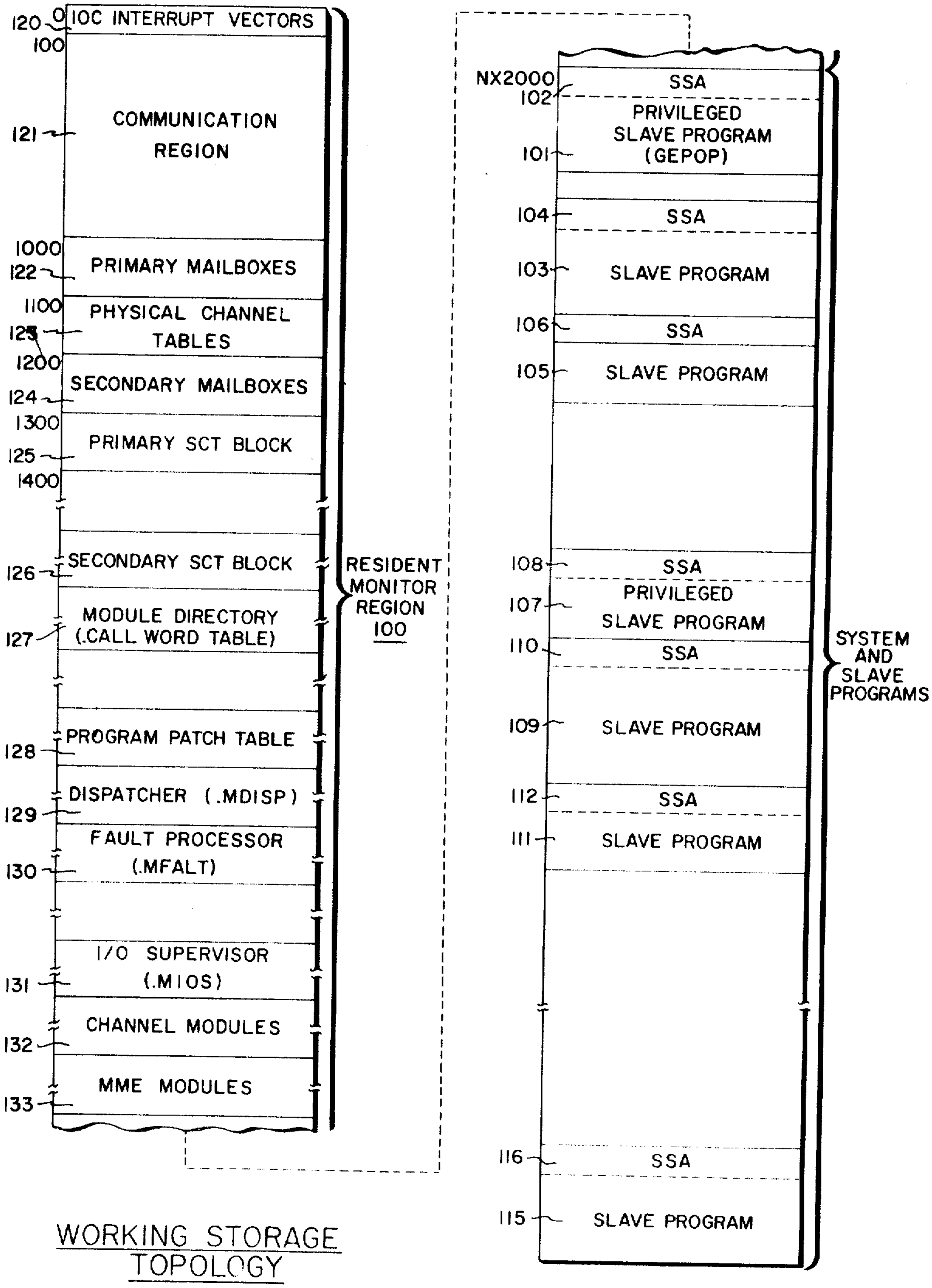
FIG. 3 is a diagram of the organization of working storage in the instant invention.

A broad view of the topology of working storage is shown in FIG. 3. The lower end (region of lowest numbered addresses) is the portion reserved permanently for use by only the operating system, and is known as the Resident Monitor region 100. The set of operating system programs and the management information maintained in the Resident Monitor region is known collectively as the Resident Monitor. The size of the Resident Monitor varies with the size of the system configuration. Thus, management information must be provided for each I/O Controller and each I/O device. A substantial amount of management information must be provided to maintain each processor in operation. Finally, the amount of management information required to manage the working store itself is a function of the size of the working store. However, the Resident Monitor region always consists of an integral number of blocks of 1,024 cells ($N \times 2{,}000_8$), because each slave or privileged slave program can only be allocated blocks of working storage commencing at cells having addresses which are integral multiples of 1,024. According to the present practice of the invention, the size of the Resident Monitor region varies between 16K and 18K cells, according to the configuration of the data processing system. (For simplicity, sized of working stores and portions of working stores which are integral multiples of 1,024 cells will be referred to by the closest integral multiple of 1,000 (1K). For example, a block of 6,144 cells (6×1,024) will be referred to as comprising 6K cells).

In the instant embodiment, the Resident Monitor region is disposed in Memory 20. The remainder of Memory 20 and all of Memory 21 is available for the loading and execution of slave and privileged slave programs and their associated SSA modules. Therefore, the Resident Monitor region, which is illustrated in the entire left-hand diagram and ends at the top of the right-hand diagram in FIG. 3, comprises the first 16K, 17K, or 18K cells of Memory 20. The lower portion of the right-hand diagram of FIG. 3 represents the remainder of the cells in Memory 20 and all of Memory 21. By way of example, each of Memories 20 and 21 may comprise 128K cells. Therefore, for this example, the first 16K–18K cells of Memory 20 comprise the Resident Monitor region and the remaining 110K–112K cells of Memory 20 and all of Memory 21 are free for the loading and execution of slave and privileged slave programs.

Slave and privileged slave programs are loaded into available blocks of contiguous cells in the working storage area outside the Resident Monitor region by the Scheduling and Allocation phase of the operating system. A slave or privileged slave program has its first data word loaded into a cell having an address which is an integral multiple of 1,024, such cell having hereinafter being termed the base cell for the program. The remaining data words of a slave or privileged slave program are loaded into the succession of cells contiguous to and having addresses increasing from the base cell. As slave and privileged slave programs terminate, they leave corresponding gaps in the working store prior to reassignment of the released blocks, as shown in FIG. 3.

At the same time that a block of cells is allocated to a slave or privileged slave program for execution, a Slave Service Area is also allocated. The SSA is a block of 1024 contiguous cells located immediately below the base cell of the corresponding program. Thus, in FIG. 3, disposed immediately below the privileged slave program occupying block 101 is shown a Slave Service Area 102. Slave Service Area 102 is reserved for use of the operating system in providing management services for the program occupying block 101.

In the instant embodiment, the privileged slave program in block 101 is identified as the "GEPOP" program. The GEPOP program has highest priority of all privileged slave programs. Its primary function is to answer requests from certain of the I/O devices for the entry of user programs or other information into the data processing system. Therefore, the GEPOP program must always be operative in working storage to recognize such requests. This program is initially loaded into working storage immediately above the Resident Monitor region when the data processing system commences operation. Because the GEPOP program has highest priority and never formally terminates, it remains in working storage in the location in which is was initially loaded.

The disposition of programs above block 101 in the working store varies from moment-to-moment during operation of the data processing system, an exemplary disposition in this region being shown in FIG. 3. It is to be understood that FIG. 3 is not drawn to scale, but is for illustrative purposes only.

Shown next above block 101 is a slave program, which occupies block 103, and its corresponding adjacent SSA 104. SSA 104 is not immediately adjacent block 101. This gap was left by a terminating program. Immediately above and adjacent to block 103 is a block 105 and its associated SSA 106. Block 105 holds another slave program. A relatively large unoccupied region appears next in working storage, followed by a block 107 and its associated SSA 108. Block 107 holds another privileged slave program. Two slave programs and their associated SSA's 110 and 112 are contiguous to block 107. Finally, a slave program occupies a block 115 at the upper extremity of working storage, which is in Memory 21.

RESIDENT MONITOR

Figure 4:
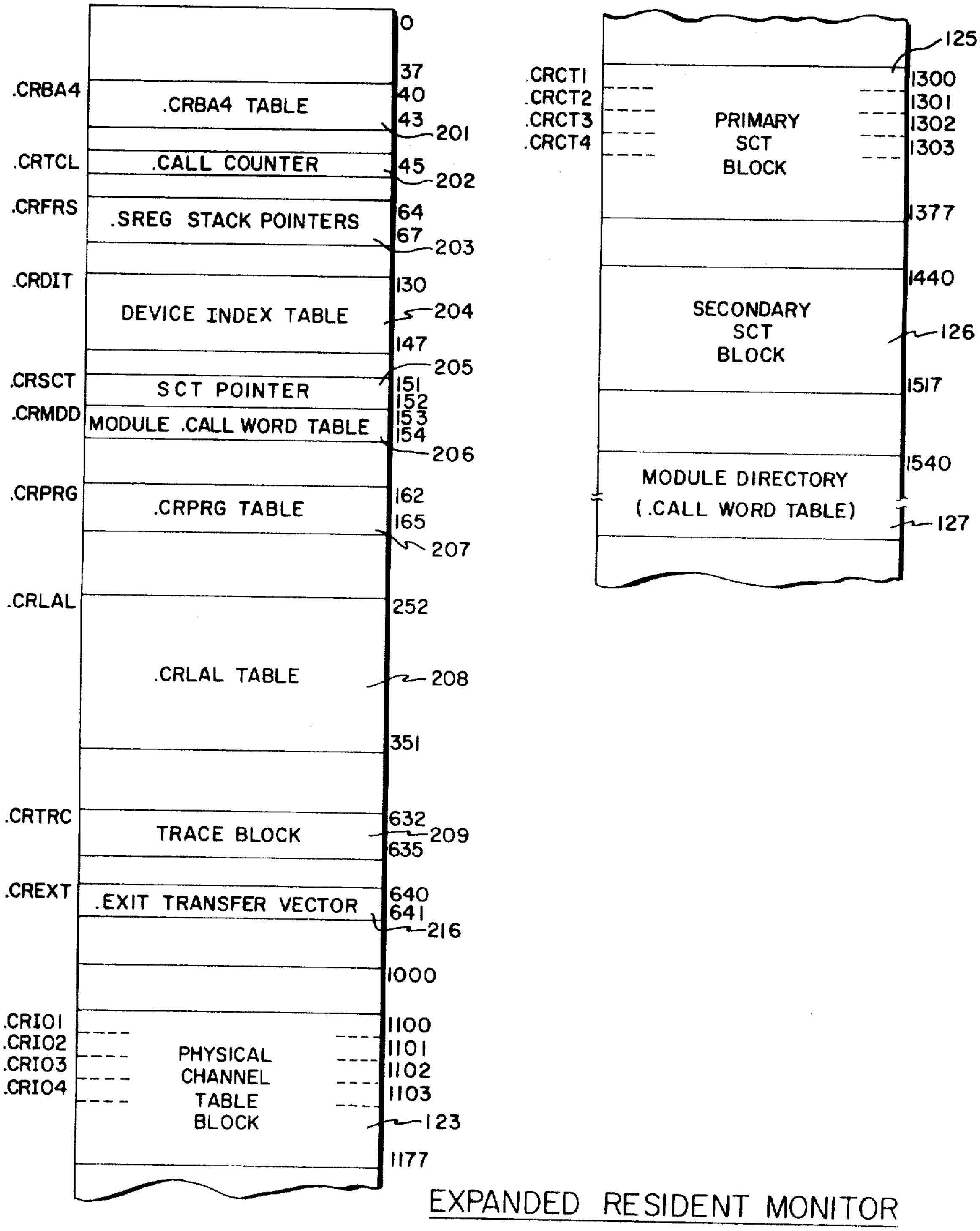
FIG. 4 is a diagram in further detail of the organization of the Resident Monitor region of working storage.

The first block 120 of the Resident Monitor region, comprising the 64 cells having addresses 0 through $77_8$, is characterized by its storage of IOC interrupt vectors. The IOC interrupt vectors comprise the entry addresses for operating system subroutines that process the requirements of certain I/O operations. Block 120 of the Resident Monitor also holds data words having the addresses of the base cells of the slave and privileged slave programs in execution in each of the processors. One of these data words is provided for each processor and the set of such data words is identified as the .CRBA4 table 201, FIGS. 4 and 5. The symbolic address of the first word of table 201 is .CRBA4.

The next block 121 of the Resident Monitor region, the cells having the addresses $100_8$ through $777_8$, is termed the "-Communication Region." The Communication Region is primarily employed for storing data words which transfer information between the different programs and modules of the operating system. For example, while a particular module of the operating system is in execution, it may develop certain management information. This management information is made available for use by other operating system programs and modules when the module which developes the information stores it in the Communication Region for retrieval by the other programs and modules.

The Primary Mailboxes 122 and Secondary Mailboxes 124 of the Resident Monitor are employed for storing data words which transfer information from modules of the operating system to the I/O Controllers. An operating system module that initiates an I/O operation to be carried out by a selected one of the I/O controllers stores information needed by the selected controller in these Mailboxes. This information is then retrieved from the Mailboxes by the selected I/O Controller and is used to direct the I/O Controller in performing the required I/O operation.

The Physical Channel tables block 123 holds a table of management information for each I/O channel (FIG. 2). Each table holds, for example, the number of times the respective I/O channel has been used, the number of errors which have taken place on the channel, and a representation of whether the channel is busy or not, FIGS. 4 and 5. Each table also includes a respective "logical channel index." The logical channel index is a unique reference to a queue of requests assembled by the I/O supervisor for the corresponding I/O channel. The Physical Channel table of the I/O channel assigned to provide I/O service for a queue of I/O requests holds the corresponding logical index. The Physical Channel table comprises four data words. The tables are grouped within block 123 according to I/O Controller number, and are ordered by I/O channel number within each I/O Controller group. The symbolic addresses of the four data words of the fist Physical Channel table in block 123 are respectively, .CRI01, .CRI02, .CRI03 and .CRI04.

The Primary SCT block 125 holds a table of management information for each queue of I/O requests. Each of these tables is termed a Primary SCT (System Configuration Table), FIGS. 4 and 5. The Primary SCT holds, for example, the number of the I/O channel and corresponding I/O Controller number currently assigned to service the corresponding I/O request queue. In addition, the Primary SCT holds the address of a corresponding "channel module." The Primary SCT also holds a respective "physical channel index." The physical channel index provides the relative address of the Physical Channel table of the related I/O channel within the groups of Physical Channel tables in block 123. Additionally, the Primary SCT contains the first and last addresses of the chain of linked cells that holds the respective queue of I/O requests. Finally, if more than one I/O device is coupled to an I/O channel, such as I/O channel #0, FIG. 2, the Primary SCT also holds a pointer to the base cell of a group of Secondary SCT's provided for that channel. The Primary SCT comprises four data words. The Primary SCT's are ordered within the block 125 according to the corresponding logical channel indices. The symbolic addresses of the four data words of the first SCT in block 125 are respectively, .CRCT1, .CRCT2, .CRCT3, and .CRCT4.

The Secondary SCT block 126 holds a table of management information for each I/O device of multiple device I/O channels. Each of these tables is termed a Secondary SCT, FIG. 5. The Secondary SCT holds, for example, a device number to distinguish the respective I/O device from other devices on the same I/O channel, a code to denote the type of the device, and information representing the current status of the I/O device. The Secondary SCT also contains the logical channel index of the corresponding Primary SCT. The Secondary SCT comprises four data words. The Secondary SCT's are grouped within block 126 according to the logical channel index of the corresponding Primary SCT, and are ordered by device number within each such group.

A Module Directory 127 provides information for locating operating system modules as they are required to perform services for slave and privileged slave programs. Each data word entry in Directory 127 comprises information for calling a respective module into execution. Therefore, each such entry is termed a .CALL word, FIG. 5, and the Directory is also known as the .CALL Word table. Each .CALL word designates whether the corresponding module resides in and is to be executed from the Resident Monitor region or whether it resides in the auxiliary store and is to be executed from the SSA. The .CALL word also holds a representation of the location of the module in the Resident Monitor or auxiliary store, whichever is applicable. In addition, the .CALL word indicates whether there is a "patch" for the module. The .CALL words are ordered by module number within the Module Directory.

A Program Patch table 128 provides patches for the operating system. A patch is a set of modifications for an operating system program or module. Each patch is identified by the number of the program or module to be modified.

The Dispatcher 129, Fault Processor 130, and I/O supervisor 131 are three operating system programs maintained permanently in the Resident Monitor region. These three programs comprise the heart of the operating system. Channel modules 132 are also maintained permanently in the Resident Monitor region. The channel module is a unique subroutine for controlling the operation of a particular type of I/O device.

MME modules are operating system modules that provide different direct services for slave and privileged slave programs. An MME module is called when a slave or privileged slave program executes a "Master Mode Entry" (MME) instruction. The MME instruction contains a representation of the particular operating system module required by the calling program. Certain MME modules are loaded into and executed from block 133 of the Resident Monitor region. Other MME modules are SSA modules and are loaded into and executed from the SSA of the calling program.

SLAVE SERVICE AREA

The management control block, termed the Slave Service Area (SSA), is reserved for use of the operating system in providing management services for the adjacent slave or privileged slave program. The previously defined SSA modules, which provide direct services for slave and privileged slave programs, are loaded into and executed from the SSA's. In addition, the operating system maintains much of the management information relating to each slave or privileged slave program in the adjacent SSA.

Figure 6:
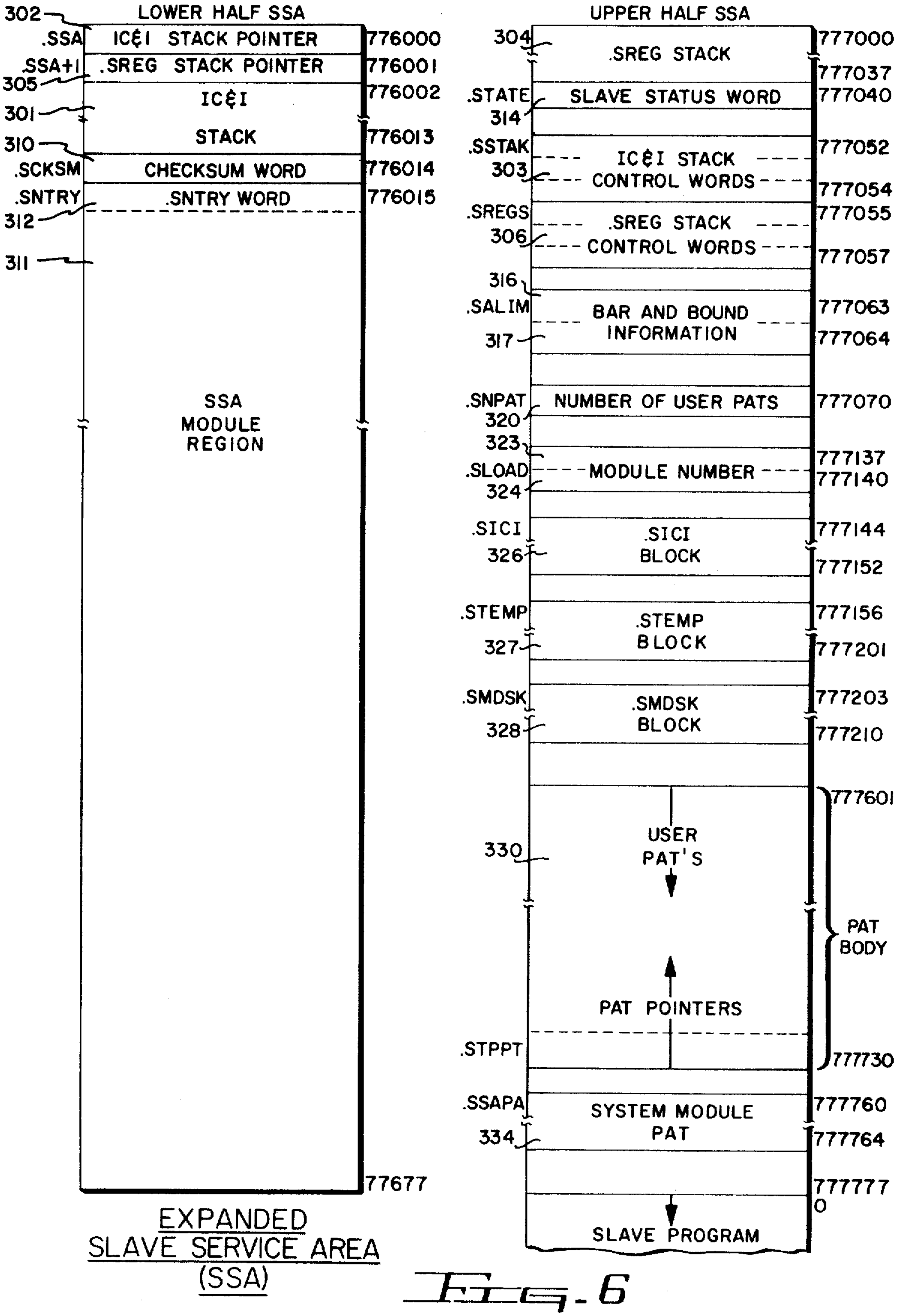
FIG. 6 is a diagram in further detail of the organization of a Slave Service Area of working storage.

The addresses of the cells of the SSA in the topological diagram of FIG. 6 represent the location of the cells relative to the base cell of the adjacent slave or privileged slave program. Because the base cell is immediately "above" the SSA (has a higher absolute address than the greatest absolute address in the SSA), these SSA relative addresses are negative numbers. Thus, the uppermost cell of the SSA, that immediately below the base cell, has a relative address of −1.

In the instant data processing system, as in many other data processing systems, negative numbers are represented by their respective complements. Accordingly, each SSA cell address shown in FIG. 6 is the octal complement of the address of the cell relative to the base cell, expressed in six digits. Thus, the uppermost cell of the SSA is represented by the relative address $777777_8$. The first cell of the SSA is 1,024 cells below the base cell. In the octal system, 1,024 is represented by the number $2000_8$. The complement of $-2000_8$ and, therefore, the relative address of the first cell of the SSA is $776000_8$. These relative addresses are also termed "offsets" hereinafter.

The SSA, FIG. 6, comprises two pushdown stacks, the IC&I stack and the .SREG stack. A pushdown stack, also known as a pushdown list, for brevity hereinafter will be termed simply a "stack." A stack is a form of store wherein the entries are manipulated on a last-in, first-out basis. When a new entry is inserted into the stack, it is placed in the top position of the stack and all earlier entries in the stack are "pushed down" one position. When an entry is retrieved from the stack the top entry is delivered and the remaining entries are "popped up" one position.

In the instant invention, one form of pushdown stack comprises a set of contiguous cells of working storage. However, the contents of the stack are not physically pushed down when a new entry is made or popped up when the top entry is retrieved. Instead, the pushdown and popup action is simulated by changing the location of the top position of the stack. The location of the top position of the stack is designated by a "pointer," maintained in a separate cell of working storage. When the stack is empty, the pointer designates the lowest cell in the stack as being the next top position. Each new entry is written into the stack in the cell designated by the pointer and at the same time the pointer is incremented to designate the fist cell in the stack above the latest entry. If an entry comprises more than one data word, and thereby occupies more than one stack cell, the amount of incrementation of the pointer equals the number of cells occupied by the entry. Thus, although entries in a stack remain in the cells in which they were originally inserted, these entries are effectively pushed down as new entries are made because the top of the stack ascends.

In retrieval from the stack described above, the entry immediately below the cell designated by the pointer is read. Thus, the entry which is read is the one last written into the stack and occupying the top position of the stack. At the start of each retrieval the pointer is decremented to designate the cell from which the entry is to be retrieved. For the multiple-word entry the amount of decrementation of the pointer equals the number of cells occupied by the entry. Thus, the contents of the stack are effectively popped up as entries are retrieved because the top of the stack descends.

The IC&I stack is held in a block 301 of the SSA. Each IC&I stack entry comprises one data word, FIG. 7. Block 301 comprises the 10 cells having addresses $776002_8$ through $776013_8$, thereby providing the IC&I stack with a capacity of 10 entries. The IC&I stack is employed for resuming execution of a succession of suspended programs in inverse order from the sequence in which they were suspended. Each entry in the stack comprises the contents of the instruction counter and the indicator register of a processor in which execution of a program of the succession was suspended. An instruction counter holds the working storage address of the next instruction to be executed of the series of instructions which comprise a program. An indicator register holds information denoting various results and states of a program at each moment in its execution. For a processor to resume executing a previously suspended program form the point of suspension, the instruction counter and indicator register of the processor must be loaded with the contents they held at the moment of suspension. Therefore, when a program is suspended, the contents of the instruction counter and indicator register are preserved by being written on top of the IC&I stack. These entries are written into the IC&I stack in the order in which the programs are suspended and, therefore, are made available from the top of the stack in inverse order from the order in which the corresponding programs were suspended. The employment of the IC&I stack by the data processing system in suspending a succession of programs and modules and in resuming execution of the suspended programs and modules in inverse order from the sequence of their suspension will be described in detail hereinafter.

The IC&I stack is maintained by four control words. The first of these control words is held in SSA cell 302 and the remaining three control words are held in a block 303, FIG. 6. The symbolic address of cell 302 is .SSA and its relative address is $776000_8$. The control word held in cell 302 is termed the .SSA word, FIG. 7, and comprises a pointer and a tally for the IC&I stack. The IC&I pointer represents the address of the first free cell on top of the IC&I stack. The IC&I tally is a number to indicate when the IC&I stack becomes full. The IC&I tally is preset to a value indicating the maximum permissible number of entries in the IC&I stack. The IC&I pointer is incremented by 1 each time an entry is added to the top of the IC&I stack and decremented by 1 each time an entry is retrieved from the top of the stack. Conversely, the IC&I tally is decremented by 1 each time an entry is added to the IC&I stack and incremented by 1 each time an entry is retrieved from the stack. If the IC&I tally reaches zero, it provides a warning that the IC&I stack is full.

Figure 7:
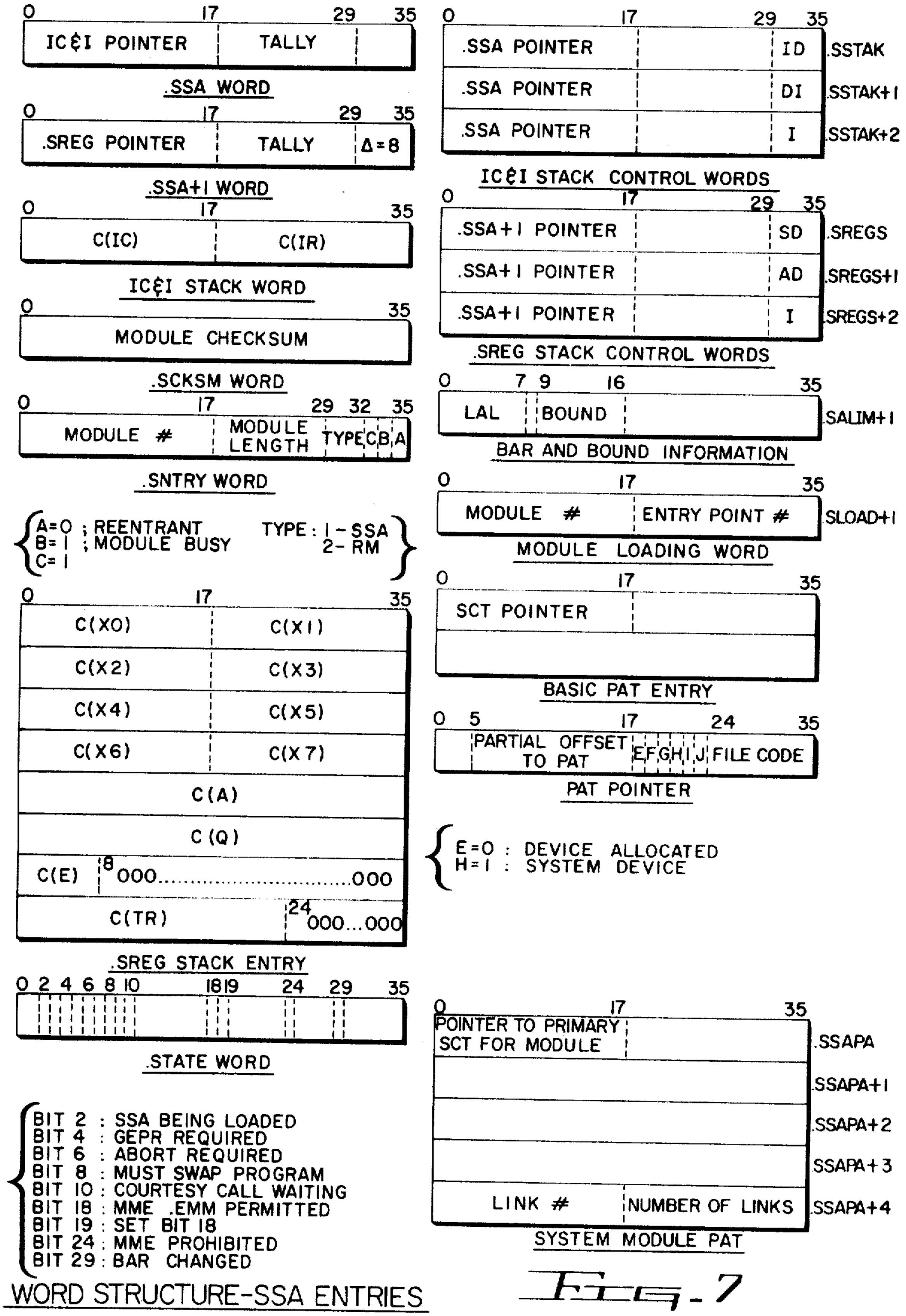
FIG. 7 is an illustration of the information content of various entries in the Slave Service area.

Block 303 holds there stack control words in respective cells having the addresses $777052_8$ through $777054_8$. Each of these control words, FIG. 7, is an instruction which has an address portion comprising the symbolic address (.SSA pointer) of the .SSA word. The first of these control words, held in a cell having the symbolic address .SSTAK, is employed for adding an entry to the top of the IC&I stack. When the .SSTAK control word is executed by a processor, the .SSA pointer thereof provides for the retrieval of the .SSA word. The processor then writes an entry into the cell in the IC&I stack designated by the IC&I pointer. The "tag" of the .SSTAK control word, which comprises bits 30–35 of the word, is an "ID" tag. After the entry has been written into the IC&I stack, the ID-tag directs the processor to increment by 1 the IC&I pointer and decrement by 1 the IC&I tally. The .SSA word, now pointing to the first free cell in the IC&I stack above the latest entry, is then restored to cell 302. Thus, execution of the .SSTAK control word effectively pushes down the ICI stack.

The second control word in block 303, held in a cell having the relative address .SSTAK+1, is employed for retrieving an entry from the top of the IC&I stack. When the .SSTAK+1 control word is executed, the .SSA pointer thereof again provides retrieval of the .SSA word. The tag of the .SSTAK+1 control word is a "DI" tag. The DI-tag directs the processor, immediately after retrieval of the .SSA word, to decrement by 1 the IC&I pointer and to increment by 1 the IC&I tally, whereupon the IC&I pointer now designates the last entry made in the IC&I stack. The processor next retrieves the entry from the cell designated by the IC&I pointer. The .SSA word is then restored to cell 302, the .SSA word now pointing to the cell in the IC&I stack from which the last entry was retrieved and which is now considered to be free. Thus, execution of the .SSTAK+1 control word effectively pops up the IC&I stack.

The third control word in block 303, held in a cell having the relative address .SSTAK+2, is employed for enabling access to the top of the IC&I stack without pushing down or popping up the contents of the stack. When the .SSTAK+2 control word is executed, the .SSA pointer thereof once again provides retrieval of the .SSA word. The tag portion of the .SSTAK+2 control word in an "I" tag. The I-tag provides the processor with access to the cell designated by the IC&I pointer of the .SSA word without effecting modification of either the IC&I pointer or the IC&I tally.

The .SREG stack is held in a block 304 of the SSA, FIG. 6. Each .SREG stack entry comprises eight data words, FIG. 7. Block 304 comprises the 32 cells having addresses $777000_8$ through $777037_8$, thereby providing the .SREG stack with a capacity of four entries.

The .SREG stack is employed to aid the IC&I stack in resuming execution of a succession of suspended programs in inverse order from the sequence in which they were suspended. Each entry in the stack comprises the contents of 12 working registers of a processor in which execution of a program of the succession was suspended. For a processor to resume executing a previously suspended program from the point of suspension, not only must the instruction counter and indicator register of the processor be loaded with the contents they held at the moment of suspension, but certain other working registers of the processor must be similarly loaded. Therefore, when a program is suspended, the contents of 12 working registers are also preserved by being written on top of the .SREG stack. These entries are written into the .SREG stack in the order in which the programs are suspended, and, therefore, are made available from the top of the stack in inverse order from the order in which the corresponding programs were suspended. The .SREG stack is also employed for the operating system to communicate information to a suspended program for use when it resumes execution. The employment of the .SREG stack by the data processing system in suspending a succession of programs and modules and in resuming execution of the suspended programs and modules will be described in detail hereinafter.

The .SREG stack is maintained by four control words. The first of these control words is held in SSA cell 305 and the remaining three control words are held in a block 306, FIG. 6. The symbolic address of cell 305 is .SSA+1 and its relative address is $776001_8$. The control word in cell 305 is termed the .SSA+1 word, FIG. 7, and comprises a pointer and a tally for the .SREG stack and a "delta" portion. The .SREG pointer represents the address of the first cell of the latest entry in the .SREG stack. The .SREG tally is a number to indicate when the .SREG stack becomes full. The .SREG tally is preset to a value indicating the maximum permissible number of entries in the .SREG stack. The delta portion is employed for incrementing and decrementing the .SREG pointer to accommodate eight-word entries in the .SREG stack. Therefore, the value of delta in the .SSA+1 word is 8.

Conversely to the IC&I stack described previously, the .SREG stack is filled downwardly starting from the top cell $777037_8$ of the stack. The free end of the .SREG stack descends away from cell $777037_8$ as entries are added to the stack and ascends as entries are retrieved from the stack. Because the particular mechanization of a stack is not material to its function in the instant invention, for consistency herein the free end of the .SREG stack will be termed the "-top" of the stack, and the .SREG stack will be said to be "-pushed down" when an entry is inserted into the stack and to be "popped up" when an entry is retrieved from the stack. Accordingly, the .SREG pointer is decremented by 8 each time an entry is added to the stack and is incremented by 8 each time an entry is retrieved from the stack. However, similarly to the IC&I tally, the .SREG tally is decremented by 1 each time an entry is added to the .SREG stack and incremented by 1 each time an entry is retrieved from the stack. Therefore, if the .SREG tally reaches zero, it provides a warning that the .SREG stack is full.

Block 306 holds three stack control words in respective cells having addresses $777055_8$ through $777057_8$. Each of these three control words, FIG. 7, is an instruction which has an address portion comprising the symbolic address (.SSA+1 pointer) of the .SSA+1 word. The first of these control words, held in a cell having the symbolic address .SREGS, is employed for adding an entry to the top of the .SREG stack. When the .SREGS control word is executed by a processor, the .SSA+1 pointer thereof provides for the retrieval of the .SSA+1 word. The tag of the .SREGS control word is "SD" tag. The SD-tag directs the processor to function in a manner similarly to the previously described DI-tag. Thus, the SD-tag directs the processor, immediately after retrieval of the .SSA+1 word, to decrement by 8 the .SREG pointer, using the delta portion of the .SSA+1 word, and to decrement by 1 the .SREG tally. The .SREG pointer now designates the first free cell in the .SREG stack above the latest entry therein. The processor next writes an entry into the first eight cells of the .SREG stack, commencing with the cell designated by the .SREG pointer. The .SSA+1 word is then restored to cell 305, the .SSA+1 word now pointing to the first cell of the new entry in the .SREG stack. Thus, execution of the .SREGS control word effectively pushes down the .SREG stack.

The second control word in block 306, held in a cell having the relative address .SREGS+1, is employed for retrieving an entry from the top of the .SREG stack. When the .SREGS+1 control word is executed, the .SSA+1 pointer thereof again provides retrieval of the .SSA+1 word. The tag of the .SREGS+1 control word is an "AD" tag. The AD-tag directs the processor to function in a manner similar to the previously described ID-tag. The processor first retrieves the entry from the eight cells which commence with the cell designated by the .SREG pointer. After the entry has been retrieved from the .SREG stack, the AD-tag directs the processor to increment by 8 the .SREG pointer and increment by 1 the .SREG tally. The .SSA+1 word is then restored to cell 305, the .SSA+1 word now pointing to the first cell of the last entry made in the .SREG stack before the entry just retrieved. Thus, execution of the .SREG+1 control word effectively pops up the .SREG stack.

The third control word in block 306, held in a cell having the relative address .SREGS+2, is employed for enabling access to the top of the .SREG stack without pushing down or popping up the contents of the stack. When the .SREGS+2 control word is executed, the .SSA+1 pointer thereof once again provides retrieval of the .SSA+1 word. The tag portion of the .SREGS+2 control word is an I-tag. The I-tag, as previously described, provides the processor with access to the cell designated by the .SREG pointer of the .SSA+1 word without effecting modification of either the .SREG pointer or the .SREG tally.

A data word termed the "checksum" word, employed for determining whether the corresponding SSA module is qualified for execution, is held in a cell 310 of the SSA, FIG. 6. The symbolic address of cell 310 is .SCKSM and its is $776014_8$. Often several successive requests requiring execution of the same SSA module are made by a slave or privileged slave program. Hence, an SSA module may be already resident in the SSA when it is called for execution. The considerable time required for retrieving the module from the auxiliary store and loading it into the SSA would be saved if the copy already in the SSA could be used again, and such copy is reusable if it has not been modified from its original form. Thus, it is the function of the .SCKSM word to provide an indication of whether the corresponding SSA module has been modified or continues in its original form.

The test of whether the SSA module is qualified for execution comprises comparing the contents of the .SCKSM word with a representation of the entire contents of the SSA module. When the SSA module is loaded into the SSA, its corresponding checksum word is loaded into cell 310. The checksum word contains a number representing the sum of all data words of the SSA module. The test cumulatively adds all data words of the SSA module to provide an aggregate sum and compares this value with the checksum number. Identify between the module sum and the checksum number denotes that the SSA module remains in its original form and is qualified for execution once again.

SSA modules are executed in a block 311. Block 311 comprises the 499 cells having addresses $776015_8$ through $776777_8$. The SSA module is loaded into consecutive cells of block 311, commencing with cell 312. Therefore, cell 312 holds the first data word of the SSA module. The symbolic address of cell 312 is .SNTRY and its relative address is $776015_8$. Therefore, the first data word of the SSA module is termed the .SNTRY word, FIG. 7, and comprises the number of the SSA module, a representation of the length of the module, a designation of the module-type, and other information concerning the module. Two types of operating system modules have been described herein, the SSA module and the RM module, the latter being executable only in the Resident Monitor region. The type notation in the .SNTRY word designates whether the word forms part of an SSA module or an RM module. The .SNRTY word also denotes whether the module is "reentrant." A reentrant module is not modified during execution, and, therefore, may be executed repeatedly, whereas a nonreentrant module is modified during execution and may be executed only once following each retrieval from the auxiliary store. Finally, the .SNTRY word denotes whether the module is "busy." An SSA module is designated busy as it is being placed in execution by a processor, and such designation is not removed until execution of the module has been completed.

The SSA holds a considerable number of additional data words containing management information relating to the adjacent slave or privileged slave program. Of these additional data words, only those directly related to the ensuing description of the operation of the instant invention will be described.

A data word used to indicate the current status of the corresponding slave program is held in a cell 314, FIG. 6. The symbolic address of cell 314 is .STATE and its relative address is $777040_8$. The .STATE word comprises the following information, FIG. 7, characterizing the current status of the corresponding slave or privileged slave program:

| BIT NUMBER | WHEN BIT IS 1: |
|---|---|
| 2 | A module is being loaded into the SSA. |
| 4 | An error has occurred and an error-recovery routine must be executed. |
| 6 | The slave program must be aborted. |
| 8 | The slave program must be "swapped" because the working storage space occupied thereby is required for another program. Swapping comprises returning a program to auxiliary store temporarily, from where it is subsequently reloaded into another region of the working store. |
| 10 | A "courtesy call" is required. A courtesy call requirement directs the performance of a particular function after the completion of an I/O operation and before the resumption of a suspended slave program, such delayed function having been requested when the slave program initiated the I/O operation. |
| 18 | An MME .EMM instruction is permitted. A processor which executes this instruction is enabled thereafter in its current program to execute any instruction in its repertory and to address any cell in working storage. |
| 19 | Bit 18 is to be set after a "fault." Certain incidents occurring while a processor is executing a program are termed faults. The occurrence of a fault controls the processor to branch to the Fault Processor program of the Resident Monitor to take appropriate action. If bit 19 is a 1, bit 18 is set to a 1 after the fault occurs, thereupon allowing execution of the MME .EMM instruction. |
| 24 | All MME instructions are prohibited. |
| 29 | The base address register of a processor, which is provided with the address of the base cell of a slave program when the processor is assigned to execute the program, has had its contents changed during execution of the program. |

Information relative to the base address and the allowable address bounds of the corresponding slave program is held in a pair of cells 316 and 317, FIG. 6. The symbolic address of cell 316 is .SALIM, so that the address of cell 317 relative to cell 316 is .SALIM+1. The address of cell 317 relative to the base cell of the slave program is $77064_8$. The .SALIM+1 word, FIG. 7, comprises a lower address limit (LAL) and a "bound." The LAL is a representation of the base address of the slave program. The bound is a representation of the upper address limit of the block of cells allocated to the slave program, and is employed for preventing the slave program from erroneously addressing a cell outside the allocated block. The base address register of a processor is loaded with the LAL and bound when the processor is assigned to execute the corresponding slave program.

The number of user PATs (Peripheral Assignment Tables) maintained in the SSA is held in a cell 320 of the SSA. Each PAT relates a user-identified file to the actual apparatus servicing that file. The PAT will be described in greater detail hereinafter. The symbolic address of cell 320 is .SNPAT and its relative address is $777070_8$.

Information relating to a module to be loaded into the SSA, when such loading has been requested or is in process is held in a pair of cells 323 and 324, FIG. 6. The symbolic address of cell 323 is .SLOAD, so that the address of cell 324 relative to cell 323 is .SLOAD+1. The address of cell 324 relative to the base cell of the slave program is $777140_8$. The .SLOAD+1 word, FIG. 7, comprises the number of the module being loaded and the number of the particular point of entry into the module when execution thereof is commenced. However, if the module is being loaded into the SSA from a pushdown stack that contains SSA modules which have been suspended previously, the contents of the .SLOAD+1 word will be 0, because when the SSA module stack is being popped up the top entry of the stack is placed in execution regardless of its module number.

A set of instructions for transferring final control for execution from the Dispatcher to the adjacent slave or privileged slave program when such program is being dispatched is held in a block 326 of the SSA, FIG. 6. Block 326 comprises the seven cells having addresses $777144_8$ through $777152_8$. The symbolic address of the first cell of block 326 is .SICI and the set of instructions held in this block is termed the .SICI set.

Temporary, or "scratch-pad," storage for use by operating system programs and SSA modules serving the adjacent slave or privileged slave program is provided by a block 327 of the SSA. Block 327 comprises the twenty cells having addresses $777156_8$ through $777201_8$. The symbolic address of the first cell of block 327 is .STEMP and the block is termed the .STEMP block.

Information relative to I/O operations which affect the SSA is held in a block 328 or the SSA. Block 328 comprises the six cells having addresses $777203_8$ through $777210_8$. The symbolic address of the first cell of block 328 is .SMDSK and the block is termed the .SMDSK block. When an I/O operation is to be performed which affects the contents of the SSA, DCW's (data control words) are assembled in the .SMDSK block. DCW's contain information to control the required I/O operation and information relating to the working storage locations into which data is to be entered or from which data is to be retrieved during the I/O operation.

All PATs employed by the adjacent slave or privileged slave program are held in a block 330 of the SSA, FIG. 6. Each of these PATs is termed a user PAT and relates a respective user-identified file to the actual apparatus servicing that file. This relationship is provided by a reference contained in each PAT to either a Primary SCT or a Secondary SCT. The referenced SCT, in turn, identifies the actual I/O channel and the corresponding I/O Controller currently assigned to service the user file.

Each PAT comprises an SCT pointer, FIG. 7, which is the address of an SCT, and various amounts of additional management information, depending on the apparatus which services the file. The basic entry of the PAT comprises two data words, which include the SCT pointer. If the file is serviced by one of the I/O devices coupled to a multiple device I/O channel, the PAT comprises the corresponding Secondary SCT pointer, otherwise the PAT comprises the corresponding Primary SCT pointer. If the file is maintained on magnetic tape, the user PAT contains information identifying the location of the file on a particular reel. However, if the file is maintained in an auxiliary store, the PAT defines the particular space in this store occupied by the file.

Inasmuch as the various user PAT's contain different quantities of management information, they require different numbers of data words, and accordingly occupy a different number of cells. Moreover, the user PAT's may be created at different times. Therefore, they are not ordered according to any regular system in block 330. Instead, the user PAT's are stored adjacent to each other and as each new user PAT is created it is loaded into block 330 adjacent to the last created user PAT.

Because the user PAT's vary in length and are not ordered according to any regular system, a PAT pointer is provided for locating each user PAT. A PAT pointer relates a respective user file identification, which comprises a code, to the location of the corresponding PAT. Thus, the PAT pointer, FIG. 7, comprises a file code and a partial "offset" of the corresponding PAT. A complete "offset" represents the location of a cell relative to the base cell of the slave program. The PAT pointer holds that portion of the offset which differs for each user PAT. Each PAT pointer also contains further information concerning the corresponding PAT. Thus, the PAT pointer denotes whether the apparatus required to service the file is currently allocated to a program. The PAT pointer also denotes whether the required apparatus has been allocated to the operating system, such as the operating system "output collector," and therefore is a "system device."

The PAT pointers are also stored in block 330, which is designated as the "PAT body," FIG. 6. The PAT body is variable in size, and is shown by way of example to comprise the cells having addresses $777601_8$ through $777730_8$. The user PATs occupy contiguous cells commencing with the lowest cell of the PAT body. The PAT pointers also occupy contiguous cells commencing with the PAT body top cell, which has the symbolic address .STPPT. As each new user PAT is created for a particular slave program, the PAT is loaded into the corresponding PAT body immediately on top of the last created PAT therein. A PAT pointer corresponding to the newly created user PAT also is loaded into the same PAT body, immediately below the last PAT pointer entered therein. Thus, unused space for entry of new user PAT's and their corresponding PAT pointers lies between the user PAT's and the PAT pointers currently stored in block 330.

A PAT, termed a "system module PAT" for use of the operating system is created, as needed, in a block 334 of the SSA, FIG. 6. Block 334 comprises the five cells having addresses $777760_8$ through $777764_8$. The symbolic address of the lowest cell of block 334 is .SSAPA. Each PAT created in block 334 provides for locating an SSA module in auxiliary storage. Thus, when an SSA module is to be retrieved from auxiliary storage for entry into the SSA, the .SSAPA cell is loaded with the address of the Primary SCT identifying the auxiliary store holding the SSA module, FIG. 7. The system module PAT is also provided with information defining the space in the identified auxiliary store in which the SSA module is resident, such as the link number and the number of links occupied by a set of contiguous modules which include the required SSA module, as shown in the .SSAPA+4 word.

OPERATING OF THE SLAVE SERVICE AREA—GENERAL

Two examples of the operation of the Slave Service Area in providing management services for a slave program will now be described in summary form. In the fist example, a slave program requests the services of an SSA module, the requested module is retrieved from auxiliary storage and loaded into the SSA of the requesting slave program, the module is executed in the SSA to provide the requested services, and when the SSA module terminates, control is returned to the requesting slave program. In the second example the services of an SSA module are again requested by a slave program, but during its execution in the SSA, the SSA module itself requires the services of a second SSA module. The first SSA module is thereupon suspended and pushed down in an SSA module stack maintained in auxiliary storage and the second SSA module is loaded into the SSA occupied by the first SSA module, overlaying the fist module therein. The second SSA module is placed in execution to perform the required services. When the second SSA module terminates, the first SSA module is popped up from the SSA module stack and reloaded into the SSA it occupied prior to suspension, and execution of the first SSA module is resumed from the point it was suspended. When the first SSA module terminates, control passes to the corresponding slave program.

EMPLOYMENT OF SINGLE SSA MODULE

An example of the operation of a single SSAmodule in accomplishing a specific function for a slave program is shown in FIG. 8. The operation commences when a slave program, designated for convenience herein as slave program "X," reaches a point during execution wherein it requires the identity of the I/O apparatus serving a particular file used by program X. Because each slave program uses only symbolic file codes to identify its own files, only the operating system maintains and has access to the actual identity of the I/O apparatus which serves each file. Thus, in the instant example, slave program X requires the number of the I/O channel to which the apparatus is coupled that serves a particular file and the number of the corresponding I/O Controller (IOC). Furthermore, if more than one I/O device is coupled to the pertinent I/O channel, the number of the specific I/O device that serves the file is also required by the slave program. Therefore, slave program X requests the operating system to supply the identity of the I/O apparatus which the slave program can only specify indirectly by file code.

Figure 8A:
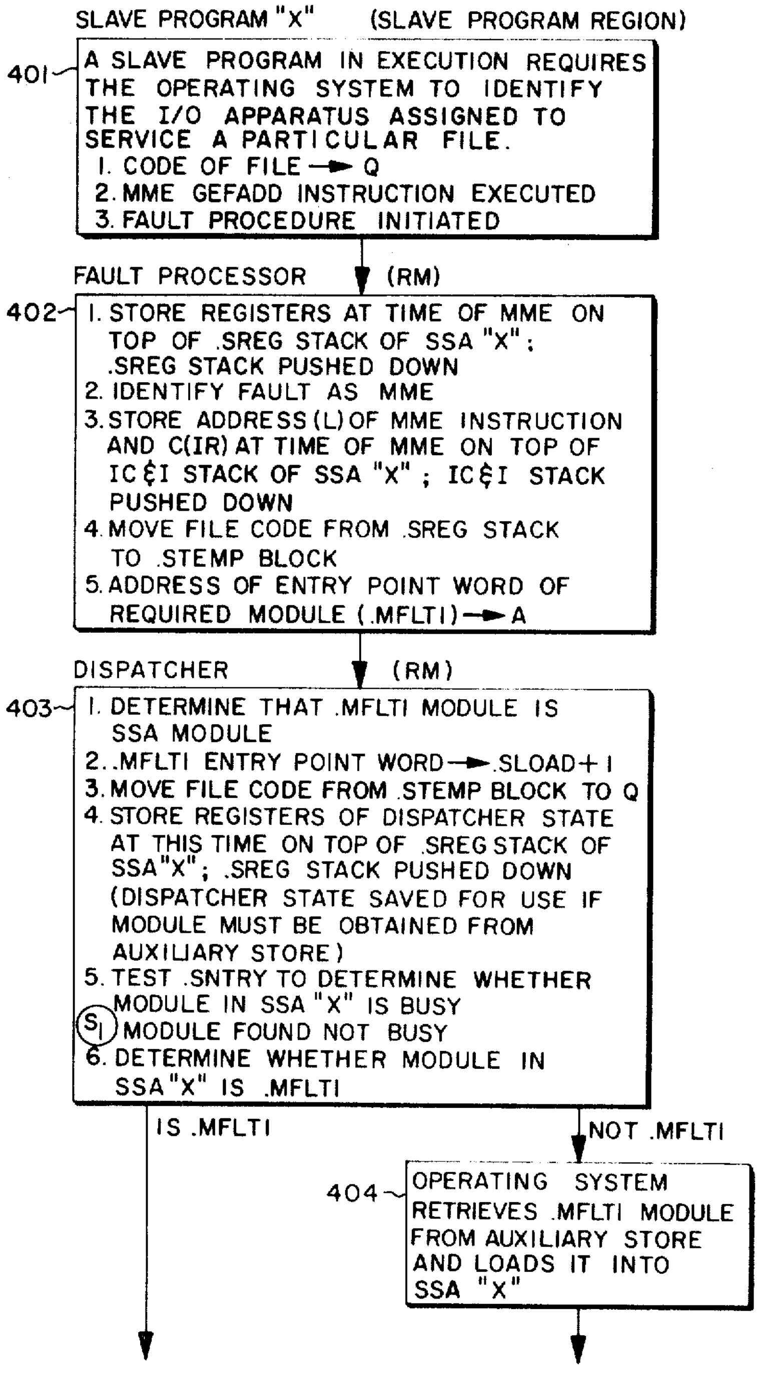
FIGS. 8*a* and 8*b* are flow charts of a first mode of operation of the instant invention.

The data processor executing slave program X requests the operating system to provide the identity of the I/O apparatus that serves a file used by the program by calling for the services of a particular SSA module, block 401 of FIG. 8*a*. First, the processor inserts the code of the file into a temporary storage device thereof, such as a register designated as the Q-register. The processor then executes an MME instruction, described earlier herein, to initiate calling up the required SSA module. The type of SSA module requested is designated by a code in bits 0–17 of the MME instruction and the MME instruction bears a corresponding descriptive name. In the instant example, the particular type of MME instruction executed is termed the MME GEFADD instruction. The code portion of the MME GEFADD instruction directs the system to call up an SSA module for obtaining the identity of the actual I/O apparatus serving a designated file. The MME instruction is one form of occurrence known as a "fault." Thus, execution of the MME instruction forces the executing data processor to enter a "fault procedure" in which the data processor automatically suspends execution of the slave program and transfers control to the Fault Processor operating system program.

The Fault Processor, permanently held in the Resident Monitor, responds to an MME instruction to suspend the slave program and then to transmit a request to the Dispatcher program of the operating system to place in execution the required SSA module, block 402. Because execution of the slave program X subsequently must be resumed from the point it is suspended, the state of the data processor at the time of execution of the MME GEFADD instruction is preserved. Accordingly, the Fault Processor stores the contents of the working registers, including the contents of the Q-register, on top of the .SREG stack of the SSA of program X, termed SSA X, and pushes down the .SREG stack. The Fault Processor also stores the address L of the MME instruction and the contents of the indicator register at the time of the MME instruction on top of the IC&I stack of SSA X, and pushes down the IC&I stack. Because different types of faults can occur, the Fault Processor now determines the type of action fault that triggered its execution. In this example the fault is identified as an MME instruction.

After identifying the current fault as an MME fault, the Fault Processor prepares to transmit a request to the Dispatcher in the Resident Monitor to place in execution the particular SSA module designated by the MME instruction. The file code entered into the Q-register at the time of the MME and now in the top entry of the .SREG stack is retrieved from the stack and inserted into the .STEMP block of SSA X for subsequent use by the SSA module. The Fault Processor next prepares, in an A-register of the data processor, the address of the particular entry point word of the required SSA module from the code in the MME instruction executed in program X. An entry point word comprises the identifying number of an SSA module and the number of an entry point into the module. The entry point number is a representation of the address within the module at which execution is to be commenced.

The Dispatcher program, which is now entered from the Fault Processor, receives each request, in the form of an entry point word, for execution of an operating system module, determines where in working storage the module is to be executed, retrieves the module from auxiliary storage if necessary, and places the module in execution in an available data processor, block 403. In the instant example, the entry point word identifies the requested SSA module as the ".MFLT1" module. The Dispatcher first determines that the .MFLT1 module is an SSA module and, therefore, is to be executed in SSA X. The entry point word for the SSA module is next inserted into the .SLOAD+1 cell of SSA X to provide a ready identity of the module to be loaded into SSA X and placed in execution. The file code of the MME request is moved from the .STEMP block of SSA X to the Q-register and then stored, with the contents of the other working registers, on top of the .SREG stack of SSA X, which is pushed down once more. The working registers are stored at this time in the event that the Dispatcher must be suspended to retrieve the required SSA module from auxiliary storage. The Dispatcher then tests the first word, the .SNTRY word, of the module currently held in SSA X to determine whether the module is in execution (busy). If the module presently in SSA X is busy, it must be suspended and preserved, as will be described in the second example. However, in the instant example the module presently in SSA X is not busy (Shd1), so that it may be overlaid by the requested SSA module. After determining that the current module in SSA X is not in execution the Dispatcher compares the number of the module to be executed, held in the .SLOAD+1 cell, with the number of the current module in SSA X, held in the .SNTRY cell.

If the module to be executed is that present in the SSA, it need not be reloaded, but may be immediately placed in execution. However, if the required module is not in the SSA, the Dispatcher relinquishes control to other elements of the operating system to provide for retrieving the module from auxiliary storage and loading the module into SSA X, block 404.

Figure 8B:
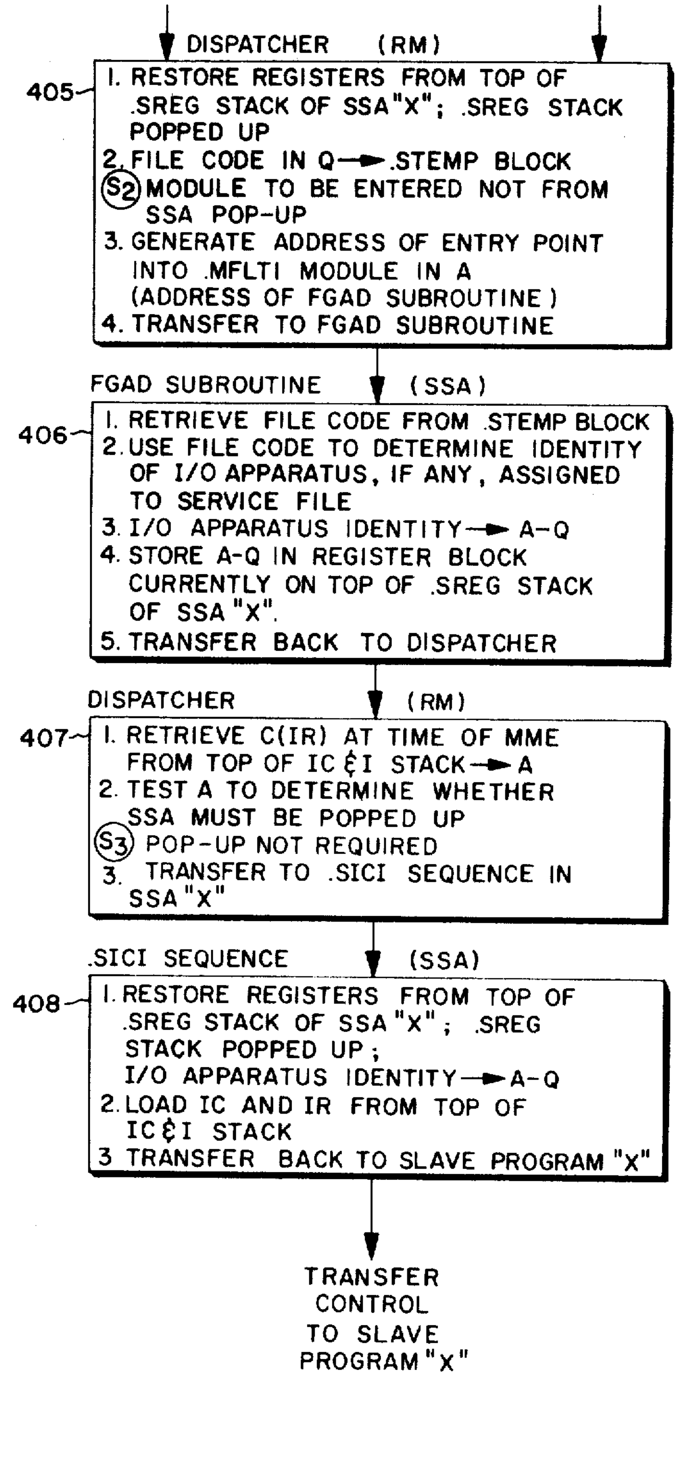

When the required module is present in SSA X, the Dispatcher proceeds to place the module in execution, block 405 of FIG. 8*b*. The processor executing the Dispatcher at this time may not be the same processor that was executing the portion of the Dispatcher shown in block 403, particularly if the SSA module had to be obtained from auxiliary storage. The Dispatcher now loads the working registers from the top entry of the .SREG stack of SSA X, which entry had been stored by the Dispatcher portion shown in block 403, and the .SREG stack is popped up. The working registers are loaded at this time to restore the state of the data processor if the Dispatcher had been suspended to retrieve the SSA module from auxiliary storage. When the working registers are loaded the file code of the MME request is loaded into the Q-register and is then moved to the .STEMP block of SSA X for subsequent use by the SSA module. The Dispatcher next determines whether the current SSA module is being placed in execution as the direct consequence of a slave program request or as a return to the module from a previous suspension thereof. The procedure by which a module is returned to after suspension will be described in the second example. In the instant example, the SSA module is being placed in execution as the direct consequence of the MME request ($S_2$). The Dispatcher therefore generates the address within the .MFLT1 module at which execution is to be commenced, in the instant example this address being the start of an "FGAD" subroutine of the .MFLT1 module. The Dispatcher then transfers control to the FGAD subroutine in SSA X.

The operating system module now in SSA X is executed to provide the specific services requested by the slave MME instruction. In the example of FIG. 8, the FGAD subroutine of the .MFLT1 module is executed to obtain for the slave program the identity of the I/O apparatus serving the particular file designated by the file code supplied by the slave program, block 406. Accordingly, the FGAD subroutine first retrieves the file code from the .STEMP block where it was stored by the Dispatcher portion shown in block 405. The file code is employed to locate a particular PAT in SSA X and the corresponding SCTs in the Resident Monitor region. From the SCTs located, the required IOC number, I/O channel number and I/O device number, where applicable, are then obtained. These I/O apparatus identities are inserted into the A- and Q-registers. The contents of these registers are stored, in turn, in the entry on top of the .SREG stack of SSA X, in preparation for transmitting this information to slave program X. Having completed its required function, the .MFLT1 module returns control to the Dispatcher in the Resident Monitor.

The Dispatcher program receives control from the terminating SSA module and prepares to return slave program X to execution from its point of suspension, block 407. The Dispatcher retrieves the indicator register contents from the top entry of the IC&I stack of SSA X. The retrieved indicator register contents are tested to determine whether the terminating SSA module had been entered from a previously suspended SSA module, in which case control must be returned to the suspended module, as will be described in the second example. Otherwise, as in the instant example the Dispatcher determines that control immediately can be transferred to slave program X ($S_3$), whereupon the Dispatcher transfers control to the ".SICI" sequence maintained in SSA X.

The .SICI sequence in SSA X returns final control for execution from the Dispatcher to slave program X, block 408. First, the .SICI sequence loads the working registers from the top entry of the .SREG stack of SSA X, which entry was made during the Fault Processor operation shown in block 402. The .SREG stack is popped up again. The working registers are loaded at this time to restore the state of the data processor to the point of suspension of slave program X, which occurred when the MME instruction was executed. The A- and Q-registers now contain the requested I/O apparatus identities, which has been inserted into the top entry of the .SREG stack during the FGAD subroutine shown in block 406. The instruction counter of the data processor now is restored to the address L+1 and the indicator register is restored to its state at the time the MME instruction was executed, both instruction counter and indicator register being loaded from the top entry of the IC&I stack. Address L+1 follows the address L of the MME instruction in slave program X. With the instruction counter, the indicator register, and the working registers restored to their conditions when the MME instruction occurred, except that the A- and Q-registers now contain the requested I/O apparatus identities, the .SICI sequence transfers control to slave program X.

EMPLOYMENT OF SSA MODULE CHAIN

An example of the operation of a chain of SSA modules in accomplishing a specific function for a slave program is shown in FIG. 9. The operation commences when a slave program, designated for convenience herein as slave program "Y," reaches a point during execution wherein it requires that additional storage space be allocated to a particular file used by program Y. The file which is selected in this example is maintained in auxiliary storage, wherein the units of storage space are termed "links." Therefore, slave program Y requests the operating system to allocate a specified number of links to the file.

Figure 9A:
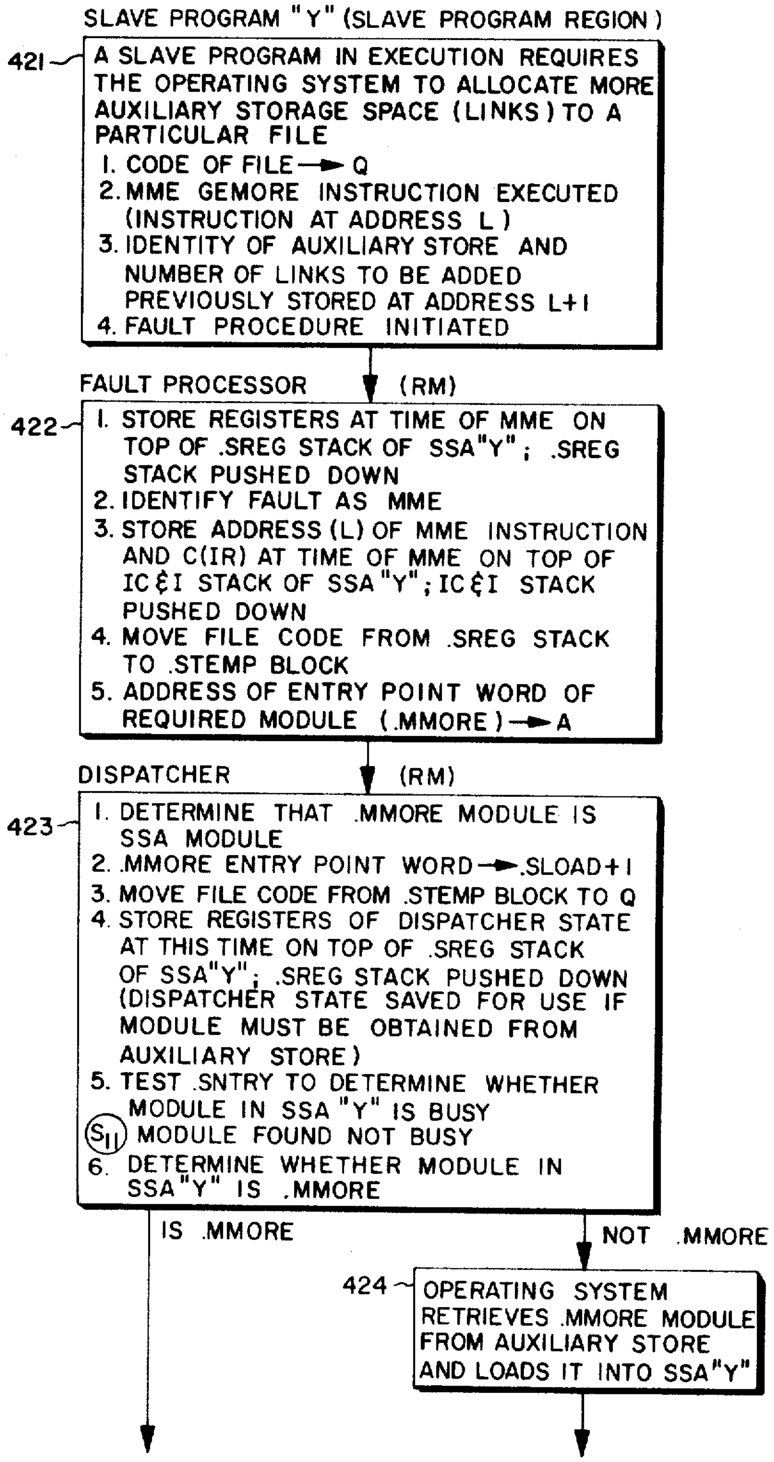
FIGS. 9*a*–9*d* are flow charts of a second mode of operation of the instant invention.

The data processor executing slave program Y requests the operating system to allocate more auxiliary storage space to a file used by the program by calling for the services of a particular SSA module, block 421 of FIG. 9*a*. First the processor inserts the code of the file into its Q-register. The processor then executes an MME instruction to initiate calling up the required SSA module. In the instant example, the particular type of MME instruction executed is termed the MME GEMORE instruction, the code portion in bits 0–17 of the MME GEMORE instruction directing the system to call up an SSA module for allocating additional storage space for the designated file. The MME instruction is located at address L of program Y. The identity of the type of apparatus, in this instance an auxiliary store, in which the file is maintained and a designation of the number of links to be added is held at address L+1 of the program. Execution of the MME instruction forces the executing data processor to enter the fault procedure, whereupon the processor suspends execution of the slave program and transfers control to the Fault Processor.

The Fault Processor responds to the MME instruction to suspend the slave program and then to transmit a request to the Dispatcher program to place in execution the required SSA module, block 422. The operation of the Fault Processor shown in block 422 is similar to its operation shown in block 402. Thus, the Fault Processor stores the necessary information representing the state of the data processor at the time of execution of the MME instruction of program Y on top of the .SREG and IC&I stacks of SSA Y, pushing down both stacks, identifies the fault as an MME instruction, inserts the file code of the file requiring allocation of space into the .STEMP block of SSA Y, and prepares in the A-register the address of the entry point word of the required SSA module.

The Dispatcher program now receives the request, in the form of the entry point word, for execution of an operating system module, determines wherein working storage the module is to be executed, retrieves the module from auxiliary storage if necessary, and places the module in execution in an available data processor, block 423. The operation of the Dispatcher shown in block 423 is similar to its operation shown in block 403. In the instant example, the entry point word identifies the requested SSA module as the ".MMORE" module. The Dispatcher determines that the .MMORE module is an SSA module, inserts the entry point word for the .MMORE module into the .SLOAD+1 cell of SSA Y, and stores the file code of the MME request with the contents of the working registers on top of the .SREG stack of SSA Y, which is pushed down once more. The Dispatcher then tests the .SNTRY word of the current module in SSA Y to determine whether the module is in execution. The module in SSA Y is found to be not in execution ($S_{11}$), whereupon the Dispatcher determines whether the module currently in SSA Y is the required .MMORE module.

If the module presently in the SSA is the .MMORE module it may be immediately placed in execution, but if it is not the .MMORE module the Dispatcher relinquishes control to other elements of the operating system to provide for retrieving the .MMORE module from auxiliary storage and loading the module into SSA Y, block 424.

Figure 9B:
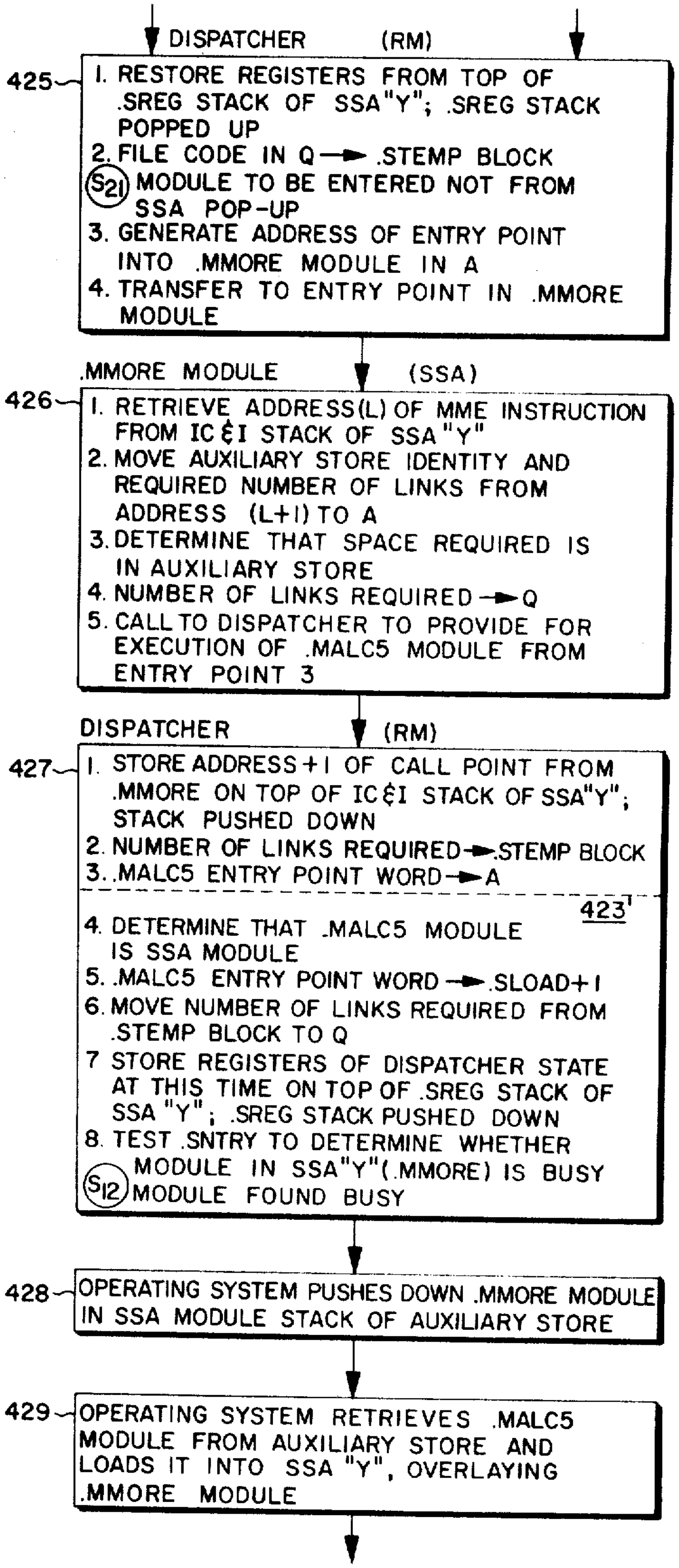

When the .MMORE module is present in SSA Y the Dispatcher proceeds to place the module in execution, block 425 of FIG. 9*b*. The operation of the Dispatcher shown in block 425 is similar to its operation shown in block 405 of FIG. 8*b*. The Dispatcher loads the working registers from the top entry of the .SREG stack of SSA Y and pops up the stack, thereby moving the file code of the MME request into the Q-register. The Dispatcher determines that the current SSA module is being placed in execution as the direct consequence of a slave program request ($S_{21}$), and not as a return to the module from a previous suspension thereof. The Dispatcher therefore generates the address within the .MMORE module at which execution is to be commenced and then transfers control to the .MMORE module in SSA Y.

The .MMORE module now in SSA Y is executed, block 426, to initiate allocation of the required additional storage space for the particular file designated by the file code supplied by slave program Y. Accordingly, the .MMORE module first retrieves the slave program address L of the MME instruction from the top entry of the IC&I stack of SSA Y and develops the address L+1. The identity of the apparatus in which the file is maintained and the designation of the amount of space required therein is retrieved from its location at address L+1 in slave program Y and transferred to the A-register. The .MMORE module then determines from the contents of the A-register that the additional file space is required in auxiliary store. Accordingly, the .MMORE module must turn to another operating system module, the ".MALC5" module, which has the particular function of allocating space in auxiliary storage. In preparation for calling the next module, the designation of the number of links required is transferred from the A-register to the Q-register. The .MMORE module then calls the Dispatcher to place in execution the .MALC5 module. The entry point word for the next-required module is held in the cell in the .MMORE module in SSA Y next-following the instruction that calls up the Dispatcher.

The Dispatcher, now entered from an SSA module requesting the execution of another operating system module, prepares to satisfy the request of the SSA module, block 427. First, the Dispatcher stores the address of the SSA Y cell which holds the entry point word of the next-required module on top of the IC&I stack of SSA Y, and the stack is pushed down. The designation of the number of links required is moved from the Q-register to the .STEMP block and the entry point word for the next-required module is moved from SSA Y to the A-register.

The Disptacher next performs a series of operations similar to the operations in block 423; therefore, these operations are designated also by the reference numeral 423' within block 427. Thus, the Dispatcher determines that the .MALC5 module is an SSA module, inserts the entry point word for the MALC5 module into the .SLOAD+1 cell of SSA Y, and stores the designation of the number of links required with the contents of the working registers on top of the .SREG stack of SSA Y, which is pushed down once more. The Dispatcher then determines from the .SNTRY word of the .MMORE module in SSA Y that the .MMORE module is currently in execution ($S_{12}$). Therefore, the .MMORE module presently in SSA Y must be preserved in its current form before it may be overlaid in SSA Y by the next-required module.

Figure 10:
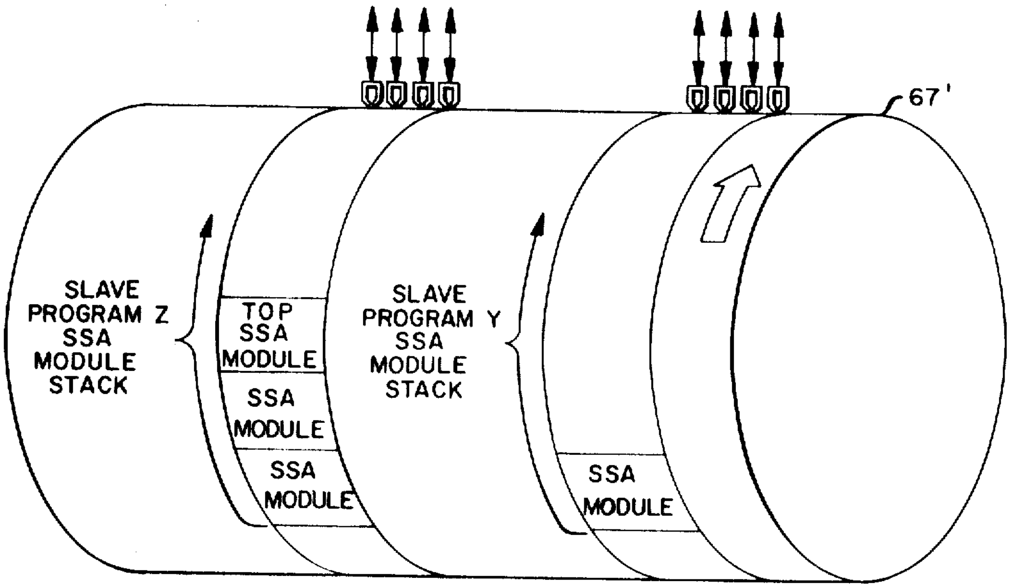
FIG. 10 is a diagram of the organization of a portion of auxiliary storage in the instant invention.

The Dispatcher relinquishes control to other elements of the operating system to preserve the .MMORE module by storing the module on top of an SSA module stack in auxiliary storage, block 428. SSA module stacks are shown in schematic form in a magnetic drum-type of auxiliary store 67', shown in FIG. 10. A slave program pushdown file in auxiliary storage is assigned to each program scheduled for execution. An SSA module pushdown stack is maintained in each slave program pushdown file and holds SSA modules which are suspended while performing services for the corresponding slave program. Each suspended SSA module that is stored in an SSA module stack comprises one entry therein and the last entry made in each such stack is considered the "top" entry of the stack. In the instant example, the .MMORE module is stored on top of the SSA module stack of program Y, and then the stack is pushed down.

After preserving the .MMORE module in the .SSA module stack of program Y, the operating system retrieves the .MALC5 module from another portion of auxiliary storage and loads the .MALC5 module into SSA Y, overlaying the .MMORE module therein, block 429 of FIG.9*b*.

Figure 9C:
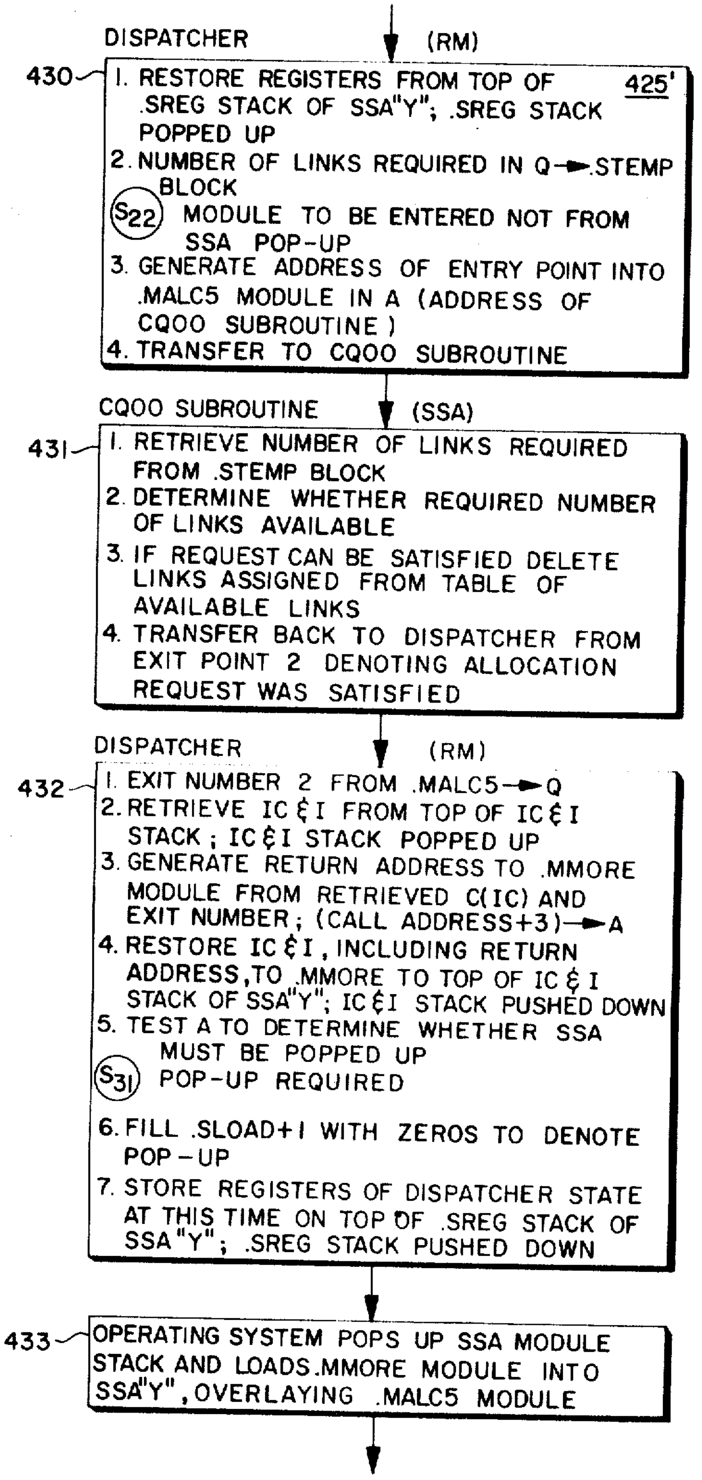

When the .MALC5 module is present in SSA Y the Dispatcher proceeds to place the module in execution, block 430 of FIG. 9*c*. The operation of the Dispatcher shown in block 430 is similar to its operation shown in block 425 of FIG. 9*b*; therefore, the operations of block 430 are designated also by the reference numeral 425' within block 430. Thus, the Dispatcher loads the working registers from the top entry of the .SREG stack of SSA Y and pops up the stack, thereby moving the designation of the number of links required into the Q-register. The Q-register contents are then moved to the .STEMP block of SSA Y. The Dispatcher determines that the current SSA module is being placed in execution as a direct consequence of an SSA module request ($S_{22}$), and not as a return to the module from a previous suspension thereof. The Dispatcher therefore generates the address within the .MALC5 module at which execution is to be commenced, in the instant example, this address being the start of a "CQ00" subroutine of the .MALC5 module. The Dispatcher then transfers control to the CQ00 subroutine in SSA Y.

The CQ00 subroutine of the .MALC5 module now in SSA Y is executed, block 431, to allocate the amount of space in auxiliary store requested by the .MMORE module. Accordingly, the CQ00 subroutine first retrieves the designation of the required number of links from the .STEMP block and inspects a table of auxiliary storage space to determine whether a sufficient number of links is available to satisfy the request. In the instant example, the CQ00 subroutine finds sufficient space available to satisfy the request, and thereupon enters indicia into the table to denote that the requested number of links have been assigned. If the requested space was found not to be available, an appropriate notification is provided by the .MALC5 module for transmittal to the requesting program, such operation not being shown in the instant example. Having completed its required function, the .MALC5 module returns control to the Dispatcher from a point in the module representing satisfaction of the request, designated as exit point #2.

The Dispatcher program receives control from the terminating .MALC5 module and prepares to return a suspended slave program or module to execution, block 432. The operation of the Dispatcher shown in block 432 is similar to its operation shown in block 407 of FIG. 8*b*. The Dispatcher first inserts the .MALC5 exit point number from which the Dispatcher was entered into the Q-register. Next, the top entry is retrieved from the IC&I stack and inserted into the A-register and the stack is popped up. A portion of the entry in the A-register comprises the cell address next-following that of the .MMORE instruction in SSA Y that called up the Dispatcher, block 427 of FIG. 9*b*, and a portion comprises the indicator register contents of the data processor executing the .MMORE module when the Dispatcher was called. The .MALC5 exit point number in the Q-register is added to the address portion in the A-register for providing therein an address for returning to the .MMORE module. In the instant example, the return address generated is that of the third cell following the address of the .MMORE instruction that called up the Dispatcher and provides notification that the .MMORE request was satisfied by the .MALC5 module. A representation of the newly generated return address and the indicator register contents in the A-register are transferred to the top of the IC&I stack, and the stack is pushed down once again. The indicator register contents in the A-register now are tested to determine whether the terminating SSA module had been entered from a previously suspended SSA module. In the instant example, the Dispatcher determines that the terminating .MALC5 module had been entered from a previously suspended SSA module ($S_{31}$), so that control must be returned to the suspended module.

Following the determination that control must be returned to a suspended SSA module, the Dispatcher prepares for retrieving the top module from the SSA module stack of program Y. The .SLOAD+1 cell of SSA Y is loaded with zeros to denote that instead of a particular SSA module being loaded into SSA Y, whichever module is on top of the SSA module stack of program Y will be used. The contents of the working registers of the data processor executing the Dispatcher at this time are stored on top of the .SREG stack of SSA Y and the stack is pushed down again.

The Dispatcher now relinquishes control to other elements of the operating system to retrieve the top module from an SSA module stack, block 433. In the instant example, the top entry of the SSA module stack of program Y, which is the suspended .MMORE module, is retrieved from the stack and loaded into SSA Y and the stack is popped up.

Figure 9D:
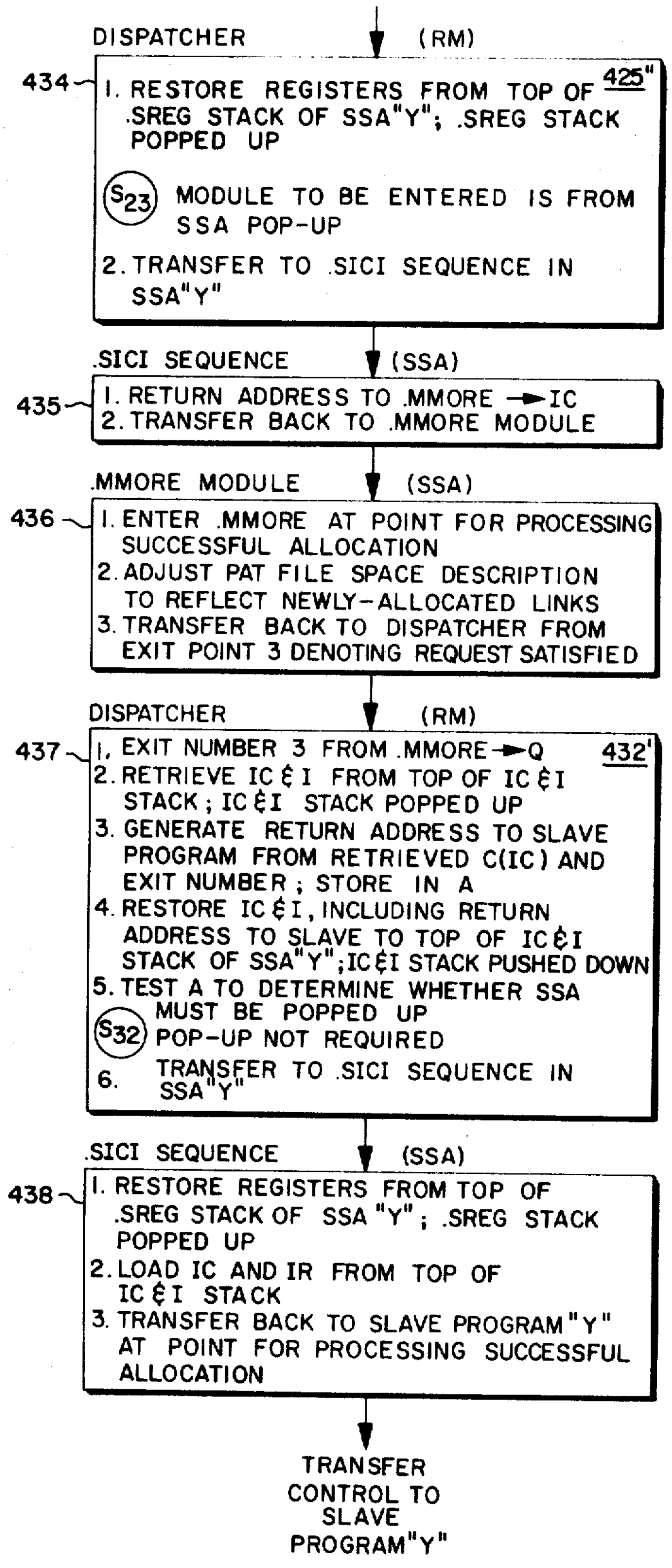

When the suspended .MMORE module is once again present in SSA Y, the Dispatcher proceeds to place the module in execution, block 434 of FIG. 9*d*. The operation of the Dispatcher shown in block 434 is similar to its operation shown in block 425 of FIG. 9*b*; therefore the operations of block 434 are designated also by the reference numeral 425″ within block 434. Thus, the Dispatcher loads the working registers from the top entry of the .SREG stack of SSA Y and pops up the stack. The Dispatcher determines that the current SSA module is being returned to execution from a previous suspension thereof and has been loaded by popping up the SSA module stack of program Y ($S_{33}$). Accordingly, the Dispatcher transfers control to the .SICI sequence maintained in SSA Y.

Execution of the .MMORE module now resumes, block 436, for adjusting the management information in SSA Y to represent the increase in file space provided by the .MALC5 module. Accordingly, control for execution is returned to the .MMORE module at a point therein which provides the operations required after successful allocation of the requested additional storage space, this return point being the instruction represented by the return address loaded into the instruction counter in the .SICI sequence. The .MMORE module now adjusts the PAT of the file for which additional storage space was allocated to reflect the additional number of links added to the file storage space in the auxiliay store. After completing its required function, the .MMORE module returns control to the Dispatcher from a point in the module representing satisfaction of the request of the slave program, designated as exit point#3.

The Dispatcher program receives control from the terminating .MMORE module and prepares to return the suspended slave program Y to execution, block 437. The operation of the Dispatcher shown in block 437 is similar to its operation shown in block 432; therefore, the operations of block 437 are designated also by the reference numeral 432′ within block 437. Thus, the Dispatcher first inserts the .MMORE exit point number from which the Dispatcher was entered into the Q-register. Next, the top entry is retrieved from the IC&I stack and inserted into the A-register and the stack is popped up. A portion of the entry in the A-register comprises the address L of the MME GEMORE instruction previously executed by slave program Y and a portion comprises the indicator register contents of the data processor executing program Y when the MME GEMORE instruction was encountered. The .MMORE exit point number in the Q-register is added to the address portion in the A-register for providing therein an address for returning to slave program Y. In the instant example, the return address generated is that of the third cell following the address of the MME GEMORE instruction, address L+3, and provides notification that the slave program request for additional storage space has been satisfied. A representation of the newly generated return address and the indicator register contents in the A-register are transferred to the top of the IC&I stack, and the stack is pushed down once again. The indicator register contents in the A-register now are tested to determine whether the terminating SSA module had been entered from a previously suspended SSA module. In the instant example, the Dispatcher determines that control immediately can be transferred to slave program Y($S_{32}$), whereupon the Dispatcher transfers control to the .SICI sequence maintained in SSA Y.

The .SICI sequence in SSA Y returns final control for execution from the Dispatcher to slave program Y, block 438. First, the .SICI sequence loads the working registers from the top entry of the .SREG stack of SSA Y, which entry was made during the Fault Processor operation shown in block 422. The .SREG stack is popped up again. The working registers are loaded at this time to restore the state of the data processor to the point of suspension of slave program Y, which occurred when the MME GEMORE instruction was executed. The instruction counter of the data processor now is loaded with the return address L+3 and the indicator register is restored to its state at the time the MME instruction was executed, both instruction counter and indicator register being loaded from the top entry of the IC&I stack. With the instruction counter loaded, and with the indicator register and working registers restored to their conditions when the MME instruction occurred, the .SICI sequence transfers control for execution to a point in slave program Y which relies on the completed allocation of the requested file storage space.

DATA PROCESSOR

A more detailed description of a Data Processor useful in the system of FIG. 1 for practicing the instant invention will now be provided. The Data Processor to be described is that disclosed in the above-referenced patent application of F. B. Banan et al. and in U.S. Pat. No. 3,413,613 to D. L. Bahrs et al. for RECONFIGURABLE DATA PROCESSING SYSTEM, such patent being assigned to the assignee of the instant application.

Figure 11A:
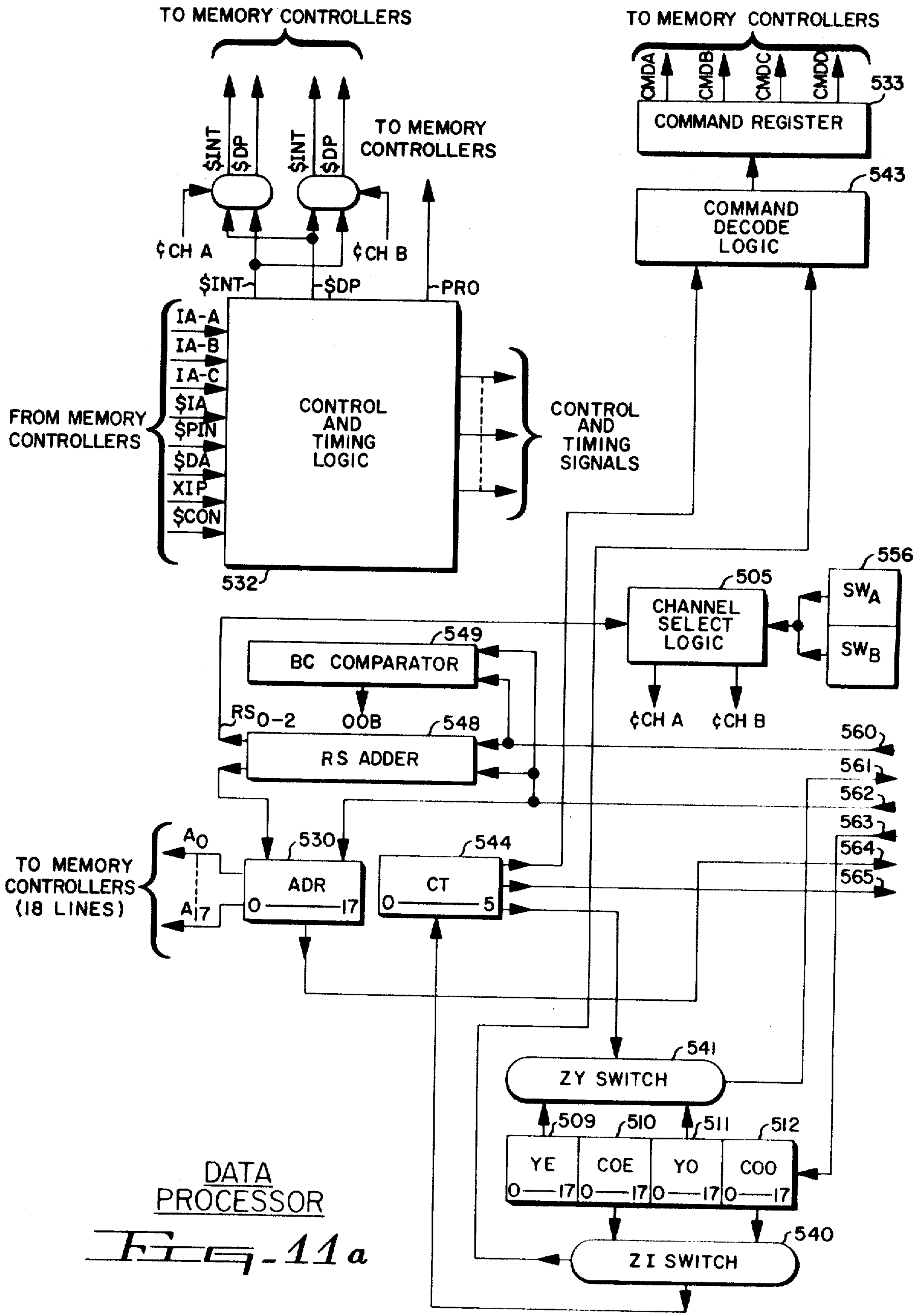
FIGS. 11*a* and 11*b* are block diagrams of a Processor useful in the system of FIG. 1.
Figure 11B:
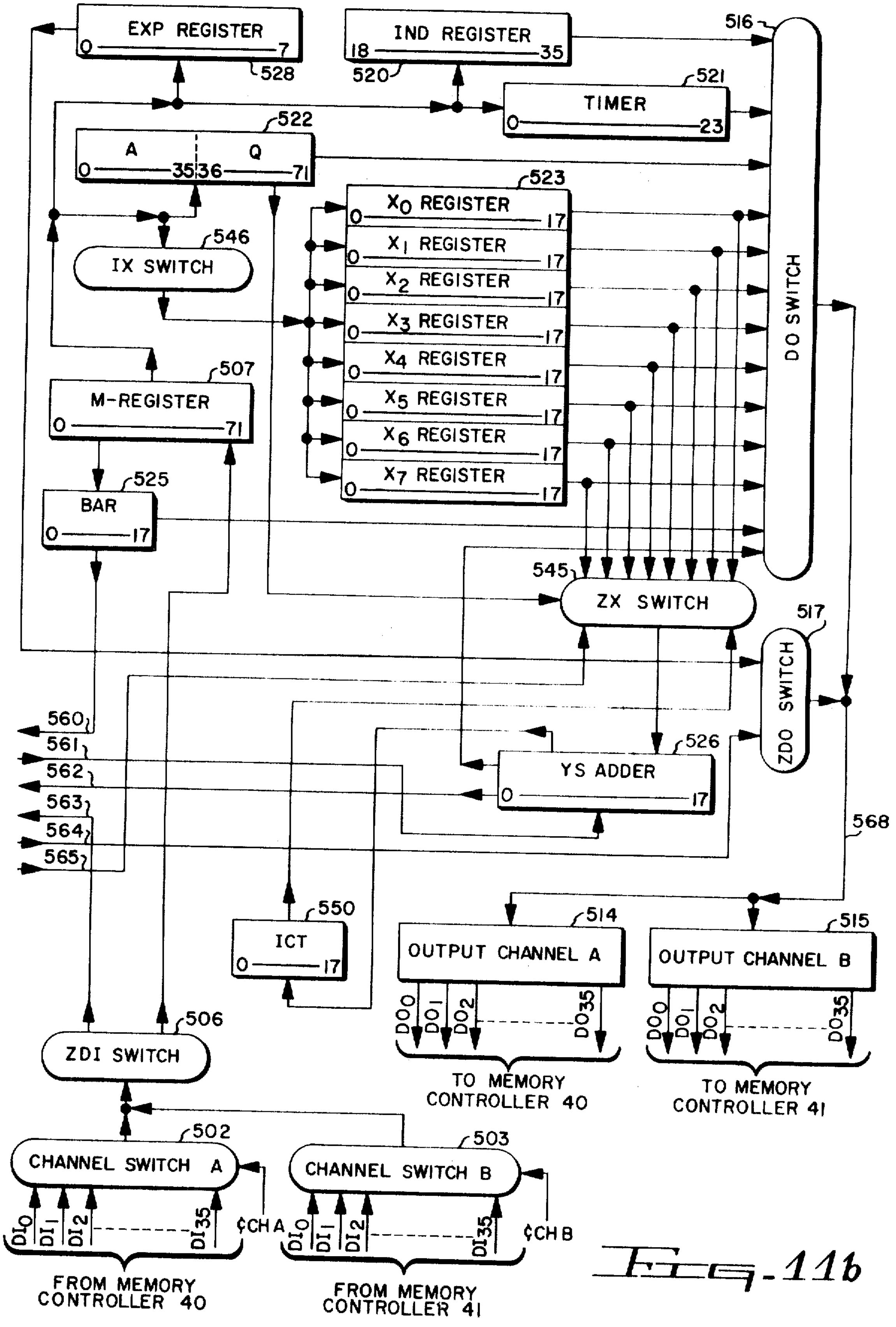

The Data Processor of FIG. 11 responds to the succession of instructions comprising a program or module to perform a particular data processing operation on information received thereby. The Processor is coupled to communicate selectively with Memory Controllers 40 and 41, FIG. 1, to receive data words from or transmit data words to respective Memories 20 and 21 of working storage. Accordingly, the Processor receives data words representing information to be processed and data words representing instructions of the programs and modules from a memory of working storage and transmits data words representing information which is the result of processing to a memory of working storage.

A data word is received by the Processor of FIG. 11 from a Memory Controller 40 or 41 through a selected one of channel switches 502 or 503. A data input bus having 36 lines transmits signals representing the 36 bits of a data word from each Memory Controller to a respective one of channel switches 502 and 503. The lines of the data input bus are designated respectively as the $DI_0$–$DI_{35}$ lines. One of two channel select signals, ¢ChA or ¢ChB, is generated by Channel Select Logic 505 and coupled to the channel switches for enabling a respective one of switches 502 or 503 to transfer a data word therethrough. The data word passed by the selected channel switch is transferred through a ZDI switch 506 to either an M-Register 507 or to selected ones of instruction registers 509–512.

A data word is transmitted by the Processor to Memory Controllers 40 and 41 through a pair of output channels 514 and 515. A data output bus having 36 lines transmits signals representing the 36 bits of a data word from each of output channels 514 and 515 to a respective Memory Controller. The lines of the data output bus are designated respectively as the $DO_0$–$DO_{35}$ lines. Information is transferred to output channels 514 and 515 for transmission thereby through either a DO switch 516 or ZDO switch 517. The DO switch 516 receives information from one or more of an Indicator Register 520, a Timer 521, one of the two registers of an Accumulator 522, one of a plurality of Index Registers 523, a Base Address Register (BAR) 525, and a YS Adder 526. The ZDO switch 517 receives information from either an Exponent Register 528 or an Address Register (ADR) 530.

Control of the transfer of data words between the Processor and the memories is effected by the transmittal of a number of different signals between Processor and Memory Controllers. The aforementioned ¢ChA and ¢ChB signals select the one of the Memory Controllers with which the Processor is to communicate. Communication between the Processor and the Memory Controllers is requested and coordinated by a first set of control and acknowledgment signals which are transmitted from Control and Timing Logic 532 to the Memory Controllers and by a second set of control and acknowledgment signals which are transmitted from the Memory Controllers to Logic 532. An interrupt ($INT) signal is generated by Logic 532 when the Processor requires access to a memory. The ($INT) signal is enabled for transmittal to the Memory Controller that corresponds to the one of signals ¢ChA or ¢ChB that is generated. The $INT signal functions as a request for access to a memory connected to the recipient Memory Controller. The significance of the other signals transmitted and received by Logic 532 is set forth in the aforementioned patent and patent application. An address bus having 18 lines transmits signals representing the 18 bits of a memory address in the ADR-Register 530 to the two Memory Controllers. The lines of the address bus are designated respectively as the $A_0$–$A_{17}$ lines. The address of the particular working storage location to which the Processor requests access is held in the ADR-Register. A memory command bus having 4 lines transmits signals representing the 4 bits of a memory command code in a Command Register 533 to the two Memory Controllers. The lines of the memory command bus are designated respectively as the CMDA, CMDB, CMDC, and CMDD lines. A memory command code representing the particular type of memory operation required when a Processor requests access to a memory, such as a read or write operation, is held in the Command Register.

A Processor requests that a Memory Controller retrieve a data word from a Memory and transmit it to the Processor by generating an interrupt control signal in Logic 532, transmitting the address of the data word from the ADR-Register 530, and transmitting a memory command code from Register 533 which represents the required memory read operation. Logic 505 generates either a ¢ChA or ¢ChB signal to enable transmittal of the INT signal to the selected Memory Controller. The Memory Controller selected by Logic 505 receives the INT signal and, when free, it accepts the address and memory command code and directs the connected Memory to initiate the read operation designated by the command code. After the Memory Controller accepts the address and command code, the Processor is released to develop another address and store it in the ADR-Register in preparation for the Processor's next memory request. When the Memory Controller receives the data word from the memory location specified by the address, it transmits the data word to the Processor on an input bus to the corresponding one of channel switches 502, or 503.

A Processor requests that a Memory Controller receive a data word supplied by the Processor and store it in a Memory by transmitting the same type of signals provided to the Memory Controller during the memory read operation and by supplying output data word signals at output channels 514 and 515. In this instance, however, the memory command code transmitted represents a memory write operation. When the selected Memory Controller accepts the address and command code, it directs the connected Memory to initiate the write operation designated by the command code. Although, as above, the Processor is released to develop another address after acceptance of the address and command code by the Memory Controller, the output information must be held in each register that is coupled to output channels 514 and 515 by switches 516 and 517 until Logic 532 receives a signal acknowledging receipt and storage of the data word supplied by the Processor.

The operation of the Processor is controlled through its execution of a succession of instructions entered into the instruction registers 509–512. The four instruction registers each hold 18 bits and are designated respectively as the YE-Register 509, the COE-Register 510, the YO-Register 511, and the COO-Register 512. In normal operation of the Processor, instruction words are received in pairs from a Memory and both instructions of each pair are loaded into registers 509–512 when the pair is received. The first instruction of the pair which is received by the Processor is stored in an even-address cell in working storage and the second is stored in an adjacent odd-address cell. The address portion of the first-received, "even," instruction of a pair is entered into the YE-Register and its command portion is entered into the COE-Register. Similarly, the address portion of the second-received, or "odd," instruction of a pair is placed in the YO-Register and the command portion is placed in the COO-Register. When both the even and odd instructions are executed, the even instruction is executed first. In some instances, only the even instruction is executed before the next instruction pair is obtained.

Each different type of instruction when executed controls the Processor to perform a corresponding function. A particular function performed by the Processor is determined by the order part of the command portion of the instruction. The command portion comprises bits 18–35 of the instruction and the order part of the command portion comprises bits 18–26. Each of the order parts consists of a different configuration of bits 18–26 and, therefore, is also known as an "operation code." Bit 28 of the instruction is employed to prevent interruption of the program being executed by the Processor. Therefore, bit 28 is termed an "inhibit interrupt" bit and is effective to prevent interruption of the program when it represents a binary 1. Bits 30–35 represent the aforementioned "tag" of the instruction, which designates an operation for modifying the address portion of the instruction and a particular register for use in the address modification.

The address portion comprises bits 0–17 of the instruction. Normally, the address portion represents the location of a cell in working storage from which a data word is to be retrieved for the Processor to perform a function thereon, as directed by the operation code of the instruction, or represents the location of a cell into which a processed data word is to be written. In some types of instructions, the address portion represents the location of a cell holding another instruction to which control is to be transferred in the program sequence. In yet another type of instruction, the address portion represents information to be used directly in the processing function.

Each different function controlled by an instruction in the Processor comprises a series of steps executed in succession. The different steps and the order in which they take place are determined by the particular control and timing signals generated and distributed throughout the Processor by Logic 532 (such distribution not being shown in FIG. 11) and the order in which such signals are generated. For each different instruction, the combination of control and timing signals which are generated and their sequence of occurrence is unique, and Logic 532 is controlled to generate such signals and sequence by the particular operation code of the instruction in execution.

The instruction registers 509–512 are connected to receive instructions from the ZDI-switch 506, which instructions are transmitted from the Memory Controllers to the ZDI-switch. The instruction registers are connected to transmit different portions of the instructions held therein through a ZI-switch 540 and a ZY-switch 541 to other components of the Processor. Thus, the address portions in the YE- and YO-Registers are selectively transmitted by the ZY-switch to the YS-Adder 526, the operation codes of the command portions in the COE- and COO-Registers are selectively transmitted by the ZI-switch to Command Decode Logic 543, and the tags of the command portions in the COE- and COO-Register are selectively transmitted by the ZI-switch to a CI-Register 544. The particular information transmitted by the ZI- and ZY-switches and the moment they are enabled for transmission are controlled by the control and timing signals generated by Logic 532. Other information transfers in the Processor are similarly controlled.

The registers of the Processor, other than the instruction registers, are provided for the temporary storage of information during execution of the various programs and modules. The aforementioned Indicator Register 520 holds 18 bits representing various results and states of a program which has been in execution. The 18 bits in the Indicator Register are designated respectively as bits 18–35. For example, a binary 1 in the bit 18 position of the Indicator Register denotes that a zero result was generated during a preceding instruction; a binary 1 in bit 19 position denotes that a negative result was generated during a preceding arithmetic instruction; a binary 1 in the bit 20 position denotes that a carry or borrow was generated during a preceding arithmetic instruction; a binary 1 in the bit 21 position denotes that the result generated during a preceding instruction was too large for the recipient register; a binary 1 in the bit 28 position denotes that the program represented is to be executed in the "master mode," wherein the represented program can address any cell in working storage and can execute the complete repertory of instructions of the Processor (otherwise operation is said to take place in the "slave mode"); a binary 1 in the bit-34 position denotes that the SSA module stack of the represented program has been pushed down by insertion of an SSA module entry; and a binary 1 in the bit-35 position denotes that the working registers of a processor executing the represented program have been previously stored in a register stack. Therefore, bit-position 18 of the Indicator Register is termed the "zero indicator," bit position 19 the "negative indicator," bit position 20 the "carry indicator," bit position 21 the "overflow indicator," and bit position 28 the "master mode indicator." An indicator bit is said to be "turned on" when it becomes a binary 1 and "turned off" when it becomes a binary 0. The individual indicator bits are independently turned on and off by control signals not shown in FIG. 11. Indicator Register 520 is connected to receive information from M-register 507 and to transmit its contents to DO-switch 516.

Timer 521 is a 24-bit register connected to count regularly occurring timing signals and thereby to represent the passage of time. The Timer is employed for interrupting a slave program that continues in execution for an interval greater than an allotted period of time, which period is represented by a value loaded into the Tier when execution of the slave program commences. Timer 521 is connected to receive a time interval representation from the M-register and to transmit its contents to the DO-switch.

The Accumulator 522 holds 72 bits, providing general temporary storage of a pair of data words being processed or storing other information as required by the program. The most significant 36 bit positions of the Accumulator, bits 0–35, are designated as the A-register, and the least significant 36 bit positions, bits 36–71, are designated as bits 0–35 of the Q-register. The entire Accumulator Register is also termed herein the A–Q register. Accumulator Register 522 is connected to receive selectively a data word for either the A- or Q-registers thereof from M-register 507. The Accumulator Register is connected to transmit selectively the contents of the A- or Q-registers to DO-switch 516 and to a ZX-switch 545.

Exponent Register 528 holds 8 bits, which represent the exponent of a number during floating-point arithmetic operations. The Exponent Register is connected to receive information from M-register 507 and to transmit its contents to ZDO-switch 517.

M-register 507 holds 72 functioning as a buffer to hold data words received from working storage prior to their transfer to other registers for processing. The M-register is connected to receive a pair of data words from ZDI-switch 506, and to transmit selectively all or a portion of its contents to Accumulator 522, Indicator Register 520, Timer 521, BAR 525, Exponent Register 528 and IX-switch 546.

Base Address Register (BAR) 525 holds 18 bits, which represent the base address of the slave or privileged slave program in execution in the Processor and the number of 1K blocks assigned to the program, the number of 1K blocks being employed as a bounds check for the program. The address of the base cell of a slave program is represented by bits 0–8 and the bounds check comprises bits 9–17. Although a complete address comprises 18 bits, bits 0–8 of the BAR are adequate to represent a base address because, as described previously, the base cell address is always an integral multiple of 1,024. Therefore, bits 9–18 of the base address are always binary zeros and need not be expressly represented. BAR 525 is connected to receive information from M-register 507, to transmit its entire contents to DO-switch 516 and to transmit the base address portion of the contents to an RS-Adder 548 and the bounds check portion of the contents to a BC-Comparator 549.

Each of the eight Index Registers 523 holds 18 bits, providing storage for either a value for modifying an address or for a complete address used in a transfer, or branch, operation. The Index Registers are designated respectively as the X0–X7 Registers. The Index Registers are connected to receive information from IX-switch 546, which directs information received from the M-register to a selected one of the Index Registers. Each Index Register is connected to transmit its contents to DO-switch 516 and to ZX-switch 545.

An Instruction Counter (ICT-Register) 550 is an 18-bit register connected to function as a counter, the contents of the register representing the address of the next instruction to be executed. The ICT-Register is connected to receive information representing an address from the YS-Adder and to transmit its contents to the ZX-switch.

ADR-Register 530 holds 18 bits, which represent the absolute, or actual, address of the memory cell from which a data word is to be retrieved or into which a data word is to be stored whenever the Processor requests access to a Memory. In the master mode of operation the ADR-Register is coupled to receive the entire 18 bits of an address from YS-Adder 526, whereas in the slave mode the ADR-Register is coupled to receive bits 0–8 of the address from RS-Adder 548 and bits 9–17 of the address from the YS-Adder. The ADR-Register normally transmits the address contents thereof to the Memory Controllers, but it is also connected to transmit its contents to the ZDO-switch.

CT-Register 544 holds 6 bits, which represent the tag of the instruction in execution. The CT-Register is connected to receive a tag from ZI-switch 540, which selectively transmits a tag from either the COE- or COO-Registers. The CT-Register is connected to transmit its contents to ZY-switch 541, Command Decode Logic 543, and ZX-switch 545.

ZX-switch 545 selects input information for YS-Adder 526. Thus, the ZX-switch is connected to receive the contents of the eight Index Registers 523, the contents of the Instruction Counter 550, the contents of Accumulator 522, and the contents of CT-Register 544. The ZX-switch is connected to transmit selectively contents of one of the registers connected thereto to the YS-Adder.

YS-Adder 526 is a general-purpose arithmetic device employed for address modification and for the general arithmetic operations required during data processing. The YS-Adder is connected to receive the contents of a selected one of the eight Index Registers, the ICT-Register, the Accumulator, and the CT-Register through ZX-switch 545, and the contents of a selected one of the YE- and YO-Registers through ZX-switch 541. Accordingly, the YS-Adder is adapted to deliver a signal set representing an 18-bit address received from the YE-, YO-, or ICT-Registers without modification or to deliver a signal set representing an 18-bit address formed by adding the contents of an Index Register to the address received from the YE- or YO-Registers. When the signal set delivered by the YS-Adder represents an address, this address is termed the effective address. In the master mode the effective address represents the absolute address of a working storage cell. In the slave mode the effective address represents a relative address within a slave or privilege slave program, the relative address representing the displacement of the represented cell relative to the base cell of the program. Each relative effective address is converted to an absolute address by the addition of the contents of $BAR_{0-8}$ to the effective relative address in the RS-Adder. The YS-Adder can also perform other arithmetic operations on various combinations of the registers connected to the ZX- and ZY-switches. Although not shown in FIG. 11, the YS-Adder is also connected to receive the output signals delivered by the ZDI-switch and, therefore, the YS-Adder can perform further arithmetic operations by combining data words received directly from working storage with the contents of the registers connected to the ZX- and ZY-switches. The YS-Adder is connected to transmit the entire signal set delivered thereby to the DO-switch and the ICT-Register and to transmit bits 0–8 of the signal set to the RS-Adder and the BC-Comparrator. The YS-Adder is also connected to transmit selectively either the entire delivered signal set or only bits 9–17 thereof to the ADR-Register.

RS-Adder 548 is an arithmetic device for computing the absolute address of memory cells to which the Processor requests access during operation in the slave mode. In the mastermode of operation the addresses delivered by the YS-Adder are absolute cell addresses, so that the RS-Adder performs no arithmetic operation. In the slave mode the RS-Adder converts the relative addresses delivered by the YS-Adder to absolute addresses by combining the relative addresses with the base cell address represented in BAR 107. This address conversion is effected in the RS-Adder by the combination of the nine most significant bits of the relative address with bits 0–8 of the BAR contents. Accordingly, the RS-Adder is connected to receive a signal set representing bits 0–8 of the relative address delivered by the YS-Adder and a signal set representing bits 0–8 of the BAR contents, to combine these two signal sets during the slave mode to produce a signal set representing the sum thereof, and to transmit the sum signal set to the ADR-Register during the slave mode. The RS-Adder also transmits bits 0–2 of its output signal set to Channel Select Logic 505.

BC-Comparator 549 checks all relative addresses delivered by the YS-Adder to assure that they do not exceed a prescribed memory boundary for the slave program in execution. Therefore, the BC-Comparator is coupled to receive the bound check (bits 9–17) from BAR 525 and bits 0–8 of each relative address delivered by the YS-Adder. The BC-Comparator compares the bound check with bits 0–8 of the relative address. If the compared portion of the relative address is equal to or greater than the bound check the relative address has exceeded the prescribed boundary and is in error. When an error is detected, the BC-Comparator delivers an OOB control signal to notify other control elements in the Processor that the relative address has exceeded its prescribed boundary.

Command Decode Logic 543 receives the operation code portions of the COE- and COO-Register contents and interprets these operation codes to generate a memory command code representing the type of operation required of the Memory for the instruction in execution. Accordingly, Logic 543 is connected to receive information from the ZI-switch, which selectively directs the operation codes held in the COE- and COO-Registers to Logic 543. The memory command code required for the operation code received is transmitted by Logic 543 to Command Register 533. Logic 543 is also connected to receive the tag contents of CT-Register 544 for selecting certain portions of the data words to be retrieved from memory; however, an explanation of this function is not necessary to an understanding of the instant invention.

As described previously, Channel Select Logic 505 generates either a ¢CHA or ¢CHB channel select signal for selecting the respective one of Memories 20 or 21 to which the Processor is to be given access. The addresses of all the cells of working storage are a succession of numbers commencing with the address "0" and continuing through successively increasing integers to represent each cell of the working store, whether it is in Memory 20, or 21. In the instant embodiment, Memory 20 has been selected to comprise the lower numbered cells and Memory 21 the higher numbered cells. Therefore, the absolute address supplied to the ADR-Register represents a cell in either Memory 20 or 21. Logic 505 employs the most significant portion of the absolute address for selecting the one of the Memories to which the Processor is to be provided access.

A switch block 556 determines which of Memories 20 and 21 is to be identified by the lower numbered addresses and which by the higher numbered addresses. Switch block 556 comprises two switch parts, $SW_A$ and $SW_B$. Each of the $SW_A$ and $SW_B$ parts comprises a manually setable switch, which is preset according to the desired address representations of the cells of Memories 20 and 21. Block 556 delivers a group of signals representing the aggregate setting of the switches thereof. Thus, the signals delivered by block 556 denote those absolute addresses which are to be transmitted to Memory Controller 40 to provide access to Memory 20 and those which are to be transmitted to Memory Controller 41 to provide access to Memory 21.

Channel Select Logic 505 generates a channel select signal in response to the absolute address, under control of the signals delivered by switch block 556. Therefore, Logic 505 is connected to receive the output signal group of block 556 and signals representing the three most significant bits of the absolute address portion delivered by the RS-Adder. Logic 505 compares these three address signals with the signal group provided by block 556 and generates one of the channel select signals, ¢CHA or ¢CHB, according to the results of comparison. The particular channel select signal generated provides the Processor with access to the Memory represented by the absolute address delivered to the ADR-Register.

OPERATION OF SLAVE SERVICE AREA—DETAILED

The operation of the Slave Service Area, previously described herein in summary form in connection with FIGS. 8 and 9, will now be described in detail. The description to follow illustrates the operation of the Slave Service Area under the control of a Processor which is executing in sequence the individual instructions of the programs and modules involved. To simplify the ensuing description and the accompanying figures of the drawing, the particular function of each different instruction that is referenced in the description will be presented first.

INSTRUCTION FUNCTIONS

Each instruction is designated by a mnemonic, which is a representation of the function the Processor performs in response to the operation code of the instruction. The address portions of the different instructions are used in different manners. An address portion which is used to designate a working storage cell from which a data word is to be retrieved for processing or into which a processed data word is to be inserted for storage will be termed an "operand address" herein, and the data word retrieved from or stored in the addressed cell will be designated as the "operand." An address portion which is used to provide control information for the Processor to augment the operation code will be termed a "control address." An address portion which is used as an operand will be termed a "direct operand." An address portion which is used to designate the working storage cell holding another instruction to which control of the program may be transferred will be termed a "transfer address." Finally, an address portion which is used in a first or intermediate step of the Processor in developing the effective address will be termed an "indirect address."

The following notations will be employed in the instruction summary to follow:

| | |
|---|---|
| C(s) | The contents of the register denoted by s |
| Y | The effective address |
| C(Y) | The contents of the working storage cell designed by the effective address Y |

| | |
|---|---|
| $\rightarrow$ | Replaces |
| :: | Compare with |
| AND | The logical binary AND function |
| OR | The logical binary INCLUSIVE-OR function |
| $\equiv$ | The logical binary EQUIVALENCE function |
| $\not\equiv$ | The logical binary EXCLUSIVE-OR function |

The instructions employed in the description to follow are:

ADA

Add to A $C(A)+C(Y)\rightarrow C(A)$

The contents of the A-register are added to the contents of the working storage cell represented by address Y and the sum replaces the contents of the recipient (A) register.

After execution of the instruction:

the zero indicator is turned on if the contents of the recipient (A) register represents zero, the negative indicator is turned on if $C(A)_0$ is a one, the carry indicator is turned on if a carry is generated from $C(A)_0$, and the overflow indicator is turned on if the sum exceeds the capacity of the recipient (A) register.

ADLA

Add Logic to A $C(A)+C(Y)\rightarrow C(A)$

Similar to the ADA instruction, except that the overflow bit is not affected.

ADLQ

Add Logic to Q

Similar to ADLA

ANA

AND to A $C(A)_i$ AND $C(Y)_i\rightarrow C(A)_i$

An AND operation is performed on each bit of C(A) and the corresponding bit of C(Y) and the result bit replaces the corresponding bit in the recipient (A) register. (If both $C(A)_i$ and $C(Y)_i$ are binary 1's, the result bit is a binary 1, otherwise the result bit is a binary 0).

After execution of the instruction, the zero indicator is turned on if the contents of the recipient (A) register represents zero.

ANQ

AND to Q $C(Q)_i$ AND $C(Y)_i\rightarrow C(Q)_i$

Similar to ANA

ANSA

AND to Storage A $C(A)_i$ AND $C(Y)_i\rightarrow C(Y)_i$

Similar to ANA, except that each result bit replaces the corresponding bit of C(Y).

ANXn

AND to Xn $C(Xn)_i$ AND $C(Y)_i\rightarrow C(Xn)_i$

Similar to ANA, except applicable only for $i$=0–17.

AOS

Add One to Storage $1+C(Y)\rightarrow C(Y)$

The contents of the working storage cell represented by the address Y is incremented by 1.

ARS

A Right Shift

C(A) are shifted right by the number of bit positions represented by $Y_{11-17}$. The bit positions which are vacated on the left are filled with $C(A)_0$.

CANA

Comparative AND with A $C(A)_i$ AND $C(Y)_i=Z_i$

Similar to ANA, except that the result bit, $Z_i$, is not saved. Therefore, C(A) is not changed by the instruction.

The zero indicator is turned on if all of $Z_{0-35}$ are zero.

CANQ

Comparative AND with Q $C(Q)_i$ AND $C(Y)_i=Z_i$

Similar to CANA

CANXn

Comparative AND with Xn $C(Xn)_i$ AND $C(Y)_i=Z_i$

Similar to CANA, except applicable only for $i$=0–17.

CMK

Compare Masked $C(Q)_i$ AND $[C(A)_i\not\equiv C(Y)_i]=Z_i$

Certain bits of $C(A)_i$ are compared with corresponding bits of $C(Y)_i$, the particular bits compared being determined by a mask held in the Q-register, and if the two bits are unlike $Z_i$=1. Only those bits of C(A) and C(Q) whose positions correspond to binary 0's in C(Q) are compared. $Z_i$=0 for all mask bits which are 1's.

The zero indicator is turned off and remains off if any $Z_i$=1. Therefore, the zero indicator is on after execution of the instruction only if all corresponding bits in C(A) and C(Q) which the mask permits to be compared are alike; i.e., if all $Z_i$ are zeros. This converse condition is represented by:

$$C(Q)_i \text{ OR } [C(A)_i\equiv C(Y)_i]=\overline{Z_i}$$

(In the EXCLUSIVE-OR operation represented by the first expression above the result of combining $C(A)_i$ and $C(Y)_i$ is a binary 1 if the two bits are unlike, otherwise the result is a binary 0. In the EQUIVALENCE operation represented by the second expression the result of combining $C(A)_i$ and $C(Y)_i$ is a binary 1 if the two bits are alike, otherwise the result is a binary 0).

CMPQ

Compare with Q

C(Q)::C(Y) C(Y)

The number represented by C(Q) is compared with the number represented by C(Y) to determine their relative values. The result of the comparison is represented by the zero and carry indicators, as follows:

If C C(Y); zero indicator off, negative indicator off

If C(Q)=C(Y); zero indicator on, negative indicator off

If C(Q)<C(Y); zero indicator off, negative indicator on

CMPXn

Compare with Xn $C(Xn)::C(Y)_{0-17}$

Similar to CMPQ, except that applicable only for bits 0–17 of C(Y).

EAA

Effective Address to A $Y\rightarrow C(A)_{0-17}$; $0\rightarrow C(A)_{18-35}$

The effective address replaces the bit 0–17 contents of the recipient (A) register and zeros replace the bit 18–35 contents of the recipient (A) register.

After execution of the instruction the zero indicator is turned on if the contents of the recipient (A) register represents 0, and the negative indicator is turned on if $C(A)_0$ is a one.

EAQ

Effective Address to Q $Y\rightarrow C(Q)_{1-17}$; $0\rightarrow C(Q)_{18-35}$

Similar to EAA

EAXn

Effective Address to Xn $Y\rightarrow C(Xn)$

Similar to EAA

ERA

EXCLUSIVE-OR to A $C(A)_i\not\equiv C(Y)_i\rightarrow C(A)_i$

An EXCLUSIVE-OR operation (see CMK) is performed on each bit of C(A) and the corresponding bit of C(Y) and the result bit replaces the corresponding bit in the recipient (A) register.

After execution of the instruction the zero indicator is turned on if the contents of the recipient (A) register represents 0.

ERSA

EXCLUSIVE-OR to Storage A $C(A)_i \not\equiv C(Y)_i \rightarrow C(Y)_i$

Similar to ERA, except that each result bit replaces the corresponding bit of C(Y).

ERSQ

EXCLUSIVE-OR to Storage Q $C(Q)_i \not\equiv C(Y)_i \rightarrow C(Y)_i$

Similar to ERSA

FLD

Floating Load $C(Y)_{0-7} \rightarrow C(E); C(Y)_{8-35} \rightarrow C(A-Q)_{0-27}; 0 \rightarrow C(A-Q)_{28-71}$ Normally loads a floating point number into the Exponent and Accumulator Registers. In the operations described herein this instruction is employed only for clearing the A- and Q-Registers of the Accumulator by loading zeros into all bit positions of both registers.

LBAR

Load Base Address Registers $C(Y)_{0-17} \rightarrow C(BAR)$

Bits 0–17 of the contents of the working storage cell represented by address Y replace the contents of the recipient (BAR) register

LCA

Load Complement A $\text{Complement } [C(Y)] \rightarrow C(A)$

The two's complement of the 36-bit binary number represented by C(Y) replaces the contents of the recipient (A) register.

LCQ

Load Complement Q $\text{Complement } [C(Y)] \rightarrow C(Q)$

Similar to LCA

LDA

Load A $C(Y) \rightarrow C(A)$

The contents of the working storage cell represented by address Y replace the contents of the recipient (A) register.

After execution of the instruction, the zero indicator is turned on if the contents of the recipient (A) register represents zero, and the negative indicator is turned on if $C(A)_0$ is a one.

LDAQ

Load A–Q $C(Y\text{-pair}) \rightarrow C(A-Q)$

The contents of the working storage cell represented by address Y and the contents of the adjacent cell replace the contents of the Accumulator.

LDQ

Load Q $C(Y) \rightarrow C(Q)$

Similar to LDA

LDXn

Load Xn from Upper $C(Y)_{0-17} \rightarrow C(Xn)$

Similar to LBAR

LLR

Long Left Rotate

C(A–Q) are rotated left by the number of bit positions represented by $Y_{11-17}$. Therefore, each bit shifted out of the bit-0 position is inserted into the bit-71 position.

LLS

Long Left Shift

C(A–Q) are shifted left by the number of bit positions represented by $Y_{11-17}$. The bit positions which are vacated on the right are filled with zeros.

LREG

Load Registers $C(Y, Y+1, \ldots Y+6) \rightarrow C(X0, X1 \ldots X7, A, Q, E)$

The contents of the working storage cell represented by address Y and the contents of the adjacent six cells replace the contents of the Index, A–Q, and Exponent working registers, as follows:

| | |
|---|---|
| $C(Y)_{0-17} \rightarrow C(X0)$ | $C(Y+3)_{0-17} \rightarrow C(X6)$ |
| $C(Y)_{18-35} \rightarrow C(X1)$ | $C(Y+3)_{18-35} \rightarrow C(X7)$ |
| $C(Y+1)_{0-17} \rightarrow C(X2)$ | $C(Y+4)_{0-35} \rightarrow C(A)$ |
| $C(Y+1)_{18-35}35 \rightarrow C(X3)$ | $C(Y+5)_{0-35} \rightarrow C(Q)$ |
| $C(Y+2)_{0-17} \rightarrow C(X4)$ | $C(Y+6)_{0-7} \rightarrow C(E)$ |
| $C(Y+2)_{18-35} \rightarrow C(X5)$ | |

LXLn

Load Xn from Lower $C(Y)_{18-35} \rightarrow C(Xn)$

Similar to LDXn

MME

Master Mode Entry

Forces entry into a fault procedure in which the Processor executes two successive instructions in the master mode. The working storage location of the two instructions is determined by a set of Fault switches in the Processor.

Bits 0–17 of the MME instruction contain a code which identifies a particular program or module to which control is to be transferred after execution of the two instructions.

ORA

OR to A $C(A)_i \text{ OR } C(Y)_i \rightarrow C(A)_i$

An INCLUSIVE-OR operation is performed on each bit of C(A) and the corresponding bit of C(Y) and the result bit replaces the corresponding bit in the recipient (A) register. (If either or both of $C(A)_i$ and $C(Y)_i$ are binary 1's the result is a binary 1, otherwise the result is a binary 0).

After execution of the instruction the zero indicator is turned on if the contents of the recipient (A) register represents zero.

ORQ

OR to Q $C(Q)_i \text{ OR } C(Y)_i \rightarrow C(Q)_i$

Similar to ORA

ORSA

OR to Storage A $C(A)_i \text{ OR } C(Y)_i \rightarrow C(Y)_i$

Similar to ORA, except that each result bit replaces the corresponding bit of C(Y).

ORXn

OR to Xn $C(Xn)_i \text{ OR } C(Y)_i \rightarrow C(Xn)_i$

Similar to ORA, except applicable only for $i = 0-17$.

QLS

Q Left Shift

C(Q) are shifted left by the number of bit positions represented by $Y_{11-17}$. The bit positions which are vacated on the right are filled with zeros.

QRL

Q Right Logic

C(Q) are shifted right by the number of bit positions represented by $Y_{11-17}$. The bit positions which are vacated on the left are filled with zeros.

QRS

Q Right Shift

C(Q) are shifted right by the number of bit positions represented by $Y_{11-17}$. The bit positions which are vacated on the left are filled with $C(Q)_0$.

RET

Return $C(Y)_{0-17} \rightarrow C(IC); C(Y)_{18-35} \rightarrow C(IR)$

The contents of the working storage cell represented by address Y replaces the contents of the Instruction Counter (ICT-register) and the Indicator Register.

After execution of the instruction, operation of the Processor continues in the master mode or slave mode according to the new master mode indicator in the Indicator Register.

SBAR

Store Base Address Register $C(BAR) \rightarrow C(Y)_{0-17}$

C(BAR) are stored in working storage in bits 0–17 of the cell represented by address Y.

SBLXn

Subtract Logic from Xn $C(Xn) - C(Y)_{0-17} \rightarrow C(Xn)$

The bit 0–17 contents of the working storage cell represented by address Y are subtracted from the contents of the Xn-register and the difference replaces the contents of the recipient (Xn) register.

After execution of the instruction:

the zero indicator is turned on if the contents of the recipient (Xn) register represents zero, the negative indicator is turned on if $C(Xn)_0$ is a one, the carry indicator is turned on if a borrow is generated from $C(Xn)_0$, but the overflow bit is not affected.

SREG

Store Registers $C(X0, X1, \ldots X7, A, Q, E, T) \rightarrow C(Y, Y+1, \ldots Y+7)$ The contents of the Index, A–Q, Exponent, and Timer working registers are stored in working storage in the cell represented by address Y and the adjacent seven cells, as follows:

| | |
|---|---|
| $C(X0) \rightarrow C(Y)_{0-17}$ | $C(X6) \rightarrow C(Y+3)_{0-17}$ |
| $C(X1) \rightarrow C(Y)_{18-35}$ | $C(X7) \rightarrow C(Y+3)_{18-35}$ |
| $C(X2) \rightarrow C(Y+1)_{0-17}$ | $C(A) \rightarrow C(Y+4)_{0-35}$ |
| $C(X3) \rightarrow C(Y+1)_{18-35}$ | $C(Q) \rightarrow C(Y+5)_{0-35}$ |
| $C(X4) \rightarrow C(Y+2)_{0-17}$ | $C(E) \rightarrow C(Y+6)_{0-7}$; $0 \rightarrow C(Y6)_{8-35}$ |
| $C(X5) \rightarrow C(Y+2)_{18-35}$ | $C(T) \rightarrow C(Y+7)_{0-23}$; $0 \rightarrow C(Y+7)_{24-35}$ |

STA

Store A $C(A) \rightarrow C(Y)$

C(A) are stored in working storage in the cell represented by address Y.

STAQ

Store A–Q $C(A\text{–}Q) \rightarrow C(Y\text{-pair})$

C(A–Q) are stored in working storage in the cell represented by address Y and the adjacent cell.

STC1

Store Instruction Counter plus 1

$C(IC)+1 \rightarrow C(Y)_{0-17}; C(IR) \rightarrow C(Y)_{18-35}$

The contents of the Instruction Counter are incremented by 1 and with the contents of the Indicator Register stored in working storage in the cell represented by address Y.

STQ

Store Q $C(Q) \rightarrow C(Y)$

Similar to STA

STXn

Store Xn into Upper $C(Xn) \rightarrow C(Y)_{0-17}$

Similar to SBAR

STZ

Store Zero $0 \rightarrow C(Y)$

Zeros are stored in working storage in all bit positions of the cell represented by address Y.

SZN

Set Zero and Negative Indicators from Memory

The zero and negative indicators are turned on according to the algebraic value of the number represented by the contents of the working storage cell designated by the address portion of the instruction.

If $C(Y)>0$; zero indicator off, negative indicator off

If $C(Y)=0$; zero indicator on, negative indicator off

If $C(Y)<0$; zero indicator off, negative indicator on

TMI

Transfer on Minus

If negative indicator on, then $Y \rightarrow C(IC)$

The negative indicator is tested and if found on the effective address Y replaces the contents of the Instruction Counter. Therefore, in this transfer, or branch, instruction if the condition tested is found to be present, the Processor transfers to the program portion commencing with the instruction held in the cell represented by address Y, otherwise the program continues with the instruction next following the TMI instruction.

TMZ

Transfer on Not Zero

If zero indicator off, the $Y \rightarrow C(IC)$

Similar to TMI

TPL

Transfer on Plus

If negative indicator off, then $Y \rightarrow C(IC)$

Similar to TMI

TRA

Transfer Unconditionally $Y \rightarrow C(IC)$

The Processor unconditionally transfers to the program portion commencing with the instructions held in the cell represented by address Y.

TSXn

Transfer and Set Xn $C(IC)+1 \rightarrow C(Xn); Y \rightarrow C(IC)$

A transfer function to a subroutine is executed, and the program location from which the transfer is made is saved in an Index Register to provide a return link when the subroutine has been completed.

The address in the Instruction Counter is incremented by 1 and entered into the recipient (Xn) register, and then the effective address Y replaces the contents of the Instruction Counter.

TZE

Transfer on Zero

If zero indicator on, then $Y \rightarrow C(IC)$

Similar to TMI

XEC

Execute

The instruction at the effective address Y is executed. After execution the program continues with the instruction next following the XEC instruction, except when execution of the instruction at Y effects a program transfer by changing C(IC).

XED

Execute Double

The instruction at the effective address Y and the adjacent instruction are executed in succession. After execution of the instruction pair the program continues with the instruction next following the XED instruction, except when execution of the pair effects a program transfer by changing C(IC).

SLAVE SERVICE AREA OPERATION

The detailed operation of the invention will now be described by direct reference to the flow chart of FIGS. 12–49. This flow chart illustrates the operation of the SSA under control of a Processor which is executing in sequence the individual instructions of the programs and modules involved. The description in this section is supplemental to the more general description of the invention set forth above with reference to FIGS. 8 and 9.

The flow chart of FIGS. 12–49 comprises a series of connected blocks which define the temporal sequence of the different functional substeps performed in the execution of the programs and modules. Most of the blocks define a single substep performed by the execution of a single instruction. However, a few blocks represent the aggregate function performed by all of the substeps of a subroutine.

Each block which represents a single substep is identified immediately thereabove by the mnemonic designation of the program or module being executed and by the address, in octal notations, of the represented instruction relative to the base, or first, cell of the set of cells in working storage in which the program resides. Thus, the block shown in the top left of FIG. 13 is identified as representing the function of the instruction located at relative address 1135 of the .MFALT (Fault Processor) program. For simplicity herein, blocks representing a single instruction will be referred to by the corresponding relative address and program mnemonic; i.e., the above-mentioned block will be termed the 1135.MFALT substep. Some instructions are referenced by other transfer instructions, each transfer instruction employing a symbolic transfer address to designate the storage cell holding the referenced instruction. Therefore, the substep of each such referenced instruction is also identified by its symbolic transfer address, which is illustrated in a circle immediately above the substep block (i.e., the block shown in the lower left of FIG. 12 may be alternatively termed the FPRC1 substep of the 1134.MFALT substep).

Internal to each block representing a single instruction is the previously described instruction mnemonic designation, a representation of the instruction address portion and, where applicable, a representation of the instruction tag. The address portion is most often represented by the symbolic designation of an address, the various symbolic addresses employed including operand addresses (the symbolic address .CRTCL in 1513.MDISP, FIG. 22), transfer addresses (the symbolic address DLD in 1370.MDISP, FIG. 21), and indirect addresses (the symbolic address .CRFRS in 1140.MFALT, FIG. 13). The address portion is also represented by a designation relative to a symbolic address (the relative address .CRTRC+2 in 574.MFALT, FIG. 18), or comprises a numerical address (the address 40 in 120. MFLT1, FIG. 30). The address portion sometimes comprises a control address (the shift control $18_{10}$ in 1372.MDISP, FIG. 27) or a direct operand (the operand 600,000 in 157.MFALT, FIG. 15).

When an instruction includes a tag, the corresponding substep block contains a representation of the tag immediately following and separated from the address portion by a comma. The tag portions most often designate a particular register (5 for X5 in 160.MFALT, FIG. 15; IC in 1137.MFALT, FIG. 13; QU for $Q_{0-17}$ in 102.MFALT, FIG. 16) or a requirement for an indirect operation (I in 1140.MFALT, FIG. 13).

Other representations in the different blocks will be explained as the function of the block is set forth in the ensuing description. An explanation of the particular effect of each functional substep is shown to the right of the corresponding block in the flow chart of FIGS. 12–49.

Figure 12:
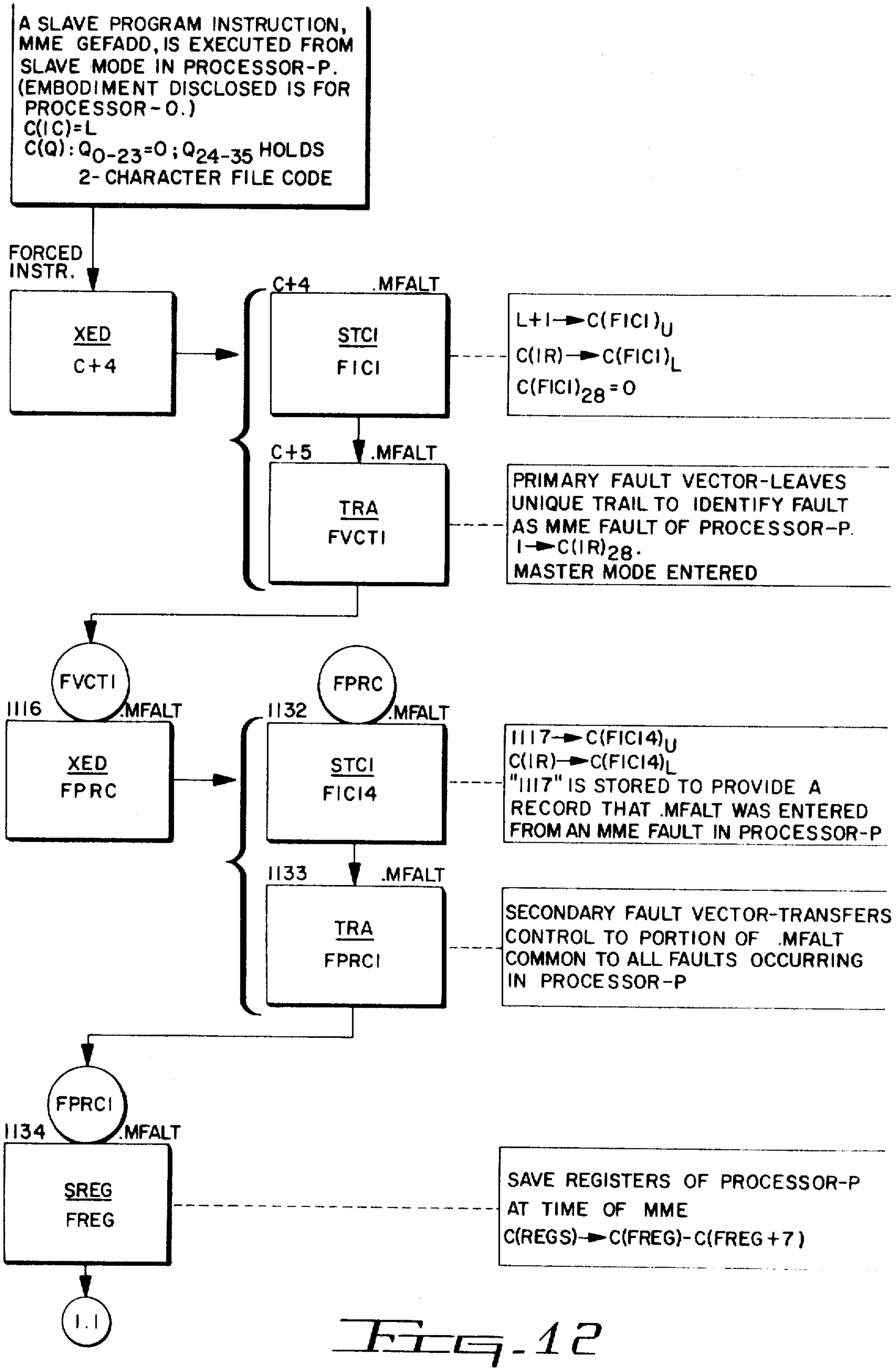
FIG. 12–49 is a flow chart in further detail of the operation of the instant invention.
Figure 13:
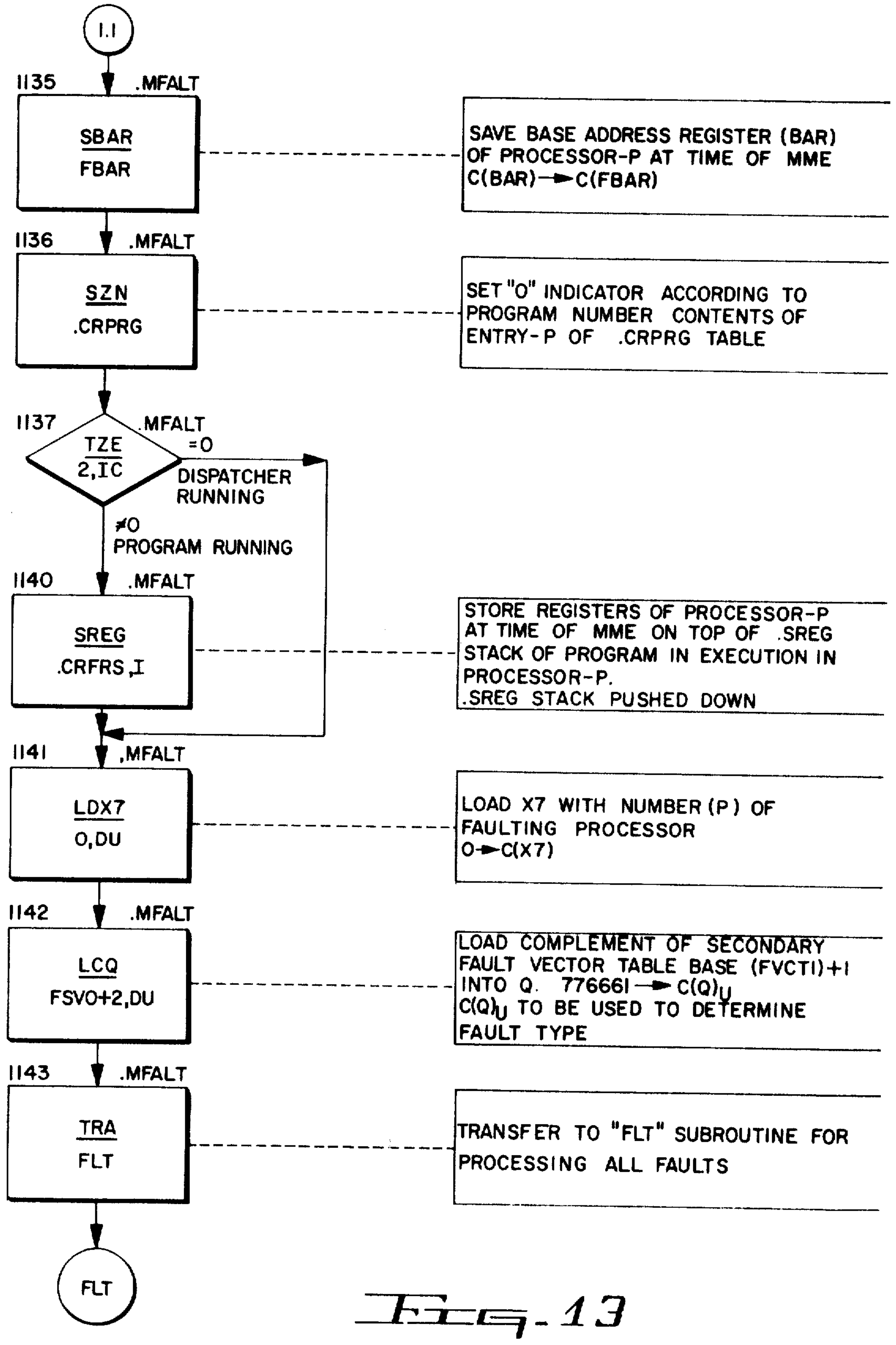
Figure 14:
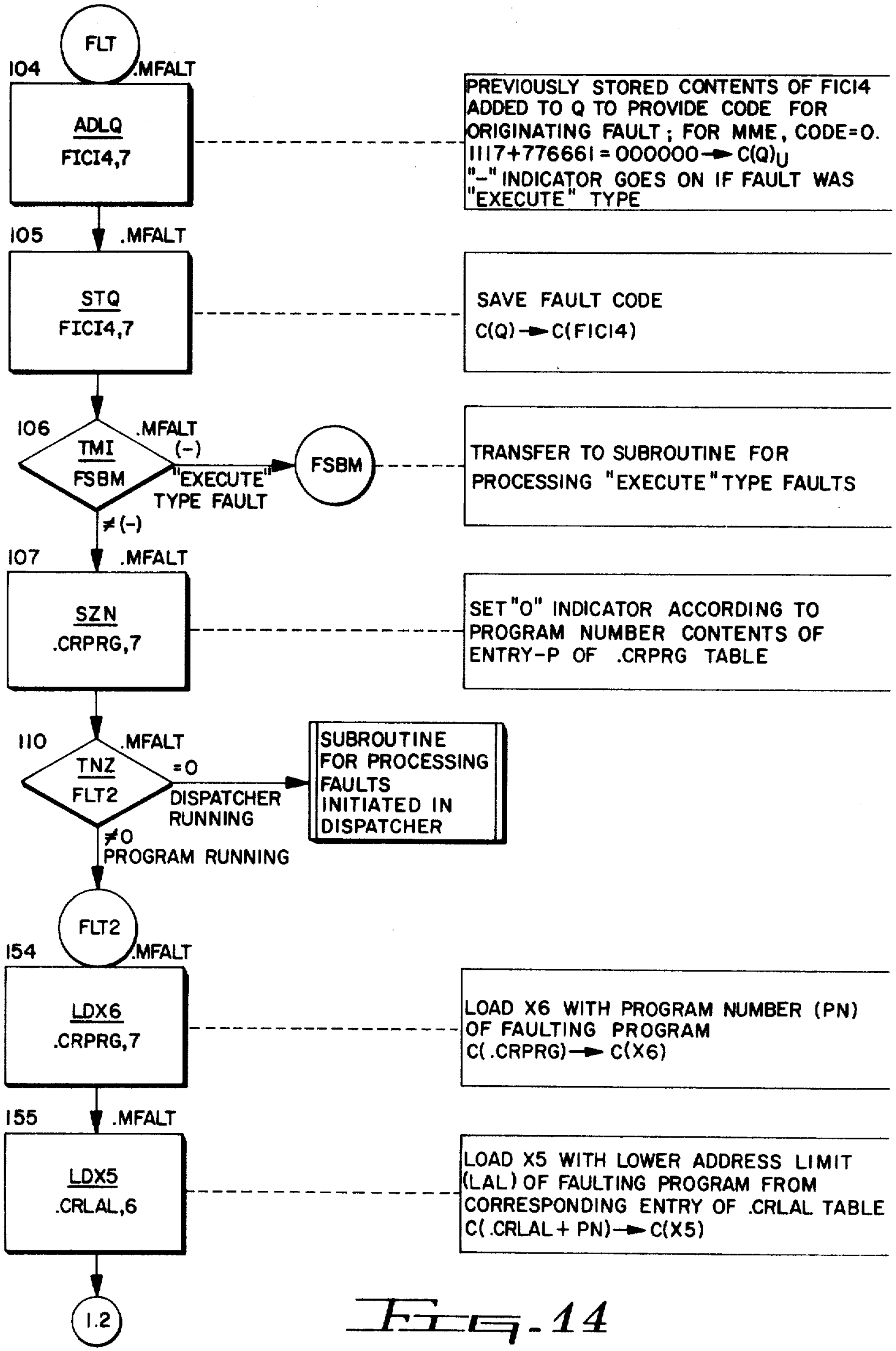

The operation shown in the flow chart commences, FIG. 12, when a slave program X (designated "X" for convenience herein) in execution in Data Processor-0 requires the identity of the I/O apparatus serving a particular file F (designated "F" for convenience herein) used by program X. Therefore, Data Processor-O inserts the file code of file F in $Q_{24-35}$ and then executes the appropriate MME instruction for requesting the operating system to supply the I/O apparatus identity. The address portion of the MME instruction executed identifies the operating system module which will perform the required services and the point of entry into the module, in this example the address portion identifying the .MFLT1 module and entry point #1. This particular MME instruction is termed the MME GEFADD instruction. The MME GEFADD instruction is held at the symbolic address L in the set of cells in which program X is resident.

FAULT PROCESSING

The MME instruction forces the Data Processor to execute an automatic XED instruction and the XED instruction, in turn, forces the execution of two successive instructions in the Fault Processor program. The two forced instructions are located at C+4 and C+5 in the Fault Processor, where C is an address which is unique for Processor-0 and is determined by the set of Fault switches of Data Processor-O. The first instruction of the pair, in the C+4.MEALT substep, is an STC1 instruction having the symbolic operand address FICI. There is a FICI cell for each Data Processor. This STC1 instruction effects the storage of the relative MME address, incremented by 1 (L+1), into $FICI_U$ (the upper half of the FICI cell, bits 0–17) and the contents of the Indicator Register into $FICi_L$ (the lower half of the FICI cell, bits 18–35) of the FICI cell assigned to Processor-0. The master mode bit of the Indicator Register, bit 28, has been off with save program X in execution and therefore $C(FICI)_{28}$ receives a binary 0. The second instruction of the forced pair, in the C+5.MFALT substep, is a TRA instruction, which transfers control of the Data Processor to an instruction in the Fault Processor located at the symbolic transfer address FVCT1. The forced XED instruction also changes the master mode indicator to a binary 1 and the Data Processor now proceeds in the master mode.

The Fault Processor program is entered to preserve the status of the Data Processor and then to request the Dispatcher program to place the .MFLT1 module in execution. The XED instruction in the FVCT1 substep forces the execution of the two successive instructions located at the FPRC and FPRC+1 symbolic addresses. The first instruction of the pair, in the 1132. MFALT substep, is an STC1 instruction having the symbolic operand address FICI4. There is an FICI4 cell for each Data Processor. This STC1 instruction effects the storage of the numerical address represented by FVCT1 incremented by 1, 1117, and the contents of the Indicator Register into the FICI4 cell assigned to Processor-0. The particular point at which the Fault Processor is entered, in this instance at FVCT1, is determined by the type of fault encountered. Therefore, $C(FICI4)_U$ now provides a trace record which denotes that the Fault Processor was entered from an MME fault in Processor-0. The second instruction of the forced pair, in the 1133. MFALT substep, is a TRA instruction, which transfers control of the Data Processor to an instruction located at the symbolic transfer address FPRC1.

The SREG instruction in the FPRC1 substep saves the contents of the working registers of the Data Processor, which contents have not been changed from when the MME instruction was executed, in the eight consecutive cells that commence with the cell having the symbolic operand address FREG which is assigned to Processor-0. There is a set of FREG cells for each DATA Processor. The SBAR instruction in the 1135.MFALT substep saves the contents of the Base Address Register, which contains a base cell address and bounds check, in the FBAR cell assigned to Processor-0, FIG. 13. There is a FBAR cell for each Data Processor. (The notation 1.1 in the small circle which follows the 1134.MFALT substep in FIG. 12 and which precedes the 1135.MFALT substep in FIG. 13 is employed herein only as a connective to indicate that the substep following the connective is executed immediately after the substep preceding the corresponding connective).

The next two substeps are performed to determine whether the Fault Processor has been entered from the Dispatcher or another program. First the SZN instruction in the 1136.MFALT substep tests the value of the contents of the .CRPRG cell assigned to Processor-0, FIG. 5, and turns the zero indicator on if the Dispatcher has been in execution in Processer-0. An entry in the .CRPRG table is provided for holding the number of the program in execution in each Data Processor, only the Dispatcher being designated as program #0. Next, the TZE instruction in the 1137.MFALT substep transfers control to the second-following substep if the zero indicator is on; otherwise the next substep is executed. This transfer is provided by using an effective address prepared by adding the contents of the Instruction Counter, designated by the IC tag of the TZE instruction, to the numerical transfer address 2 in the address portion of the TZE instruction. In the instant example, program X has been in execution in Processor-0, so that the .CRPRG cell assigned to Processor-0 holds a nonzero value and the next substep is executed. The SREG instruction in the 1140.MFALT substep stores the contents of the working registers, which contents have not been changed from when the MME instruction was executed, on top of the .SREG stack of SSA X. This storage is effected by utilizing the symbolic address .CRFRS as an indirect address to retrieve and use the indirect word in the .CRFRS cell, FIG. 5. The .CRFRS indirect word holds a pointer to the .SREGS control word in the SSA of Processor-0. This pointer is used as a second indirect address for retrieving the .SREGS control word, described heretofore. Execution of the .SREGS control word then stores the working registers on top of the .SREG stack and pushes down the stack.

The LDX7 instruction in the 1141.MFALT substep saves the number of the Processor that executed the MME instruction in the X7-register. The DU-tag of the LDX7 instruction provides for using the address portion of the instruction as a direct operand, in this example the direct operand being 0 to represent Processor-0. Therefore, a 0 is loaded into the X7-register.

The Q-register is now loaded with a test value for use in determining the type of fault from which the Fault Processor was entered. The LCQ instruction in the 1142.MFALT substep loads QU with the complement of the numerical address represented by the symbolic relative address FSV0+2. The symbolic relative address FSV0 immediately precedes the symbolic address FVCT1, FIG. 12. Therefore, FSV0+2, represents the numerical address 1117. The DU-tag of the LCQ instruction provides for using the complement of the numerical address represented by FSV0+2 as a direct operand. Therefore, the complement of 1117, which is 776661, is loaded into QU to provide a test value.

The TRA instruction in the 1143.MFALT substep transfers control of the Data Processor to an FLT subroutine in the Fault Processor for processing all faults, this subroutine commencing at the symbolic transfer address FLT.

Next, a code is generated to represent the type of fault from which the Fault Processor was entered. The ADLQ instruction in the FLT substep adds the contents of an FICI4 cell, which holds the trace record of the type of fault from which the Fault Processor was entered, to the test value in the Q-register, FIG. 14, and the sum, representing the fault code, replaces the contents of the Q-register. The negative indicator is turned on if the fault code is negative. The contents of the FICI4 cell assigned to Processor-0 are retrieved by using an effective address prepared by adding the Data Processor number held in the X7-register to the numerical address represented by FICI4. In the instant example $C(FICI4)_U$ for Processor-0 is 1117, FIG. 12, $C(Q)_U$ is 776661, and the fault code entered into the Q-register is 0, so that the negative indicator remains off.

The STQ instruction in the 105.MFALT substep saves the fault code in the FICI4 cell assigned to Processor-0. The effective address representing the FICI4 cell assigned to Processor-0 is prepared in the manner described in the FLT substep.

The TMI instruction in the 106.MFALT substep transfers control to an FSBM subroutine if the negative indicator is on; otherwise the next substep is executed. If the Fault Processor had been entered from an "Execute" fault, which is initiated by the depression of an Execute pushbutton on the Data Processor console, the fault trace record would have provided a negative fault code. In the instant example the MME fault provides a zero fault code, so that the FICI4 cell assigned to Processor-0 holds a zero value and the next substep is executed.

At this point a test is made similar to that in the 1136.MFALT substep, FIG. 13, to determine whether the Fault Processor has been entered from the Dispatcher. Thus, the SZN instruction in the 107.MFALT substep turns the zero indicator on if the Dispatcher has been in execution in Processor-0. The TNZ instruction in the 110.MFALT substep then transfers control to the FLT2 substep if the Dispatcher has not been in execution, as denoted by the zero indicator being off; otherwise the next substep is executed to initiate a subroutine, not described herein, for processing faults initiated in the Dispatcher. In the instant example, program X has been in execution in Processor-0, so that control is transferred to the FLT2 substep.

The LDX6 instruction in the FLT2 substep saves the number of the faulting program in the X6-register. This substep is effected by storing the bit 0–17 contents of the .CRPRG cell assigned to Processor-0, which holds the number of program X, in the X6-register. The LDX5 instruction in the 155.MFALT substep saves the lower address limit (base cell address) of the faulting program in the X5-register. This substep is effected by storing the bit 0–17 contents of the .CRLAL table cell assigned to program X, FIGS. 4 and 5, in the X5-register. The .CRLAL entry for each program is displaced from the base cell of the .CRLAL table by a number of cells equal to the number of the program. Therefore, the .CRLAL entry for program X is retrieved by using an effective address prepared by adding the program number held in the X6-register to the numerical address of the base cell of the .CRLAL table, represented by .CRLAL. The LBAR instruction in the 156.MFALT substep loads the Base Address Register of Processor-0 with the base cell address and bounds check of the faulting program, FIG. 15. As mentioned previously in the Slave Service Area description, the .SALIM+1 cell of each SSA holds the base cell address and bounds check of the corresponding slave program. The contents of the .SALIM+1 cell of SSA X are retrieved by using an effective address prepared by adding the base cell address of program X held in the X5-register to the relative numerical address represented by .SALIM+1.

The .STATE word of SSA X is now tested to determine whether the MME .EMM bit 18 thereof should be turned on. A binary 1 in the bit 19 position of the .STATE word denotes that the MME .EMM bit should be turned on after a fault. In preparation for the test the LDA instruction in the 157.MFALT substep loads a test value into the A-register. The DL tag of the LDA instruction provides for using the address portion of the instruction as a direct operand to be loaded into $C(A)_L$. Thus, the direct operand 600000 is loaded into $C(A)_L$ and 0 is loaded into $C(A)_U$. The A-register now holds a test value comprising all binary 0's except in the bit 18 and 19 positions, which hold binary 1's. The CANA instruction in the 160.MFALT substep performs an AND function on each bit of the .STATE word and the corresponding bit of the test value in the A-register and provides an indication of whether the MME .EMM bit should be turned on. If either bit 18 or bit 19 of the .STATE word is on, the corresponding AND-bit Zi is a binary 1 and the zero indicator is off at the conclusion of the instruction, otherwise the zero indicator is on. The TZE instruction in the 161.MFALT substep then transfers control to the FLT2A substep if the MME .EMM bit does not have to be turned on, as denoted by the zero indicator being on; otherwise the next substep is executed to turn on the MME .EMM bit before the FLT2A substep is performed.

The ORSA instruction in the 162.MFALT substep turns on bits 18 and 19 of the .STATE word in SSA X. The ORSA instruction performs an INCLUSIVE-OR function on each bit of the .STATE word and the corresponding bit of the test value in the A-register. All bits of the .STATE word which are on remain on and bits 18 and 19 are turned on as a consequence of the binary 1's in the bit 18 and 19 positions of the test value.

The .STATE word of SSA X is again tested, this time to determine whether the contents of the Base Address Register have been changed during the execution of the corresponding program, inasmuch as some privileged slave programs are provided the capability of modifying the contents of the BAR. A binary 1 in the bit 29 position of the .STATE word denotes that the BAR contents have been changed. In preparation for the test, the LXL0 instruction in the FLT2A substep loads the bit 18–35 contents of the .STATE word of SSA X into the X0-register. The CANX0 instruction in the 164.MFALT substep then performs an AND function on each bit of the .STATE word in the X0-register and the corresponding bit of a test value, and provides an indication of whether the BAR contents have been changed. The DU-tag of the CANX0 instruction provides for using the address portion of the instruction as a direct operand in the AND function. The direct operand comprises the test value 000100, so that if bit 29 of the .STATE word is a binary 1, the corresponding AND-bit Zi is a binary 1 and the zero indicator is off at the conclusion of the instruction, otherwise the zero indicator is on. The TZE instruction in the 165.MFALT substep then transfers control to the FLT7 substep if the BAR contents have not been changed, as denoted by the zero indicator being on; otherwise the next substep is executed to initiate a subroutine, not described herein, for changing the BAR contents to the actual base cell address of the slave program. In the instant example the FLT7 substep follows.

Figure 16:
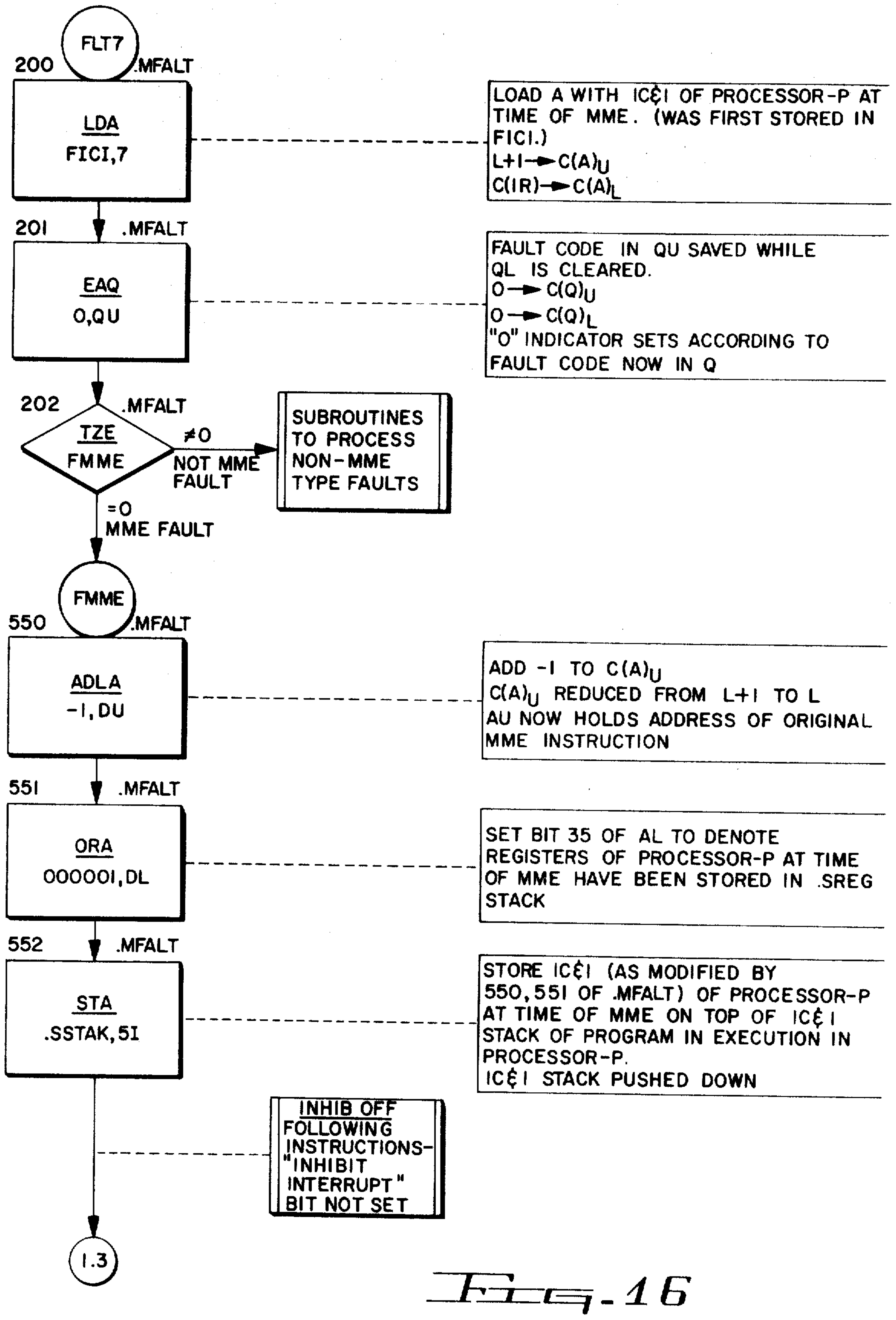
Figure 17:
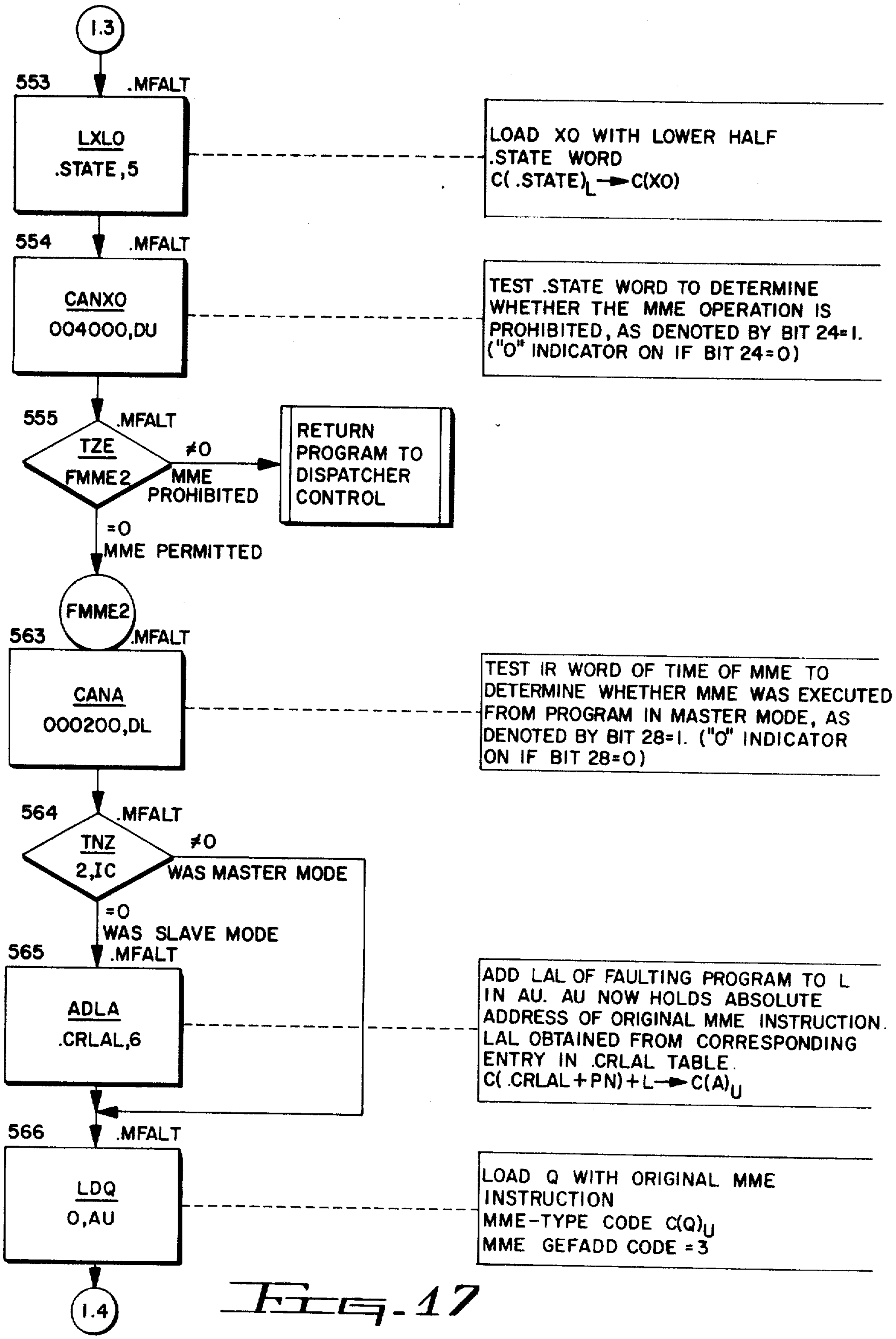

The LDA instruction in the FLT7 substep loads the A-register with the contents of the FICI cell assigned to Processor-0, FIG. 16. This FICI cell previously was provided with the MME instruction address, incremented by 1, and the contents of the Indicator Register when the MME instruction was executed, FIG. 12. This data word combination of Instruction Counter and Indicator Register contents is the usual type of entry made in the IC&I stack, and will be referred to as "IC&I" for convenience herein. The EAQ instruction in the 201.MFALT substep clears bits 18–35 of the Q-register, maintaining the fault code previously generated in the Q-register, FIG. 14. This clearing function is effected by adding the fault code in $C(Q)_U$, designated by the QU-tag of the EAQ instruction, to the direct operand 0, replacing $C(Q)_U$ with the sum, and loading a zero into $(C(Q)_L$. The zero indicator is turned on if the new contents of the Q-register, in this instance the fault code, is 0. In the instant example, the fault code is O and the zero indicator is turned on. The TZE instruction in the 202.MFALT substep then transfers control to the FMME substep if the fault was an MME fault, as denoted by the zero indicator being on; otherwise the next substep is executed to initiate a subroutine, not described herein, for processing other types of faults. In the instant example the FMME substep follows.

The address value in the A-register now is decremented by 1 to provide the address, L, of the MME instruction. The ADLA instruction in the FMME substep adds the direct operand −1, designated by the DU tag of the instruction, to $C(A)_U$, thereby changing the address portion of the IC&I in the A-register from L+1 to L. The ORA instruction in the 551.MFALT substep turns on bit 35 of the indicator register portion of the IC&I in the A-register to denote that the working register contents of Processor-0 at the time of execution of the MME instruction have been saved, FIG. 13. The ORA instruction performs an EXCLUSIVE-OR function on each bit of $C(A)_L$ and the corresponding bit of the direct operand 000,001, designated by the DL tag of the instruction. All bits in $C(A)_L$ which are on remain on and bit 35 is turned on as a consequence of the binary 1 in the bit position 35 of the direct operand. The STA instruction in the 552.MFALT substep then saves the value of IC&I from MME instruction, as modified in the 550.MFALT and 551.MFALT substeps, on top of the IC&I stack of SSA X. The storage is effected by utilizing the symbolic address .SSTAK as an indirect address, and by modifying the indirect address by the base cell address of program X held in the X5-register. The modified indirect address provides for retrieving the .SSTAK control word in SSA X, and execution of the .SSTAK control word then stores the IC&I entry in the A-register on top of the IC&I stack and pushes down the stack.

The series of instructions which follow the STA instruction of the 552.MFALT substep have their inhibit interrupt bits off, so that the processor executing this series can be interrupted by the operating system, if necessary.

The .STATE word of SSA X once more is tested, this time to determine whether providing the service requested by the MME instruction is prohibited. A binary 1 in the bit 24 position of the .STATE word denotes that processing of an MME fault is prohibited. In preparation for the test, the LXL0 instruction in the 553.MFALT substep again loads the bit 18–35 contents of the .STATE word of SSA X into the X0-register, FIG. 17. The CANX0 instruction in the 554.MFALT substep then performs an AND function on each bit of the .STATE word in the X0-register and the corresponding bit of a test value, and provides an indication of whether the MME fault function is prohibited. The DU-tag of the CANX0 instruction provides for using the address portion of the instruction as a direct operand in the AND function. The direct operand comprises the test value 004000, so that if bit 24 of the .STATE word is a binary 1 the corresponding AND-bit Zi is a binary 1 and the zero indicator is off at the conclusion of the instruction, otherwise the zero indicator is on. The TZE instruction in the 555.MFALT substep then transfers control to the FMME2 substep if the MME fault function is permitted, as denoted by the zero indicator being on; otherwise the next substep is executed to return the program to control of the Dispatcher, not described herein. In the instant example the FMME2 substep follows.

To determine which operating system module the Dispatcher will be requested to place in execution, the address portion of the MME instruction, which identifies the required module, must be obtained. In preparation for obtaining the MME instruction its absolute address must be provided. If the Processor which executed the MME instruction was operating in the master mode, the MME address L, which was saved and is not in the A-register is the absolute address. However, if the Processor which executed the MME instruction was operating in the slave mode, the MME address L in the A-register is a relative address, and must be converted to the absolute address of the MME instruction. Therefore, the indicator register portion of the IC&I in the A-register is tested to determine whether Processor-0 was operating in the master mode when the MME instruction was executed. A binary 1 in the bit 28 position of the indicator register portion of the IC&I denotes that Processor-0 was operating in the master mode. The CANA instruction in the FMME2 substep performs an AND function on each bit of $C(A)_L$ and the corresponding bit of the direct operand 000200, designated by the DL tag of the instruction. If bit 28 of $C(A)_L$ is a binary 1 the corresponding AND bit Zi is a binary 1 and the zero indicator is off at the conclusion of the instruction, otherwise the zero indicator is on. The TNZ instruction in the 564.MFALT substep then transfers control to the second-following substep if the MME instruction was executed in the master mode, as denoted by the zero indicator being off; otherwise the next substep is executed for converting the relative address L to an absolute address. In the instant example the MME instruction was executed by slave program X, so that the next substep is executed. The ADLA instruction in the 565.MFALT substep converts the relative address L in the A-register to an absolute address. This conversion is effected by adding the .CRLAL table entry assigned to program X to the contents of the A-register (refer to previous description of the 155.MFALT substep of FIG. 14). Therefore, the base cell address in bit 0–17 of the referenced .CRLAL entry is added to the relative MME address, L, in $C(A)_{0-17}$, changing the relative address in $C(A)_U$ to the absolute address of the MME instruction.

The LDQ instruction in the 566.MFALT substep uses the absolute address to load the MME instruction into the Q-register. The MME instruction is retrieved from its cell in working storage by using an address prepared by adding the absolute address contents of $C(A)_U$, designated by the AU tag of the LDQ instruction, to the address portion of the instruction, which has the value 0. The required type of module identified in the address portion of the MME instruction, in the instant example represented by the MME-type code number 3, is now resident in $C(Q)_U$. The EAQ instruction in the 567.MFALT substep clears bits 18–35 of the Q-register to isolate the MME-type code in the Q-register, FIG. 18. This clearing function is effected by adding the MME-type code in $C(Q)_U$, designated by the QU tag of the EAQ instruction, to the direct operand 0, replacing $C(Q)_U$ with the sum, and loading a zero into $C(Q)_L$. The negative indicator is turned on if the new contents of the Q-register is negative, which denotes an invalid MME-type code. In the instant example, the MME-type code is a positive number, so that the negative indicator is not turned on.

The MME-type code in the Q-register is next analyzed to determine whether it is valid. The TMI instruction in the 570.MFALT substep transfers control to an FMMEE subroutine for processing invalidly coded MME instructions if the MME-type code is negative, as denoted by the negative indicator being on; otherwise, the next substep is executed. In the instant example, the positive MME-type code provides for execution of the next substep.

The CMPQ instruction in the 571.MFALT substep compares the relative values of the MME-type code and a number representing the highest permitted code. The Fault Processor maintains a table of entry point words, described heretofore, in working storage. There is one entry point word in the table for each different MME-type code. Each entry point word comprises the number of the SSA module required by the MME instruction and the number of an entry point into the module. The entry point words are disposed in the table from the FMMET+1 cell to the IMMETE−1 cell according to the sequential order of their corresponding MME-type codes. Thus, the first entry point word in the table, corresponding to the MME-type code number 1, is held in the FMMET+1 cell, and the last entry point word, corresponding to the highest permitted MME-type code, is held in the FMMETE−1 cell. Therefore, the highest permitted MME-type code has the value (FMMETE-FMMET)−1. Accordingly, the CMPQ instruction compares the MME-type code in $C(Q)_U$ with the direct operand FMMETE-FMMET, designated by the DU tag of the instruction, and turns on the negative indicator if $C(Q)_U$ is less than the direct operand. The direct operand FMMETE-FMMET is a number greater by 1 than the highest permitted value of the MME-type code. Therefore, if the MME-type code is a value from 1 to (FMMETE-FMMET)−1, the code is permitted and the negative indicator is turned on. In the instant embodiment FMMETE-FMMET represents the number 35, so that when it is compared with the MME-type code number 3 the negative indicator is turned on. The TPL instruction in the 572.MFALT substep transfers control to the FMMEE subroutine if the MME-type code exceeds the highest permitted value, as denoted by the negative indicator being off; otherwise, the next substep is executed. In the instant example, the next substep is executed. The STQ instruction in the 573.MFALT substep then saves the MME-type code in the Q-register on top of the IC&I stack of SSA X. The storage is effected by utilizing the .SSTAK control word in SSA X, which provides for storing the Q-register contents on top of the IC&I stack and pushing down the stack (refer to the previous description of the 552.MFALT substep of FIG. 16).

The Fault Processor now enables a "trace" function to be executed. The trace function, not described herein, records the status of the Data Processor at certain critical points during execution of the program to provide information for tracing program errors and information on the efficiency of operation of the system. Thus, the XEC instruction in the 574.MFALT substep controls Processor-0 to execute the instruction held in the cell having the symbolic relative address .CRTRC+2, this relative address representing the absolute address 634 in the Communication Region. The instruction in the 634COMM substep has an address portion represented by the symbol *i* and an IC-tag. If a tract function is to be executed at this time *i* has the value 2, but if the trace function is to be omitted *i* has the value 1. Therefore, to execute the trace function the TRA instruction in the 634 COMM substep transfers control to the second-following substep after the 574.MFALT substep. After completion of the trace function, control is transferred to the FMME1 substep. To omit the trace function, the TRA instruction in the 634COMM substep transfers control to the substep next following the 574.MFALT substep. The TRA instruction in the 575.MFALT substep transfers control of the Data Processor to the FMME1 substep.

The file code of file F is now placed in readily accessible temporary storage for subsequent use when the operating system module commences execution to provide the required I/0 apparatus identity. This file code was inserted into $Q_{24-35}$ by program X immediately prior to execution of the MME instruction and it now resides in the sixth cell of the top entry of the .SREG stack of SSA X, where it was saved by the 1140.MFALT substep in FIG. 13. The LDA instruction in the FMME1 substep loads the contents of the cell of SSA X having the symbolic relative address .SSA+1 into the A-register, FIG. 19. Since the .SSA+1 cell maintains the address of the first cell of the top entry in the .SREG stack, $C(A)_U$ now holds this address. The LDAQ instruction of the 606.MFALT substep retrieves the file code from the .SREG stack and loads it into the Q-register. This substep is effected by using an address prepared by adding the address contents of $C(A)_U$, designated by the AU tag of the LDAQ instruction, to the address portion of the instruction, which has the value 4. The contents of the fifth and sixth cells of the top entry in the .SREG stack are thereby loaded into the respective A- and Q-registers. The STAQ instruction in the 607.MFALT substep saves the contents of the A- and Q-registers in the respective ninth and 10th cells of the .STEMP block of SSA X. Therefore, bits 24 –35 of the 10th cell of the .STEMP block now comprise the file code of file F.

The entry point word for the required SSA module is next obtained. The EAA instruction in the 610.MFALT substep loads the A-register with the address of the FMMET cell. Thus, $C(A)_U$ receives the address of the cell immediately below the first entry in the entry point word table. The ADLA instruction in the 611.MFALT substep adds the MME-type code in the top entry of the IC&I stack to the address in $C(A)_U$ to obtain the address of the required entry point word. The top entry of the IC&I stack is obtained by utilizing the .SSTAK+1 stack control word in SSA X, which provides for retrieving the top entry from the stack and popping up the stack. In the instant example, bits 0–17 of the top entry of the IC&I stack represent the MME-type code number 3 (refer to previous description of the 573.MFALT substep of FIG. 18), so that after completion of the ADLA instruction $C(A)_U$ holds the address of the FMMET+3 cell. The LDQ instruction in the 612.MFALT substep uses the FMMET+3 address to load the required entry point word into the Q-register. The entry point word is retrieved from the third cell in the entry point word table by using an address prepared by adding the address contents of $C(A)_U$, designated by the AU tag of the LDQ instruction, to the address portion of the instruction, which has the value 0. The entry point word now in the Q-register comprises the number 41 in $C(Q)_U$, which represents the .MFLT 1 module, and the number 1 in $C(Q)_L$, which represents the required entry point into the .MFLT1 module. The zero indicator is turned on if the new contents of the Q-register are 0, which is a consequence of no entry point word being provided in the table for the corresponding MME-type code number. The TNZ instruction in the 613.MFALT substep transfers control to the previously mentioned FMMEE subroutine if an invalid MME-type code had been supplied, as denoted by the zero indicator being on; otherwise, control is transferred to the symbolic relative address .CRCAL+2, which represents the HCLF substep in the Dispatcher, FIG. 20. In the instant example, the HCLF substep is executed.

The Dispatcher program is entered to place the .MFLT1 program in execution from its entry point 1.

The Dispatcher first determines whether the requested module is to be placed in execution in the Resident Monitor or in an SSA. The LDQ instruction in the HCLF substep loads the .CALL word of the .MFLT1 module from the Module Directory 127, FIG. 4, into the Q-register. The LDQ instruction utilizes the .CRMDD symbolic address as an indirect address to retrieve and use the indirect word in the .CRMDD cell, FIG. 5. The .CRMDD indirect word holds a pointer to the base cell of the Module Directory. The second effective address prepared by the LDQ instruction is that of the .CALL word of the .MFLT1 module, which is prepared by adding the module number in $C(Q)_U$, designated by the QU-tag of the instruction, to the pointer of the indirect .CRMDD word. Therefore, the .CALL word of the .MFLT1 module is obtained from the 41st cell in the Module Directory, by employing the module number 41 as an index relative to the base cell of the Module Directory. The negative indicator is turned on if the new $C(Q)_0$ is a binary 1. The TMI instruction in the 1321.MDISP substep transfers control to the HCLA substep if the module is not both reentrant and to be executed in the Resident Monitor, as denoted by the negative indicator being on; otherwise, control is transferred to the requested module in the Resident Monitor. In the instant example, the .CALL word for the .MFLT1 module represents that the module is not both reentrant and to be executed in the Resident Monitor, as denoted by a binary 1 in the bit 0 position, so that the HCLA substep follows.

If bit 16 of a .CALL word is a binary 1, the corresponding module must be executed in the Resident Monitor. The .CALL word of the .MFLT1 module, which is presently held in the Q-register, is now tested to determine the value of the bit 16 contents thereof. The CANQ instruction in the HCLA substep performs an AND function on each bit of $C(Q)_U$ and the corresponding bit of the direct operand 000002, designated by the Du-tag of the instruction. If bit 16 of $C(Q)_U$ is a binary 1, the corresponding AND-bit Zi is a binary 1, and the zero indicator is off at the conclusion of the instruction, otherwise the zero indicator is on. The TZE instruction in the 1325.MDISP substep then transfers control to the HCLE substep if the requested module is to be executed in SSA X, as denoted by the zero indicator being on; otherwise, control is transferred to the requested module in the Resident Monitor, Fig. 21. In the instant example, the .MFLT1 module must be executed in an SSA, so that the HCLE substep follows.

Having determined that the .MFLT1 module must be placed in execution in SSA X, the Dispatcher proceeds to prepare SSA X for such execution. The LDA instruction in the HCLE substep loads the entry point word of the .MFLT1 module into the A-register. The entry point word is retrieved from its cell in the entry point word table by using an address prepared by adding the entry point word address prepared in the 611.MFALT substep of FIG. 19 in $C(A)_U$, designated by the AU tag of the LDA instruction, to the address portion of the instruction, which has the value 0. The STA instruction in the 1367.MDISP substep loads the entry point word in the .SLOAD+1 cell of SSA X, which cell is provided for holding the entry point word of a module being loaded into the SSA. The TRA instruction of the 1370.MDISP substep transfers control of the Data Processor to the DLD substep.

The LDAQ instruction of the DLD substep retrieves the file code of file F from the .STEMP block of SSA X and loads it into the Q-register. The file code was previously saved in the 10th cell of the .STEMP block in the 607.MFALT substep of FIG. 19. Therefore, bits 24–35 of the Q-register now comprise the file code of file F. The SREG instruction in the 1506.MDISP substep saves the contents of the working registers at this time on top of the .SREG stack of SSA X, in preparation for a possible transfer of control to another program of the operating system for retrieving the required module from auxiliary store. This substep is effected by utilizing the .SREGS control word in SSA X, which provides for storing the contents of the working registers on top of the .SREG stack and pushing down the stack.

The A-register is now prepared with a value for turning on bit 2 of the .STATE word of SSA X to denote that a module is being loaded into SSA X, FIG. 7. The LDA instruction in the 1507.MDISP substep loads the required value into the A-register, FIG. 22. The DU-tag of the LDA instruction provides for using the address portion of the instruction as a direct operand to be loaded into $C(A)_U$. Thus, the direct operand 100000 is loaded into $C(A)_U$ and 0 is loaded into $C(A)_L$. The A-register how holds a number comprising all binary 0's except in the bit 2 position, which holds a binary 1. The ERSA instruction in the 1510.MDISP substep turns on bit 2 of the .STATE word in SSA X. The ERSA instruction performs an EXCLUSIVE-OR function on each bit of the .STATE word and the corresponding bit of the number in the A-register. Thus, all the bits of the .STATE word which are on remain on, and bit 2 is turned on as a consequence of the binary 1 in and bit 2 position in $C(A)_U$. The .STATE word now indicates that SSA X is busy being loaded with a module. The series of instructions which follow the ERSA instruction of the 1510.MDISP substep have their inhibit interrupt bits off, so that the processor executing this series can be interrupted by the operating system, if necessary.

The contents of the .SLOAD+1 cell are tested to determine whether a new module is being placed in execution in the corresponding SSA or whether a previously suspended module, now resident in the SSA module stack, is to be loaded into the SSA. The SZN instruction in the 1511.MDISP substep turns the zero indicator on if a previously suspended module is to be returned to execution in the SSA, as designated by the zero contents of the .SLOAD+1 cell. The TZE instruction in the 1512.MDISP substep then transfers control to the DPU subroutine for obtaining the suspended module from the SSA module stack and loading it into the SSA, as denoted by the zero indicator being on; otherwise the next substep is executed to provide for placing a new module in execution. In the instant example, the .SLOAD+1 cell holds the nonzero entry point word of the .MFLT1 module, so that the next substep is executed.

The .CRTCL cell maintains a representation of the number of modules placed in execution by the operating system. Therefore, the AOS instruction in the 1513.MDISP substep adds 1 to the quantity represented by the contents of the .CRCTL cell to account for the ensuing execution of the .MFLT1 module.

The remaining free space in the IC&I stack of SSA X is now tested to determine whether it is sufficient to accommodate further requirements. The LDX1 instruction in the 1514.MDISP substep loads the contents of the cell of SSA X having the symbolic address .SSA into the X1-register. Since the .SSA cell maintains the absolute address of the first free cell on top of the IC&I stack, the X1-register now holds this address. The SBLX1 instruction in the 1515.MDISP substep converts the absolute address in the X1-register to an address relative to the base cell of program X. This conversion is effected by subtracting the contents of bits 0–17 of the .CRLAL table entry assigned to program X from the contents of the X1-register (refer to previous description of the 155.MFALT substep of FIG. 14). Therefore, the base cell address in bits 0–17 of the referenced .CRLAL entry is subtracted from the absolute address of the top cell of the IC&I stack in the X1-register, changing the absolute address in the X1 -register to the address of the top cell of the IC&I stack relative to the base cell of program X. The CMPX1 instruction in the 1516.MDISP substep compares the value of the relative address of the top cell of the IC&I stack with the value of the relative address of the fifth cell of the IC&I stack, FIG. 23. This function is effected by comparing the contents of the X1-register with the direct operand 6–.LSSA, designated by the DU-tag of the instruction, and turning on the negative indicator if C(X1) is less than the direct operand. The symbolic address .LSSA represents the number of cells of SSA X, so that the direct operand 6–.LSSA represents the address of the fifth cell of the IC&I stack relative to the base cell of program X, FIG. 6. Therefore, the negative indicator is set by the CMPX1 instruction only if the top cell of the IC&I stack is no higher than the fourth cell of the stack, indicating that there are no more than the three entries in the stack. The TPL instruction in the 1517.MDISP substep transfers control to the DPD subroutine for pushing down the contents of SSA X in the SSA module stack if there are more than three entries in the IC&I stack, as denoted by the negative indicator being off; otherwise, the next substep is executed. If the DPD subroutine, not described herein, is executed the DLD1 subroutine follows for initiating retrieval of the requested module from auxiliary storage, FIG. 44.

Figure 23:
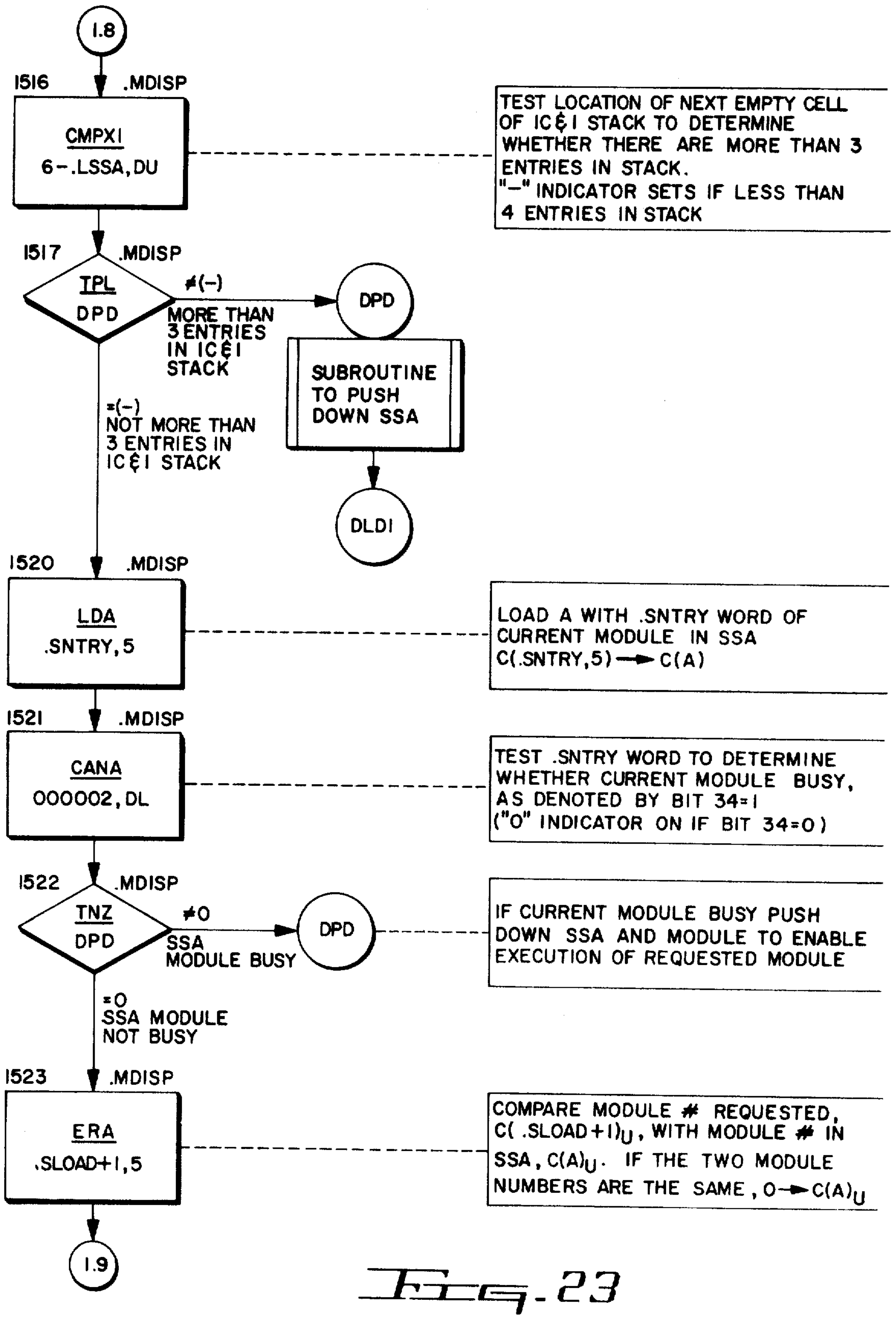

If the IC&I stack of SSA X is determined to have adequate free space, the Dispatcher makes a test to determine whether the module presently residing in SSA X has been interrupted and therefore must be preserved before it can be overlaid in SSA X, FIG. 23. This test is that shown at $S_1$ in block 403 of FIG. 8*a*, $S_{11}$ in block 423 of FIG. 9*a*, and $S_{11}$ in block 427 of FIG. 9*b*. The LDA instruction in the 1520.MDISP substep loads the contents of the .SNTRY cell of SSA X into the A-register. The .SNTRY word, which is the first data word of the current module in SSA X, identifies the module and provides other information relative to the module. If the current module in SSA X has been in execution but has been suspended prior to completion, bit 34 of the .SNTRY word is a binary 1, FIG. 7. The CANA instruction in the 1521.MDISP substep performs an AND function on each bit of $C(A)_L$ and the corresponding bit of the direct operand 000002, designated by the DL-tag of the instruction. If bit 34 of $C(A)_L$ is a binary 1 the corresponding AND-bit Zi is a binary 1 and the zero indicator is off at the conclusion of the instruction, otherwise the zero indicator is on. The TNZ instruction in the 1522.MDISP substep then transfers control to the DPD subroutine if the current module has not been completed and must be preserved in the SSA module stack of SSA X, as denoted by the zero indicator being off; otherwise the next substep is executed. In the instant example, the next substep is executed.

The Dispatcher now determines whether the module presently in SSA X is the requested .MFLT1 module, so that it may be considered for execution without the need to reload SSA X by transferring another copy of the .MFLT1 module from auxiliary store. This determination is effected by comparing the number of the requested module, held in bits 0–17 of the .SLOAD+1 cell of SSA X (refer to previous description of the 1367.MDISP substep of FIG. 21), with the number of the current module in SSA X, presently available in $C(A)_U$. The ERA instruction in the 1523.MDISP substep performs an EXCLUSIVE-OR function on each bit of the .SLOAD+1 word in SSA X and the corresponding bit of the .SNTRY word in the A-register. After completion of the ERA instruction, if the number of the requested module and the number of the module currently in the SSA are the same the contents of $C(A)_U$ are zero. To determine whether $C(A)_U$ is zero, the CANA instruction in the 1524.MDISP substep performs an AND function on each bit of $C(A)_U$ and the corresponding bit of the direct operand 000777, designated by the DU-tag of the instruction, FIG. 24. If any one of bits 9–17 in the A-register is a binary 1, the corresponding AND-bit Zi is a binary 1 and the zero indicator is off at the conclusion of the instruction, otherwise the zero indicator is on. The TNZ instruction in the 1525.MDISP substep then transfers control to the DLD1 subroutine to initiate retrieval of the requested .MFLT1 module from auxiliary store if the module is not in SSA X, as denoted by the zero indicator being off; otherwise the next substep is executed to determine whether the .MFLT1 module in SSA X is in condition to be placed in execution.

Figure 24:
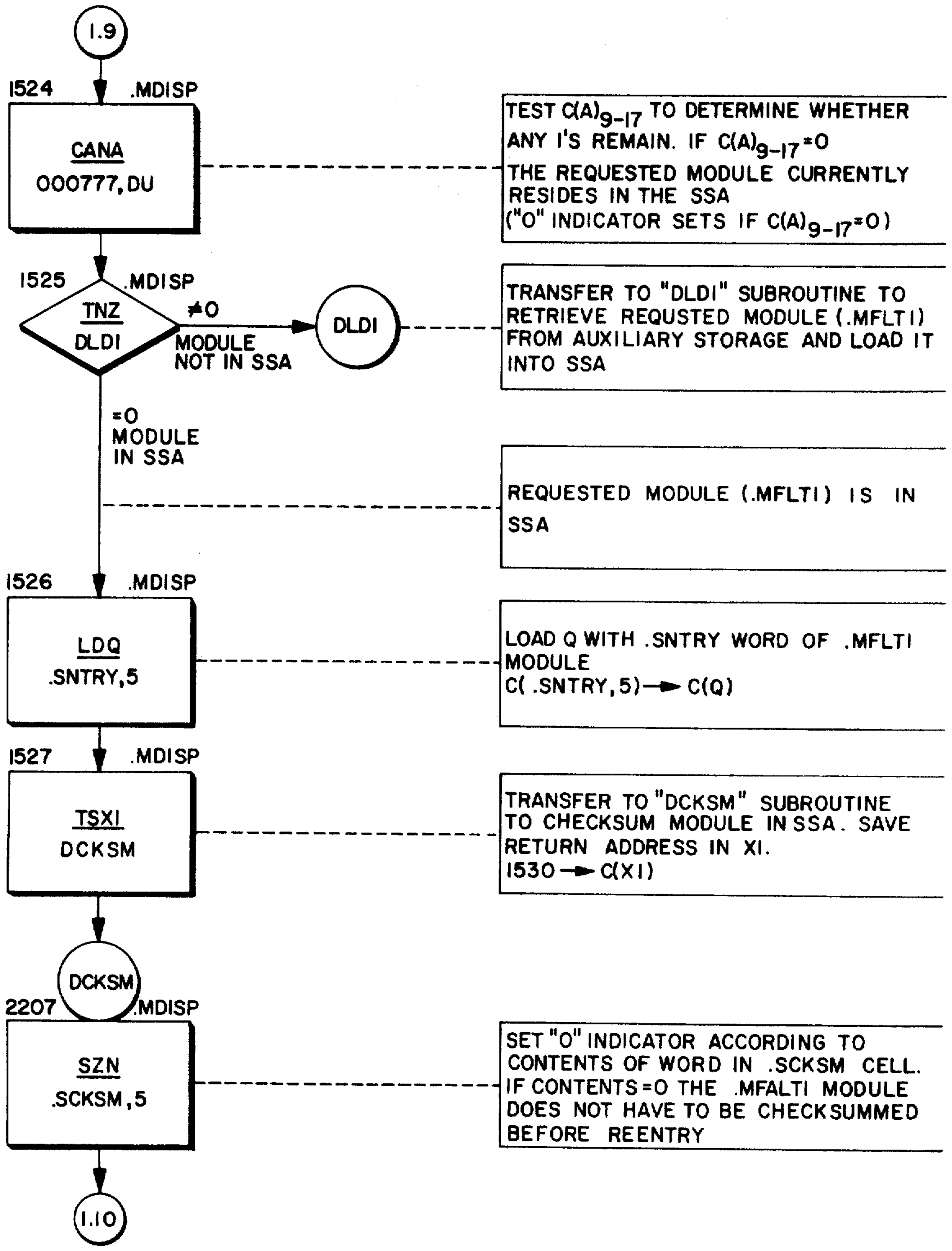

The operation for determining whether the current module in SSA X is in condition to be placed in execution is described in connection with the remainder of FIG. 24 and FIG. 25. The operation for retrieving the SSA module from auxiliary store is described in connection with FIGS. 44–49.

REENTERING SSA MODULE

Most modules qualify for execution only if their contents satisfy the checksum test described previously herein. In preparation for the test the LDQ instruction in the 1526.MDISP substep loads the .SNTRY word into the Q-register. The TSX1 instruction in the 1527.MDISP substep then transfers control to the DCKSM subroutine, saving a return address by loading the contents of the instruction counter, incremented by one, into the X1-register. Therefore, the X1-register receives the address 1530.

The contents of the .SCKSM word designates whether a checksum test is required for qualifying the corresponding module in the SSA for execution, a zero-valued .SCKSM word designating that the test is not required. The SZN instruction in the 2207.MDISP substep senses the value of the contents of the .SCKSM cell of SSA X and turns the zero indicator on if the checksum test is not required. The TZE instruction in the 2210.MDISP substep, FIG. 25, then transfers control back to the substep second-following that from which the DCKSM subroutine was entered if the zero indicator is on; otherwise the DCKSM subroutine proceeds to perform the checksum test. In the instant example, the checksum test must be performed.

As described previously the checksum test comprises generating the sum of all data words of the SSA module and comparing the sum with the checksum value in the .SCKSM word. If the sum and the checksum values are equal, the SSA module is unchanged from its original form so that it qualifies for execution once again, and the zero indicator is turned on. After completion of the checksum test, the TZE instruction in the 2227.MDISP substep transfers control to the substep second-following that from which the DCKSM subroutine was entered if the checksum test was successful, as denoted by the zero indicator being on; otherwise, the next substep is executed. If the checksum test was unsuccessful the TNZ instruction of the 2230.MDISP substep transfers control to the instruction next following that from which the DCKSM subroutine was entered. The TNZ instruction in the 1530.MDISP substep then transfers control to the DLD1 subroutine to obtain a new copy of the SSA module from auxiliary store.

If the module in SSA X qualifies for execution, it will now be designated as being in execution (busy). The A-register first is prepared with a value for turning on bit 34 of the .SNTRY word of SSA X to denote that the module in SSA X is busy. The LDA instruction in the 1531.MDISP substep loads the direct operand 000002 into $C(A)_L$, as designated by the DL tag of the instruction, and 0 is loaded into $C(A)_U$. The A-register now holds a number comprising all binary 0's except in the bit 34 position, which holds a binary 1. The ORSA instruction in the 1532.MDISP substep turns on bit 34 of the .SNTRY word of SSA X. The ORSA instruction performs an INCLUSIVE-OR function on each bit of the .SNTRY word and the corresponding bit of the number in the A-register. All bits of the .SNTRY word which are on remain on, and bit 34 is turned on as a consequence of the binary 1 in the bit 34 position of the number in the A-register.

The series of instructions which follow the ORSA instruction of the 1532.MDISP substep have their inhibit interrupt bits on, so that the processor executing this series cannot be interrupted by the operating system.

The Dispatcher now enters the DLD4 subroutine to place in execution the .MFLT1 module, which is now resident in SSA X and qualified for execution.

OBTAINING SSA MODULE FROM AUXILIARY STORAGE

Figure 44:
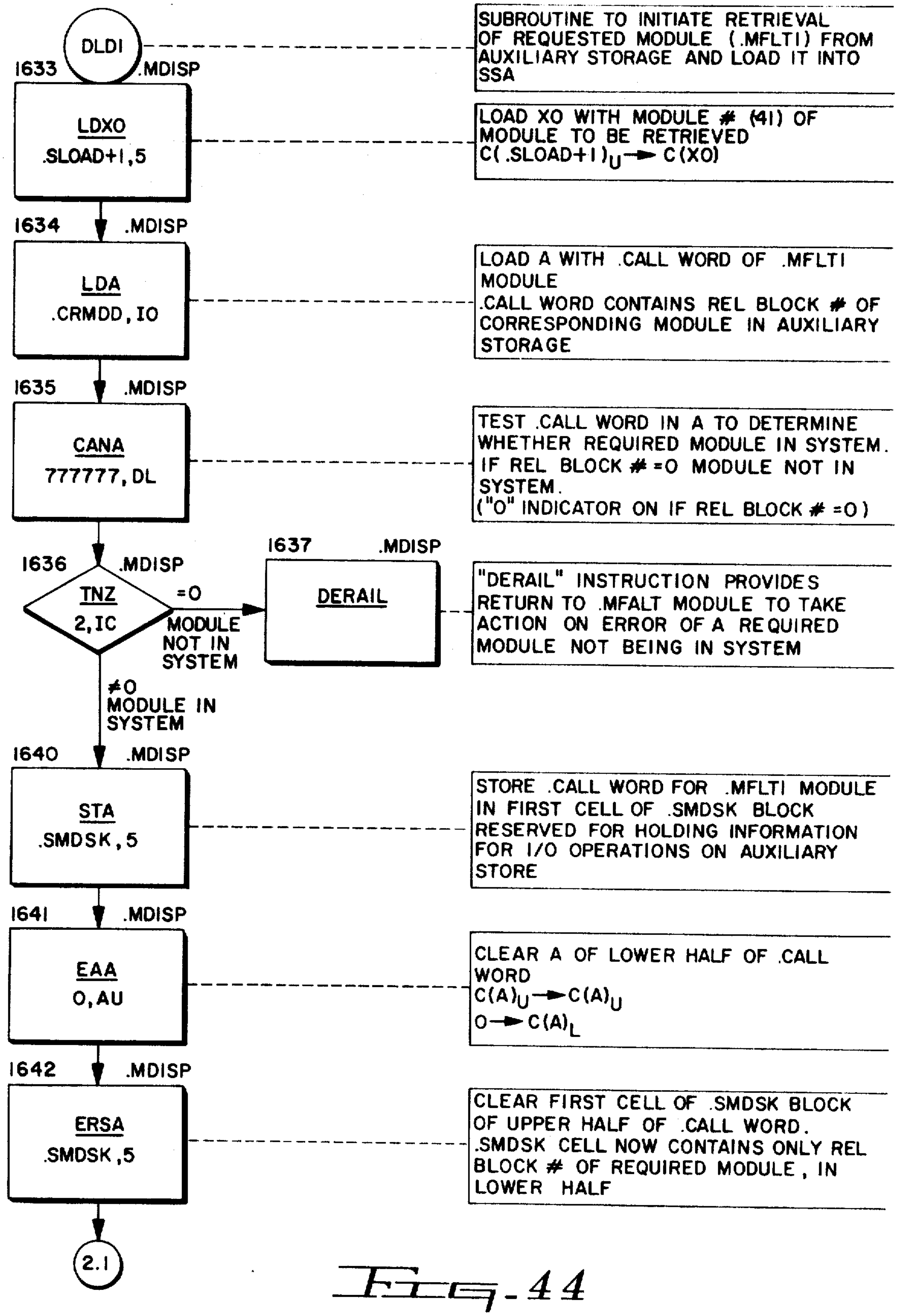
Figure 45:
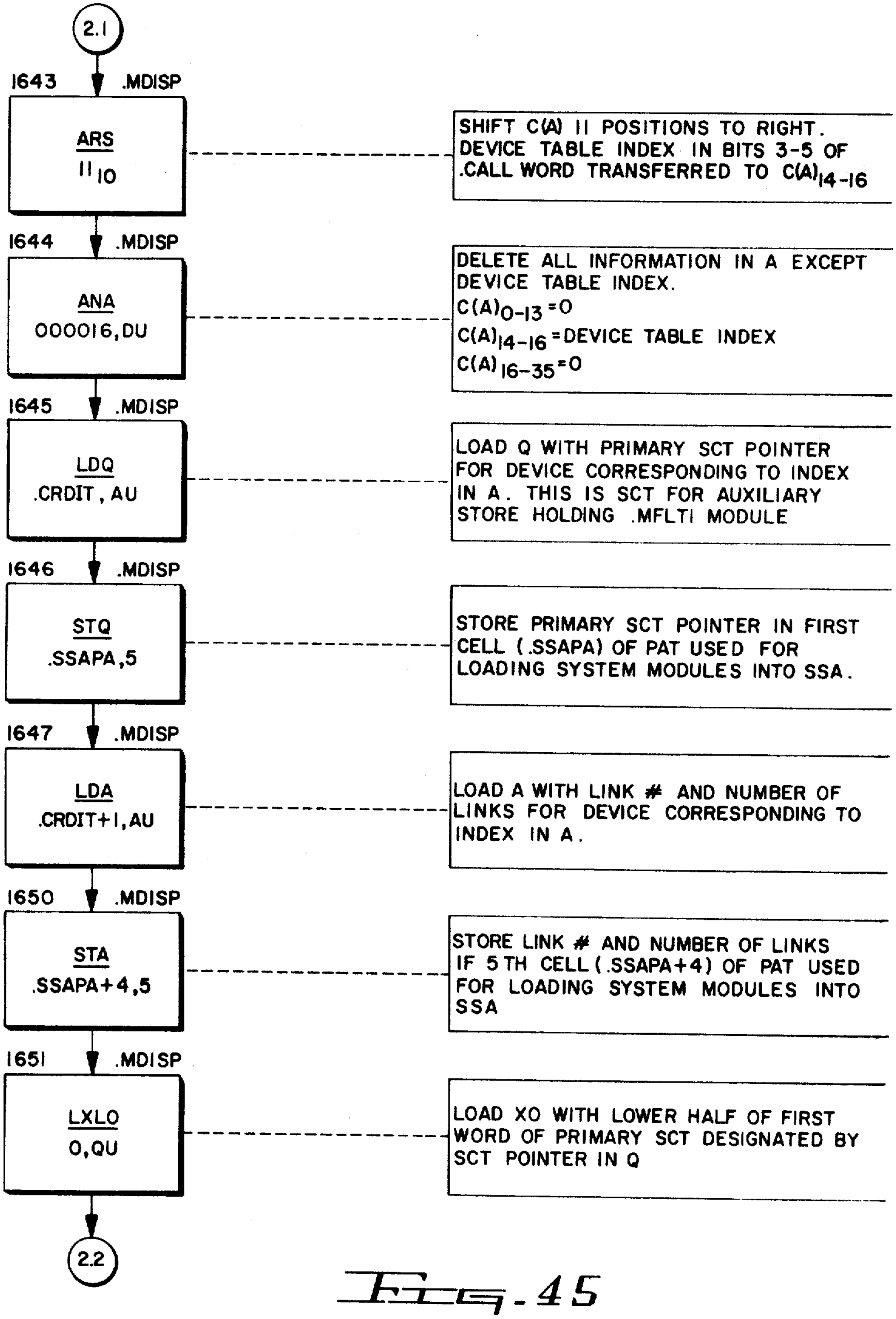
Figure 46:
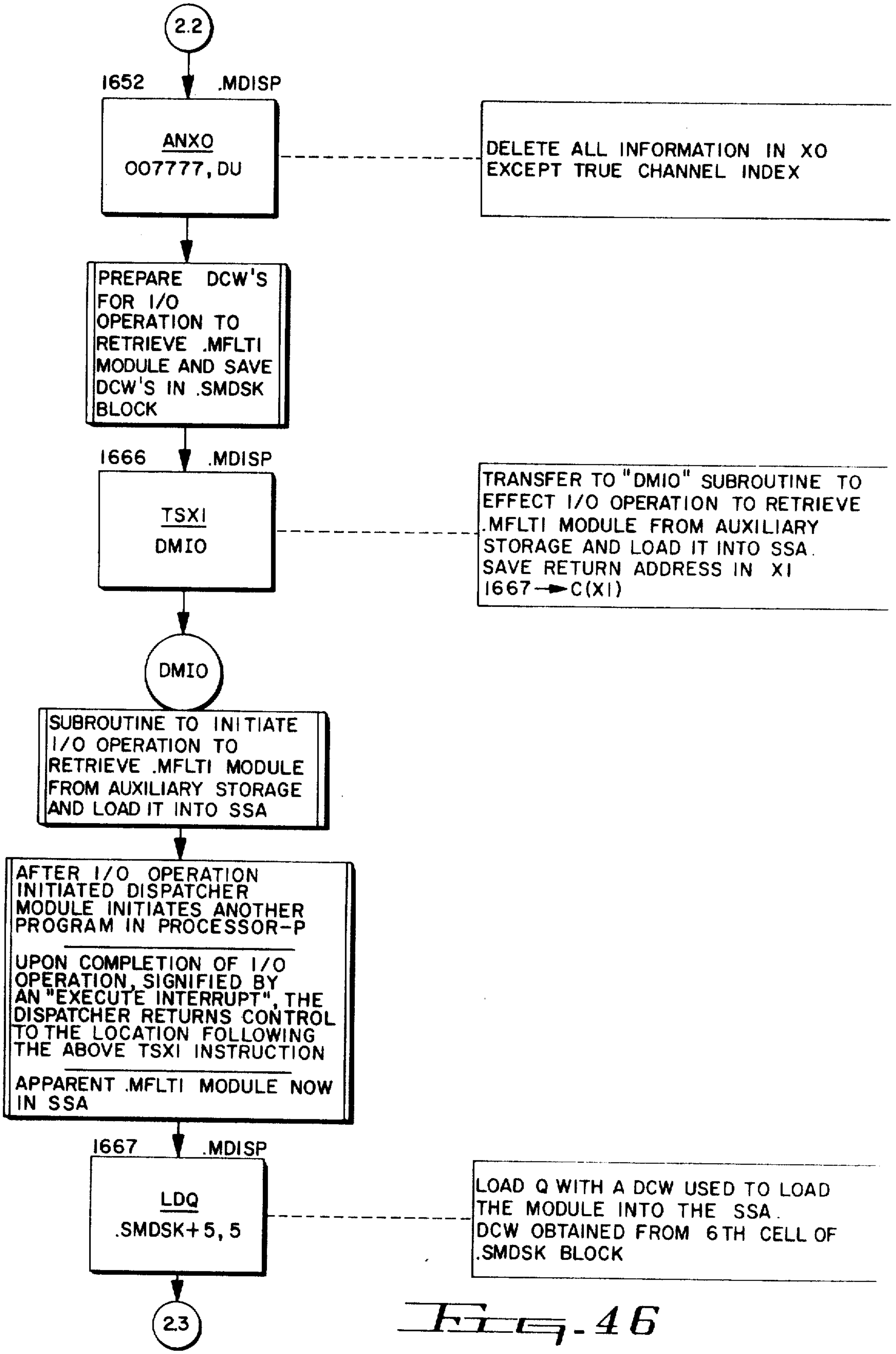
Figure 47:
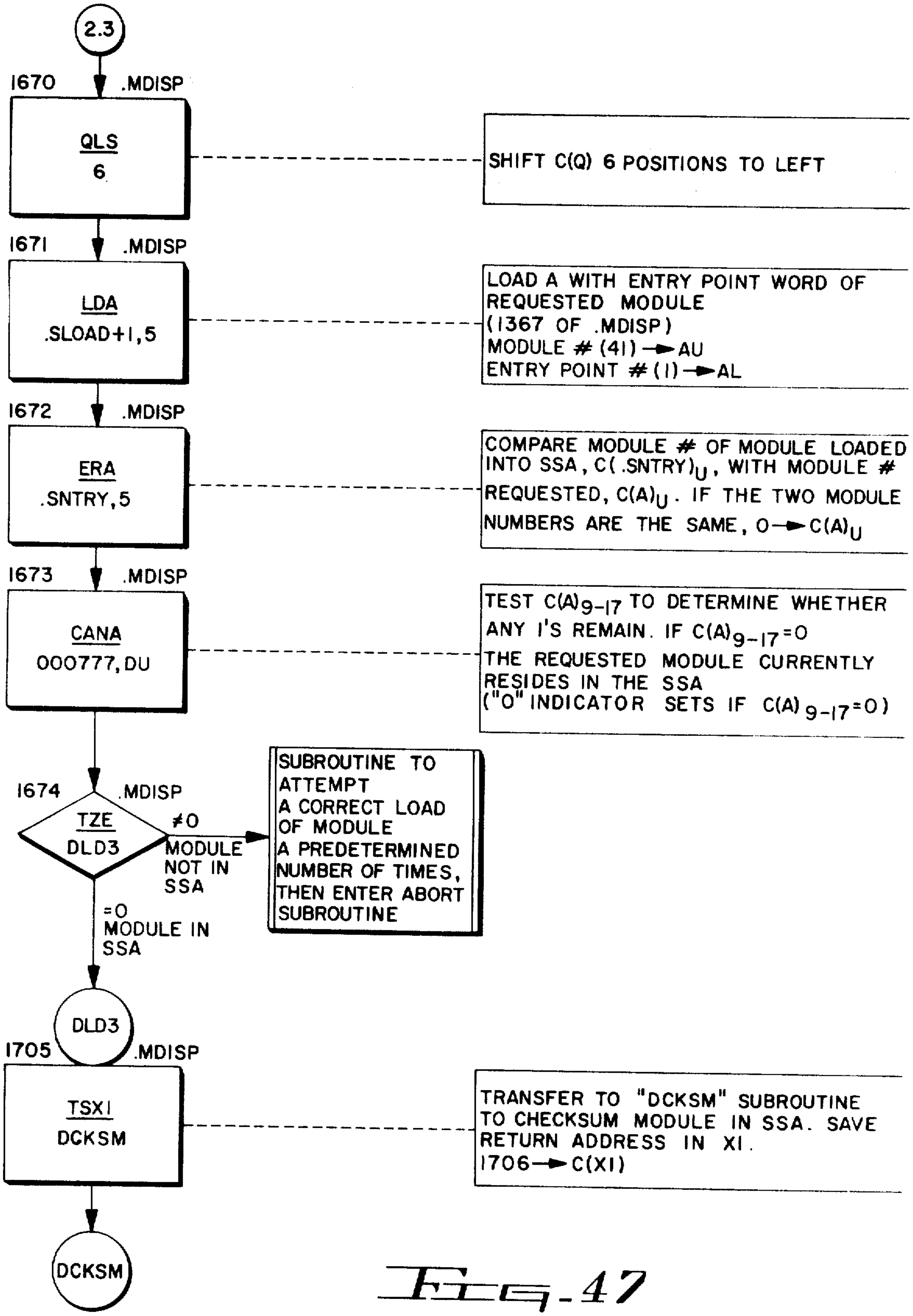

The DLD1 subroutine, FIG. 44, is entered to initiate retrieving the requested module from auxiliary storage and loading the module into an SSA. The primary item of information required at this point in the Dispatcher is the number of the required module, which is held in the .SLOAD+1 cell of the SSA into which the module is to be loaded (refer to previous description of the 1367.MDISP substep of FIG. 21). In the instant example, the .MFLT1 module, designated as module 41, is being requested for SSA X.

The number of the required module is first saved in the X0-register. The LDX0 instruction in the DLD1 substep loads the module number, represented by bits 0–17 of the .SLOAD+1 cell of SSA X, into the X0 -register. The LDA instruction in the 1634.MDISP substep loads the .CALL word of the .MFLT1 module into the A-register. The LDA instruction utilizes the pointer in the .CRMDD cell, modified by the module number in the X0-register, to obtain the .CALL word of the .MFLT1 module from the Module Directory (refer to previous description of the HCLF substep of FIG. 20).

The .CALL word in the A-register is used to direct the operating system in retrieving the .MFLT1 module from the auxiliary store. However, before attempting the retrieval of the required module, the Dispatcher determines whether the corresponding module is available in the auxiliary store, as designated by a nonzero auxiliary store relative block number address in the .CALL word. The CANA instruction in the 1635.MDISP substep performs an AND function on each bit of $C(A)_L$ and the corresponding bit of the direct operand 777,777, designated by the DL-tag of the instruction. If the relative block number in $C(A)_L$ is zero the zero indicator is on at the conclusion of the instruction. The TNZ instruction in the 1636.MDISP substep then transfers control to the 1640.MDISP substep if the required module is available in auxiliary storage, as denoted by the zero indicator being off; otherwise, the next substep, a "Derail" fault, is executed for transferring control to the Fault Processor to take action on the problem encountered.

The Dispatcher now commences preparation of the .SMDSK block and system module PAT of SSA X for use by the I/O operation which will obtain the .MFLT1 module and load it into SSA X. The STA instruction in the 1640.MDISP substep transfers the .CALL word in the A-register to the first cell of the .SMDSK block of SSA X. The EAA instruction in the 1641.MDISP substep clears the lower half of the A-register in preparation for the subsequent clearing of bits 0–17 of the first cell of the .SMDSK block. The EAA instruction effects its clearing function by adding $C(A)_U$, designated by the AU-tag of the EAA instruction, to the direct operand 0, replacing $C(A)_U$ with the sum, and loading a zero into $C(A)_L$. The ERSA instruction in the 1642.MDISP substep then clears bits 0–17 of the first cell in the .SMDSK block of SSA X by performing an EXCLUSIVE-OR function on each bit of the .CALL word in the first cell of the .SMDSK block and the corresponding bit of the contents of the A-register. All bits in the lower half of the first .SMDSK cell which are on remain on, and all bits in the upper half of the cell are off after execution of the instruction. The first cell of the .SMDSK block of SSA X now contains only the relative block number address of the .MFLT1 module in its lower half.

Figure 5:
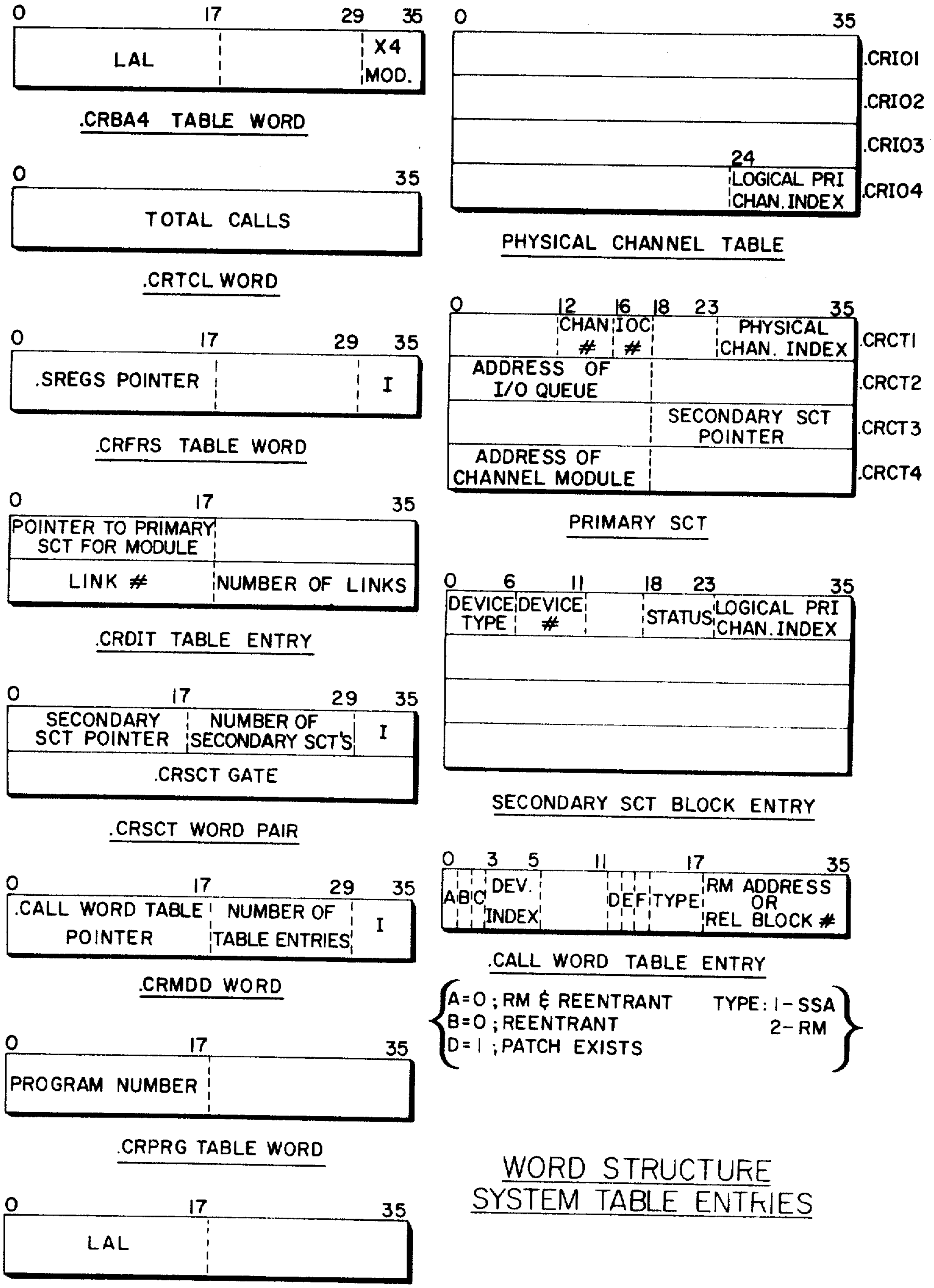
FIG. 5 is an illustration of the information content of various entries in the Resident Monitor region.

The device index portion of the upper half of the .CALL word residing in the A-register. FIG. 5, is isolated next in order to retrieve the Device Index Table entry, FIGS. 4 and 5, of the I/O device holding the .MFLT1 module. The ARS instruction in the 1643.MDISP substep shifts the contents of the A-register to the right by 11 bit positions, as designated by the control address portion of the instruction, FIG. 45. Therefore, this substep moves the device index portion from bit positions 3–5 to bit positions 14–16 of the A-register. The ANA instruction in the 1644.MDISP substep then clears the A-register of all information but the device index portion by performing an AND function on each bit of $C(A)_U$ and the corresponding bit of the direct operand 000016, designated by the DU-tag of the instruction. After execution of the ANA instruction only those of bits 14–16 of the A-register which were on remain on and the remaining bits of the A-register are turned off. Therefore, the upper half of the A-register now holds the complete device index in bits 14–17.

The contents of the Device Index Table entry of the I/O device holding the .MFLT1 module are now loaded into the system module PAT of SSA X. The LDQ instruction in the 1645.MDISP substep loads the Q-register with the first word of the two-word Device Index Table entry referenced by the device index. This function is effected by using an address prepared by adding the device index in $C(A)_U$, designated by the AU-tag of the LDQ instruction, to the address portion of the instruction, which represents the base cell .CRDIT of the Device Index Table. The Q-register now holds the pointer to the Primary SCT of the I/O channel serving the I/O device holding the .MFLT1 module. The STQ instruction in the 1646.MDISP substep transfers the Primary SCT pointer from the Q-register to the first cell of the system module PAT of SSA X, utilizing the .SSAPA symbolic address of the first cell of the PAT. The LDA instruction in the 1647.MDISP substep loads the A-register with the second word of the Device Index Table entry referenced by the device index. This function is effected by using an address prepared by adding the device index in $C(A)_U$, designated by the AU-tag of the LDA instruction, to the address portion of the instruction, which represents the second cell .CRDIT+1 of the Device Index Table. The A-register now holds the description of the file in which the .MFLT1 module is resident; namely, the first link number and number of links of the file portion holding the .MFLT1 module. The STA instruction in the 1650.MDISP substep transfers the file description from the Q-register to the fifth cell of the system module PAT of SSA X, utilizing the .SSAPA+4 symbolic relative address of the fifth cell of the PAT.

The Dispatcher next initiates the preparation of DCW's for the .SMDSK block of SSA X. The LXL0 instruction of the 1651.MDISP substep loads the bit 18–35 contents of the first word of the Primary SCT identified by the pointer in the Q-register into the X0-register. The first word of this Primary SCT is retrieved from its cell in working storage by using an address prepared by adding the Primary SCT pointer in $C(Q)_U$, designated by the QU-tag of the instruction, to the address portion of the instruction, which has the value 0. The X0-register now holds the physical (true) channel index, which represents the actual I/O apparatus serving the I/O device holding the .MFLT1 module. The ANX0 instruction in the 1652.MDISP substep, FIG. 46, clears the X0-register of all information but the physical channel index by performing an AND function on each bit of C(X0) and the corresponding bit of the direct operand 007777, designated by the DU-tag of the instruction. After execution of the ANX0 instruction, only those of bits 6–17 of the X0-register which were on remain on and bits 0–5 are turned off. Therefore, the X0-register now holds the physical channel index in bits 6–17.

The Dispatcher prepares the necessary DCW's and loads them into the .SMDSK block of SSA X in preparation for the I/O operation to follow. This preparation, not being necessary to an understanding of the instant invention, is not shown herein.

After preparation of the .SMDSK block, the system module PAT, and other information needed for the ensuing I/O operation, the TSX1 instruction in the 1666.MDISP substep then transfers control to the DMIO subroutine, saving a return address by loading the contents of the instruction counter, incremented by 1 into the X1-register. The DMIO subroutine then initiates the appropriate I/O operation by calling the I/O supervisor to retrieve the .MFLT1 module from auxiliary storage and load it into SSA X. Following initiation of the I/O operation, the Dispatcher yields the processor to another program. After the I/O operation has been completed, the I/O supervisor notifies the Dispatcher, which subsequently returns control to the instruction designated by the return address saved in the 1666.MDISP substep.

The Dispatcher now proceeds to determine whether the module loaded into the SSA is the correct module and whether it qualifies for execution. The LDQ instruction in the 1667.MDISP substep loads the Q-register with the sixth word of the .SMDSK block of SSA X, utilizing the .SMDSK+5 symbolic relative address of the sixth cell of the .SMDSK block. The Q-register now holds a DCW prepared previously to control the I/O operation. The QLS instruction in the 1670.MDISP substep shifts the contents of the Q-register to the left by six bit positions, as designated by the control address portion of the instruction, FIG. 47.

To determine whether the new module in SSA X is the requested .MFLT1 module, the LDA instruction in the 1671.MDISP substep loads the A-register with the entry point word of the required module, which has been held in the .SLOAD+1 cell of SSA X. The number of the requested module, now available in bits 0–17 of the A-register, is compared with the number of the new module in SSA X, held in bits 0–17 of the .SNTRY word of SSA X. This comparison is effected by the ERA instruction in the 1672.MDISP substep, which performs an EXCLUSIVE-OR function on each bit of C(A) and the corresponding bit of the .SNTRY word. After completion of the ERA instruction, if the number of the requested module and the number of the module currently in SSA X are the same, the contents of $C(A)_U$ are zero. To determine whether $C(A)_U$ is zero, the CANA instruction in the 1673.MDISP substep performs an AND function on each bit of $C(A)_U$ and the corresponding bit of the direct operand 000,777, designated by the DU-tag of the instruction. If any one of bits 9–17 in the A-register is a binary 1, the corresponding AND-bit Zi is a binary 1 and the zero indicator is off at the conclusion of the instruction, otherwise the zero indicator is on. The TZE instruction in the 1674.MDISP substep then transfers control to the DLD3 substep if the correct module is in SSA X, as denoted by the zero indicator being on; otherwise, control is transferred to a subroutine for attempting to reload the correct module into SSA X.

Figure 48:
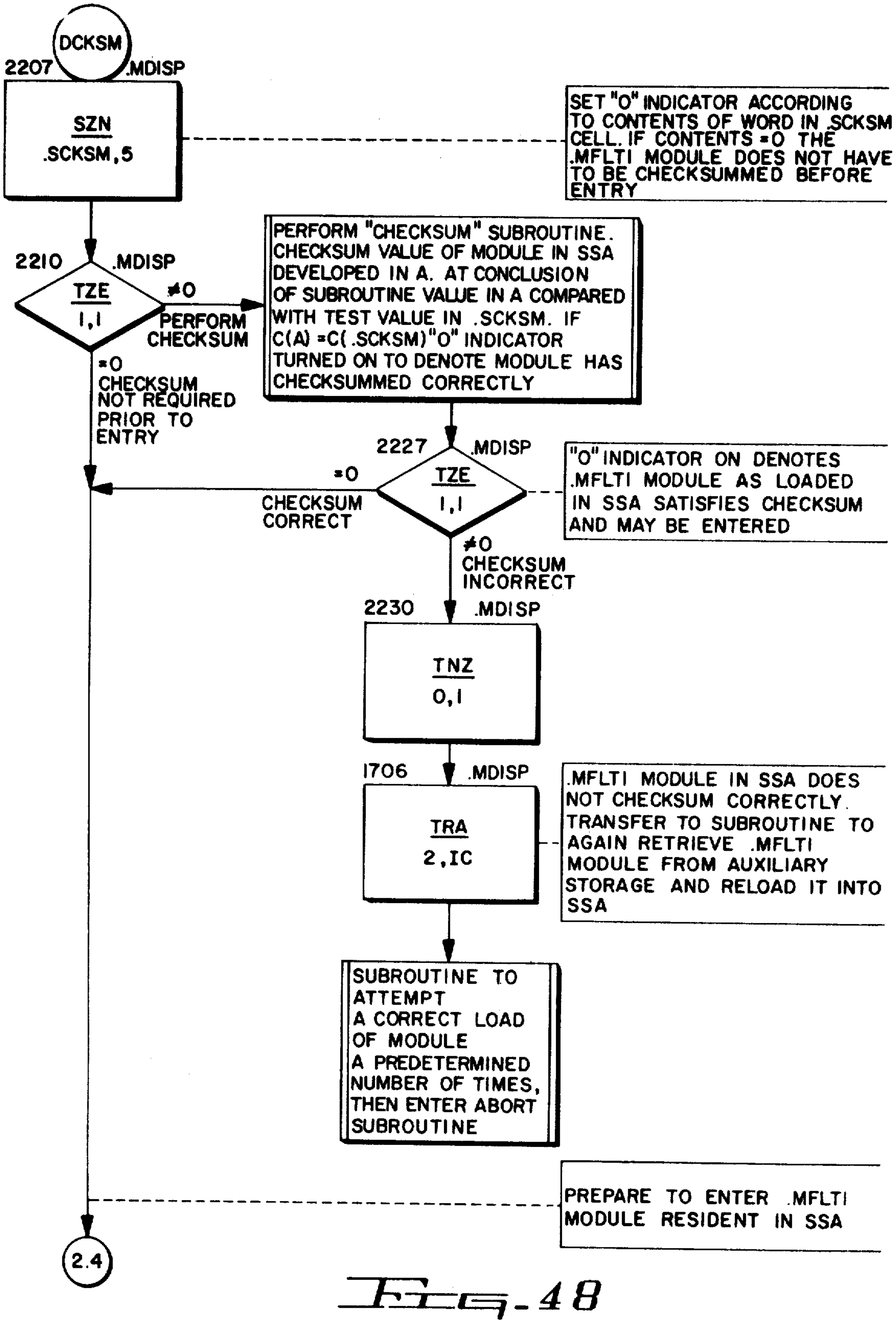

After determining that the correct module is present in the SSA, the Dispatcher performs the previously described checksum subroutine to determine whether the module qualifies for execution. The TSX1 instruction in the DLD3 substep transfers control to the DCKSM subroutine, saving the return address 1706 in the X1-register. The checksum subroutine shown in FIG. 48 is the same as the subroutine shown in FIGS. 24 and 25 and its description will not be repeated. If the module in SSA X qualifies for execution, control is transferred to the 1707.MDISP substep, which in turn transfers control to the DLD5 substep. If the checksum test is unsuccessful, control is transferred to the 1706.MDISP substep, which in turn transfers control to a subroutine for attempting to reload a qualifying .MFLT1 module into SSA X.

Before placing the module in execution, the Dispatcher modifies the module in accordance with patches for the module which may be present in Program Patch table 128, FIG. 3. The presence of a binary 1 in bit position 12 of the module .CALL word, FIG. 5, denotes that there is at least one patch for the module in the Patch table. The LDX2 instruction in the DLD5 substep loads the module number, represented by bits 0–17 of the .SLOAD+1 cell of SSA X, into the X2-register, FIG. 49. The Q-register is prepared with a number for determining the value of bit 12 of the .CALL word of the .MFLT1 module. The LDQ instruction in the 1722.MDISP substep loads the direct operand 000,040 into $C(Q)_U$, as designated by the DU-tag of the instruction, and 0 is loaded into $C(Q)_L$. The Q-register now holds a number comprising all binary 0's except in the bit 12 position, which holds a binary 1. The .CALL word of the .MFLT1 module is then tested to determine the value of bit 12 thereof. The CANQ instruction in the 1723.MDISP substep performs an AND function on each bit of C(Q) and the corresponding bit of the .CALL word of the .MFLT1 module, using an address prepared by adding the module number in the X2-register to the Module Directory pointer in the .CRMDD cell. If bit 12 of the .CALL word is a binary 1 the corresponding AND-bit Zi is a binary 1 and the zero indicator is off at the conclusion of the instruction, otherwise the zero indicator is on. The TZE instruction in the 1724.MDISP substep then transfers control to the DLD4 subroutine to place in execution the .MFLT1 module if there are no patches for the module, as denoted by the zero indicator being on; otherwise control is transferred to a subroutine for applying the patches in the Program Patch table to the .MFLT1 module before transferring to the DLD4 subroutine.

EXECUTION OF SSA MODULE

Figure 25:
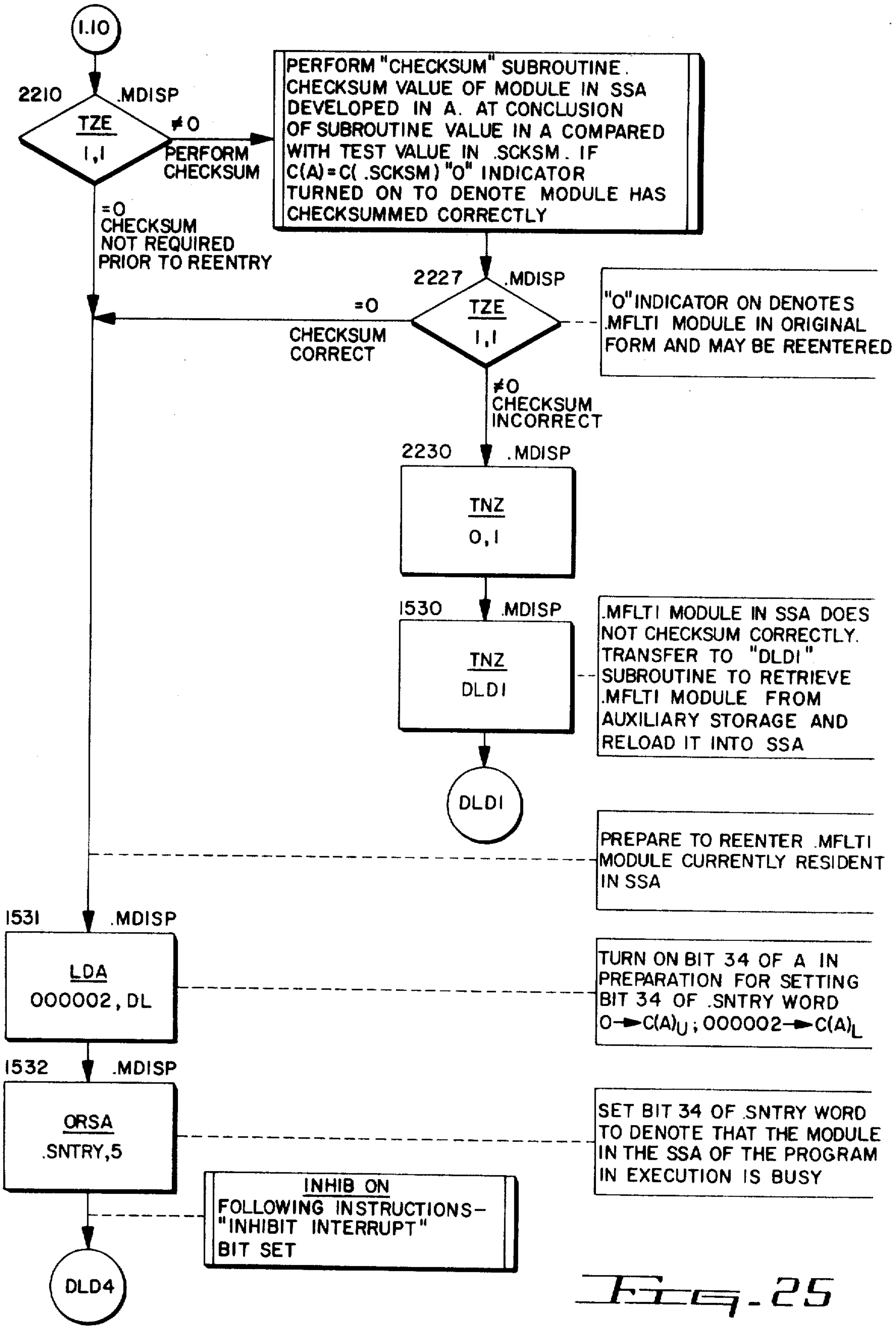
Figure 26:
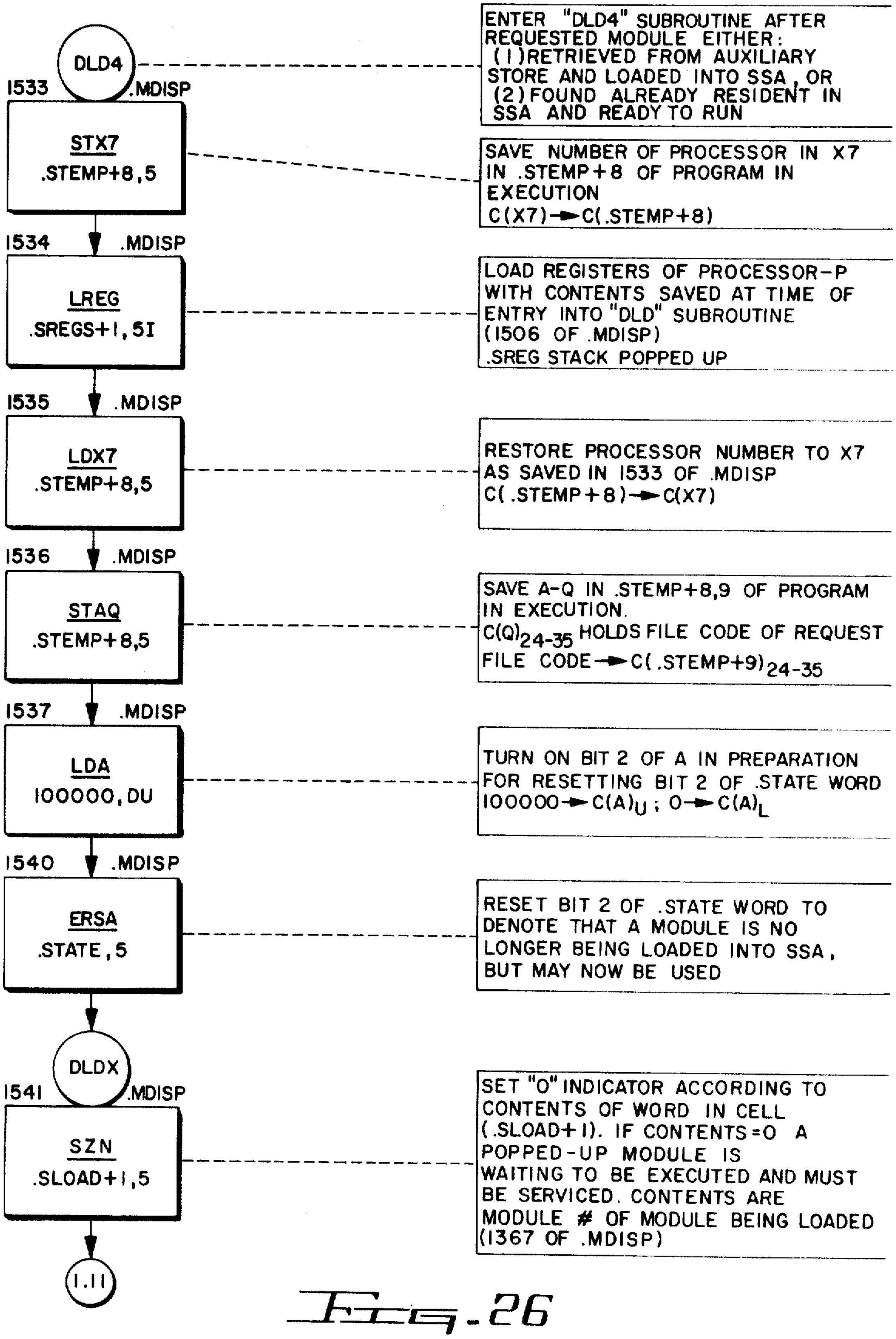
Figure 27:
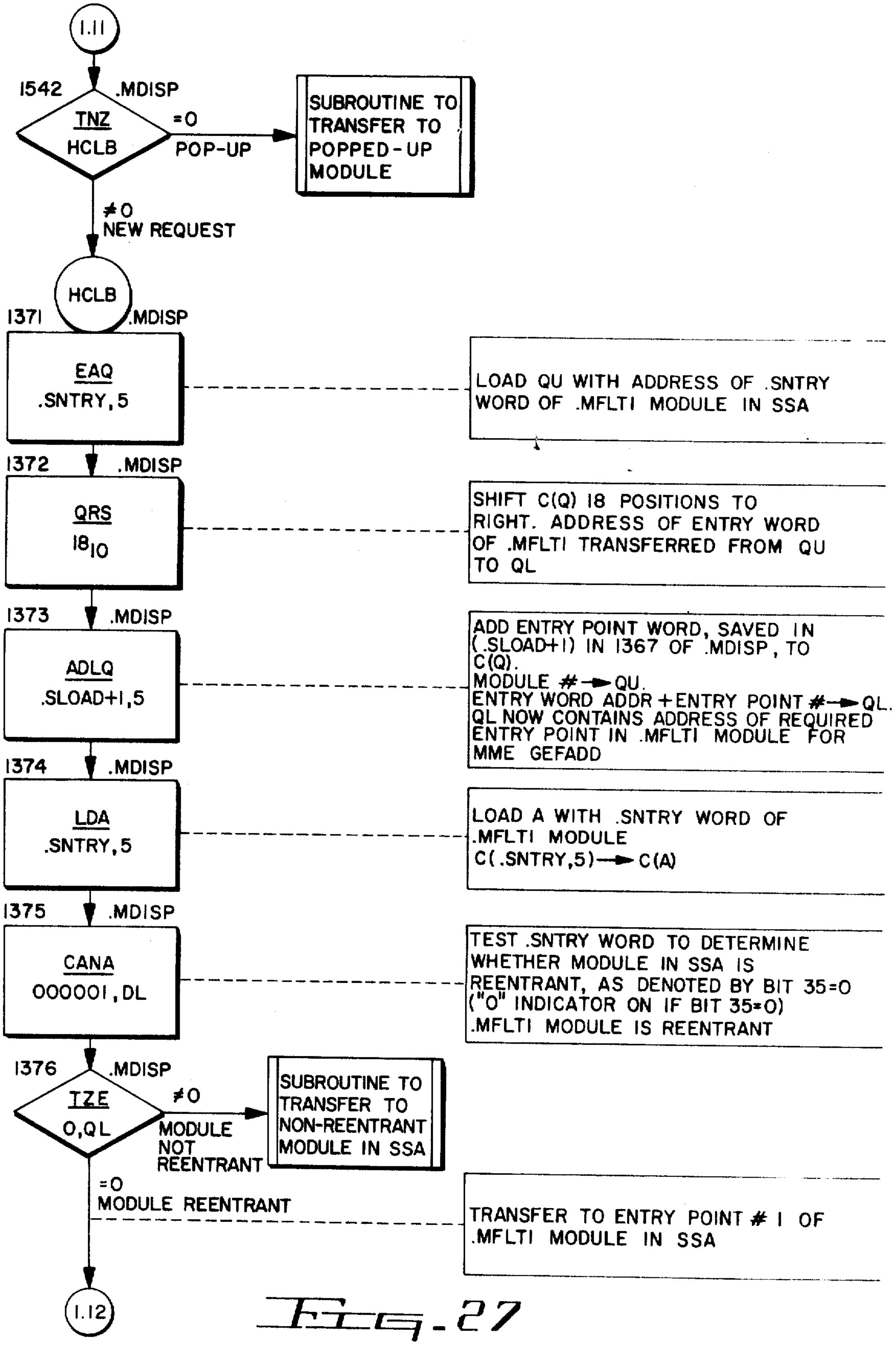
Figure 28:
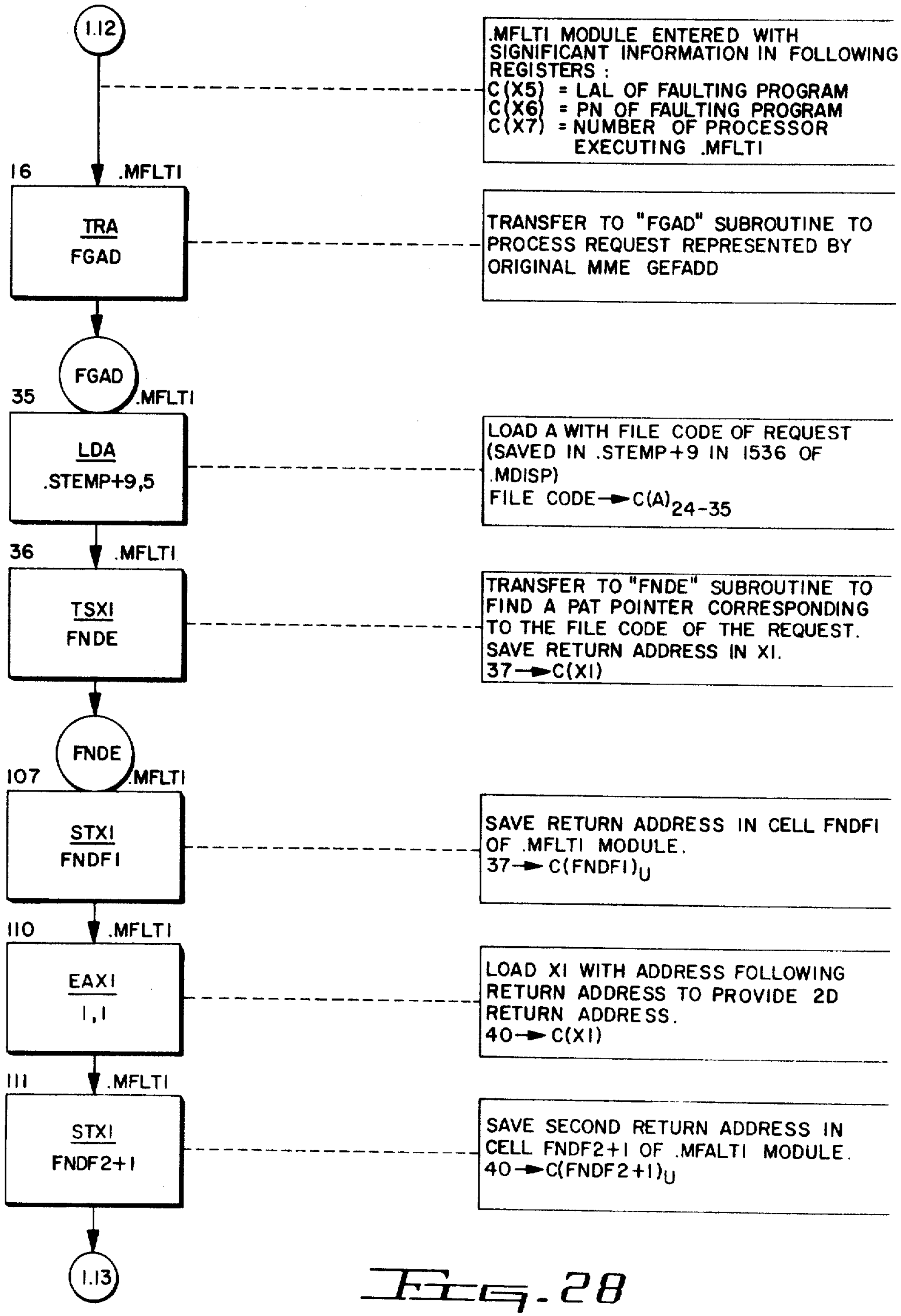
Figure 29:
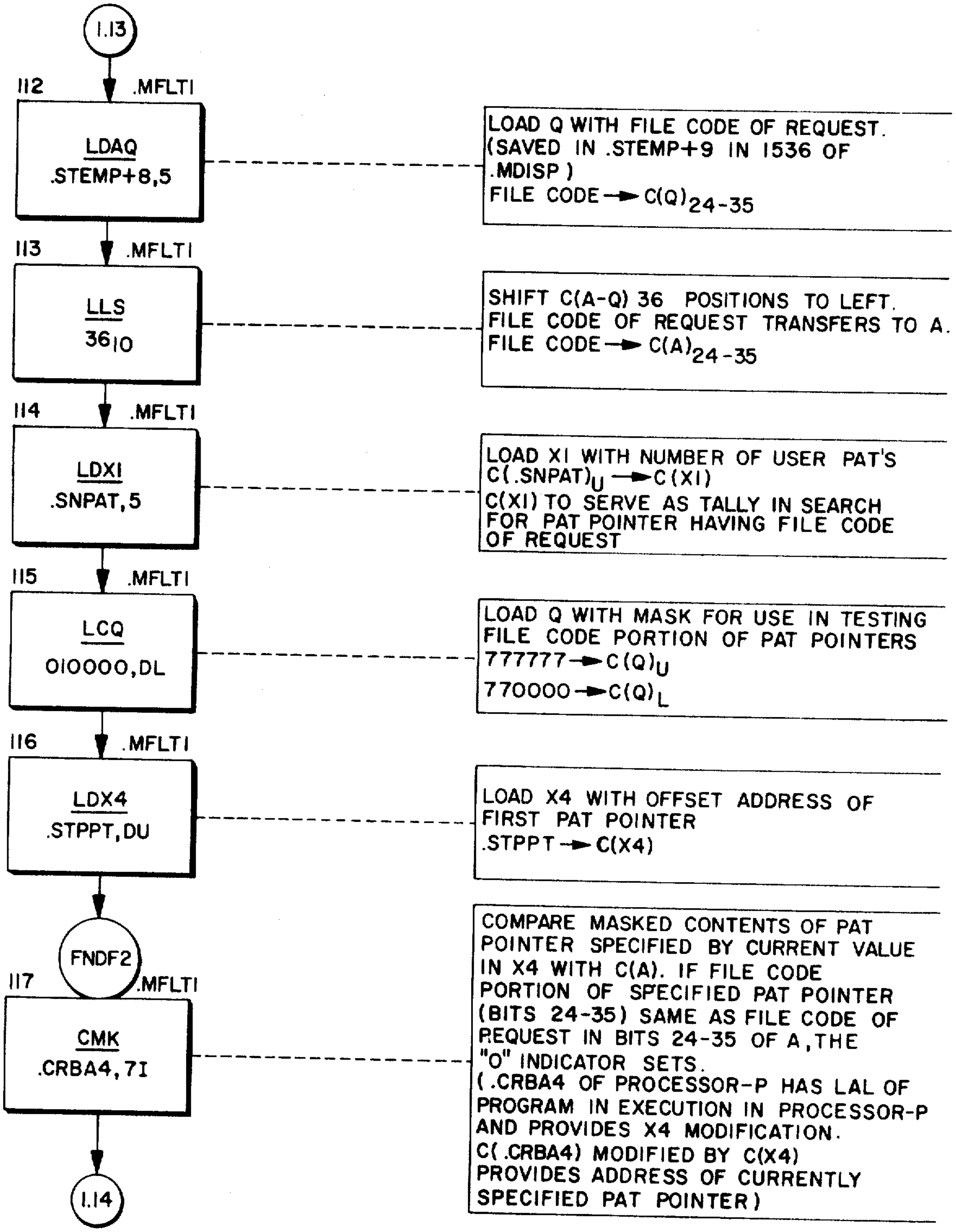
Figure 49:
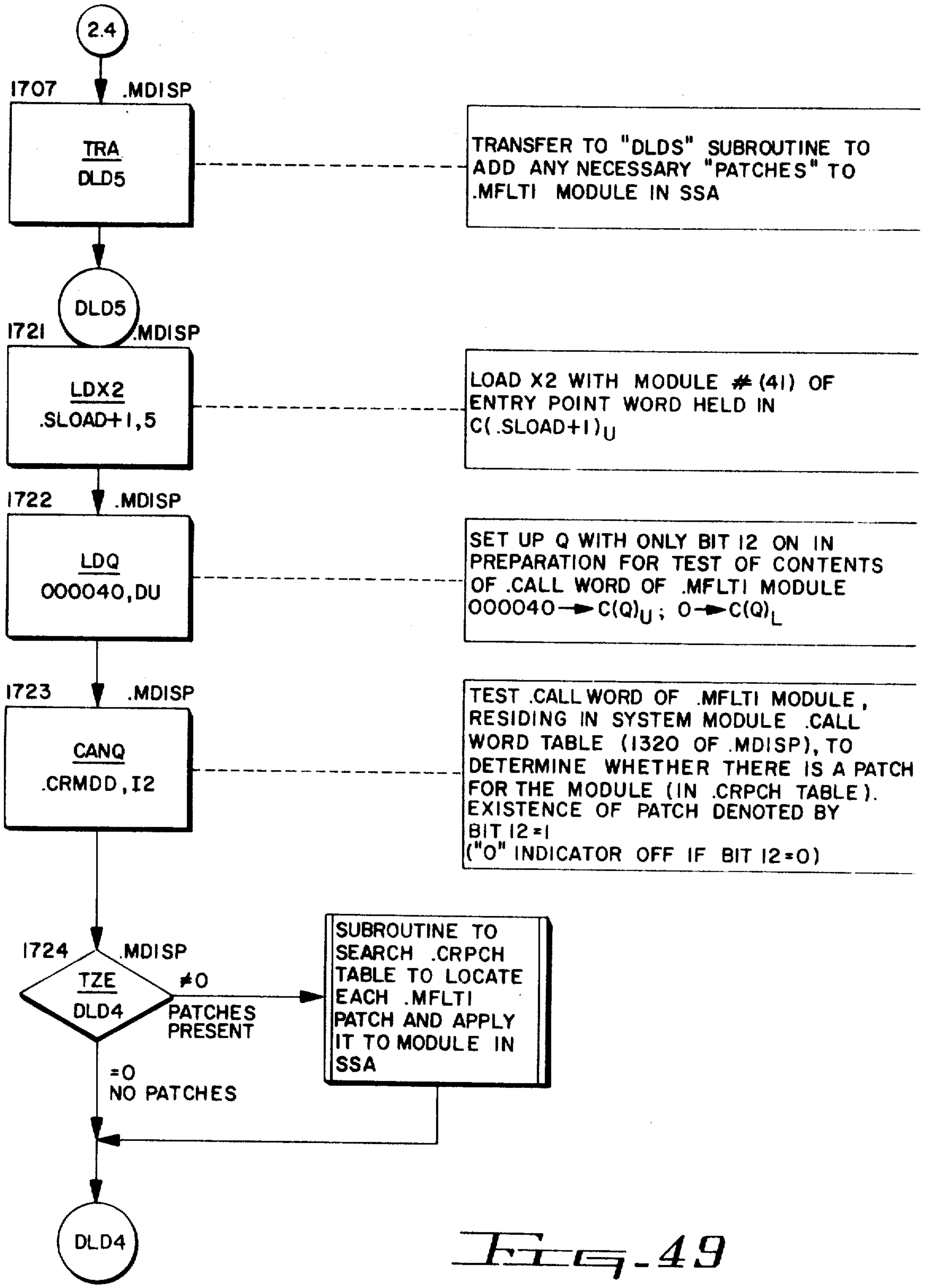

The DLD4 subroutine, FIG. 26, is entered either after the .MFLT1 module has been retrieved from auxiliary storage and loaded into SSA X, FIG. 49, or after the .MFLT1 module has been found present in SSA X, FIG. 25. The DLD4 subroutine prepares the system for the execution of the .MFLT1 module.

The file code provided by program X is transferred from the .SREG stack to the .STEMP block of SSA X. The STX7 instruction of the 1533.MDISP substep saves the contents of the X7-register, which holds the number of the Processor currently executing the Dispatcher, in bits 0–17 of the ninth cell of the .STEMP block of SSA X. The working registers of the Processor are then loaded with their contents saved from the point at which the Dispatcher was ready to call the I/O supervisor to obtain the .MFLT1 module from auxiliary store (refer to previous description of the 1506.MDISP substep of FIG. 21). These working register contents comprise the top entry of the .SREG stack at this time. The LREG instruction of the 1534.MDISP substep replaces the contents of the working registers of the processor with the top entry of the .SREG stack and the stack is popped up. The top entry of the .SREG stack is obtained by utilizing the .SREGS+1 stack control word in SSA X, which provides for retrieving the top entry from the stack and popping up the stack. The file code of file F, which was in the saved contents of the Q-register (refer to previous description of the 1505.MDISP substep of FIG. 21), is now in bits 24–35of the Q-register. The LDX7 instruction in 1535.MDISP substep restores the processor number to the X7-register from its temporary storage in the ninth cell of the .STEMP block. The STAQ instruction in the 1536.MDISP substep then saves the contents of the A- and Q-registers in the respective ninth and 10th cells of the .STEMP block of SSA X. Therefore, bits 24–35 of the 10th cell of the .STEMP block now comprise the file code of file F.

To remove the designation that a module is being loaded into SSA X, the A-register is prepared with a value for turning off bit 2 of the .STATE word of SSA X. The LDA instruction in the 1537.MDISP substep loads the direct operand 100000 into $C(-A)_U$, as designated by the DU-tag of the instruction, and 0 is loaded into $C(A)_L$. The A-register now holds a number comprising all binary 0's, except in the bit 2 position, which holds a binary 1. The ERSA instruction in the 1540.MDISP substep turns off bit 2 of the .STATE word in SSA X by performing an EXCLUSIVE-OR function on each bit of the .STATE word and the corresponding bit of the number in the A-register. Thus, all the bits of the .STATE word which are on remain on except bit 2, which is turned off as a consequence of the binary 1 in the bit 2 position of C(A). The .STATE word now no longer designates that SSA X is busy being loaded with a module.

The contents of the .SLOAD+1 cell are tested to determine whether a new module or a previously suspended module is being placed in execution in the corresponding SSA. This test is that shown at $S_8$ in block 405 of FIG. 8*b*, $S_{21}$ in block 425 of FIG. 9*b*, $S_{22}$ in block 430 of FIG. 9*c*, and $S_{23}$ in block 434 of FIG. 9*d*. The SZN instruction in the DLDX substep turns the zero indicator on if a previously suspended module has been loaded into SSA X from the SSA module stack and is to be returned to execution, as designated by the zero contents of the .SLOAD+1 cell. The TNZ instruction in the 1542.MDISP substep, FIG. 27, then transfers control to the HCLB substep if a new module is being placed in execution, as denoted by the zero indicator being off; otherwise the next substep is executed for initiating a subroutine for placing the suspended module in execution. In the instant example the .SLOAD+1 cell holds the nonzero entry point word of the .MFLT1 module, so that the HCLB substep is executed.

The transfer address for entering the .MFLT1 module is now prepared. The EAQ instruction in the HCLB substep loads $C(Q)_U$ with the base address of the .MFLT1 module in SSA X, which is the address of the .SNTRY word. This base address is then transferred from $C(Q)_U$ to $C(Q)_L$ by the QRS instruction in the 1372.MDISP substep, which shifts the contents of the Q-register to the right by 18 bit positions, as designated by the control address portion of the instruction. The entry point number of the entry point word is added to the base address to provide the transfer address for entering the module. The ADLQ instruction in the 1373.MDISP substep adds the entry point word in the .SLOAD+1 cell to the contents of the Q-register. Since the entry point number in C(.SLOAD+1) is a 1 in the instant example, the transfer address now in $C(Q)_L$ identifies the second cell of the .MFLT1 module.

A determination is next made as to whether the .MFLT1 module is reentrant. The LDA instruction in the 1374.MDISP substep loads the .SNTRY word into the A-register. If bit 35 of the .SNTRY word is a binary 0, the corresponding module is reentrant. The .SNTRY word in the A-register is tested to determine the value of bit 35 by the CANA instruction in the 1375.MDISP substep, which performs an AND function on each bit of $C(A)_L$ and the corresponding bit of the direct operand 000001, designated by the DL-tag of the instruction. If bit 35 of $C(A)_L$ is a binary 0, the corresponding AND-bit Zi is a binary 0 and the zero indicator is on at the conclusion of the instruction, otherwise the zero indicator is off. The TZE instruction in the 1376.MDISP substep then transfers control to the transfer address in the .MFLT1 module if the module is reentrant, as denoted by the zero indicator being on; otherwise the next substep follows to initiate a subroutine, not shown herein, for placing in execution a nonreentrant module. The transfer function of the TZE instruction is effected by using an address prepared by adding the transfer address in $C(Q)_L$, designated by the QL-tag of the instruction, to the address portion of the instruction, which has the value 0. In the instant example, the .MFLT1 module is reentrant and control is transferred to entry point 1 in the .MFLT1 module.

Entry point 1 of the .MFLT1 module transfers control to the FGAD subroutine of the module. The transfer address into the .MFLT1 module for entry point 1 is the address of the second cell of the .MFLT1 module. The contents of the second cell of the module, located at the symbolic address 16, comprises a transfer instruction. The TRA instruction in the 16.MFTLT1 substep transfers control of the Data Processor to the FGAD substep, FIG. 28.

The FGAD subroutine obtains the identity of the I/O apparatus serving the particular file F designated by the file code supplied with the request of slave program X. The FGAD subroutine receives the request file code from the .STEMP block, where it was stored by the Dispatcher, FIG. 26, immediately prior to the transfer of control to the .MFLT1 module. The required I/O apparatus identity, which comprises the IOC number, the I/O channel number, and I/O device number where applicable, are located by the FGAD subroutine in a Primary SCT and a Secondary SCT using the request file code as a reference. The I/O apparatus identity is then loaded into the A- and Q-registers and these register contents stored in the .SREG stack for transmission to the requesting program X.

The request file code is first obtained by the Processor for use in the ensuing FGAD subroutine. The LDA instruction in the FGAD substep loads the request file code into the bit 24–35 positions of the A-register from its location in the 10th cell of the .STEMP block of SSA X. The TSX1 instruction in the 36.MFLT1 substep then transfers control to the FNDE subroutine, saving the return address 37 in the X1-register.

The FNDE subroutine, a part of the FGAD subroutine, searches the list of PAT pointers in the PAT body, FIGS. 6 and 7, to determine whether the list has a PAT pointer corresponding to the request file code. If no PAT pointer has the request file code, no user PAT for file F is present in SSA X. The STX1 instruction in the 107.MFLT1 substep transfers the return address saved in the X1-register to the FNDF1 cell of the .MFLT1 module in SSA X. The EAX1 instruction in the 110.MFLT1 substep then creates a second return address in the X1-register by adding the previous return address therein, designated by the X1 tag of the instruction, to the direct operand 1, and replacing C(X1) with the sum 40. The STX1 instruction in the 111.MFLT1 substep transfers the second return address from the X1-register to the FNDF2+1 cell of the .MFLT1 module in SSA X.

The request file code is prepared for the PAT pointer search by moving it to the A-register. The LDAQ instruction in the 112.MFLT1 substep again retrieves the request file code from the 10th cell of the .STEMP block of SSA X and loads it into the bit 24–35 positions of the Q-register, FIG. 29. The LLS instruction in the 113.MFLT1 substep shifts the combined contents of the A- and Q-registers to the left by 36 bit positions, as designated by the control address portion of the instruction. Therefore, this substep moves the request file code from the bit 24–35 positions of the Q-register to the bit 24–35 positions of the A-register.

In further preparation for the PAT pointer search, a value representing the number of user PAT's in SSA X is obtained for use as a tally of the number of tests performed during the search. The LDX1 instruction in the 114.MFLT1 substep stores the bit 0–17 contents of the .SNPAT cell of SSA X, which represents the number of user PAT's in SSA X, in the X1-register.

The Q-register is next loaded with a mask for use in comparing the file code contents of the A-register with the file code contents of a PAT pointer. The LCQ instruction in the 115.MFLT1 substep loads QL with the complement of the direct operand 010000, designated by the DL-tag of the instruction, and QU with the complement of zero, whereby QL receives the value 770000 and QU the value 777777. Therefore, the Q-register now holds a number comprising all binary 1's except for the bit 24–35 positions, which comprise binary 0's.

The LDX4 instruction in the 116.MFLT1 substep loads the X4-register with the offset address of the first PAT pointer in the PAT body, which is the address of the .STPPT cell relative to the base cell of program X. The DU-tag of the LDX4 instruction provides for using the address portion of the instruction as a direct operand, the direct operand being the offset address of the .STPPT cell.

The file code in a PAT pointer is then tested against the request file code in the A-register. The CMK instruction in the FNDF2 substep compares each bit of $C(A)_{24\text{-}35}$ with the corresponding bit of the PAT pointer identified by the offset address in the X4-register. If any pair of compared bits is unlike, the corresponding result bit Zi is a binary 1 and the zero indicator is turned off and remains off at the conclusion of the instruction. The result bit Zi cannot be a binary 1 for any bit position in the test for which the mask in the Q-register holds a binary 1. Therefore, only bits 24–35 of the two numbers being compared are effective to turn the zero indicator off. Consequently, only if the file code in the PAT pointer is the same as the request file code is the zero indicator on at the conclusion of the instruction. The particular PAT pointer used in the comparison test is selected from the address prepared by adding the offset address in the X4 -register to the base cell address of program X, which is held in the .CRBA4 word of the particular processor executing the .MFLT1 module.

Figure 30:
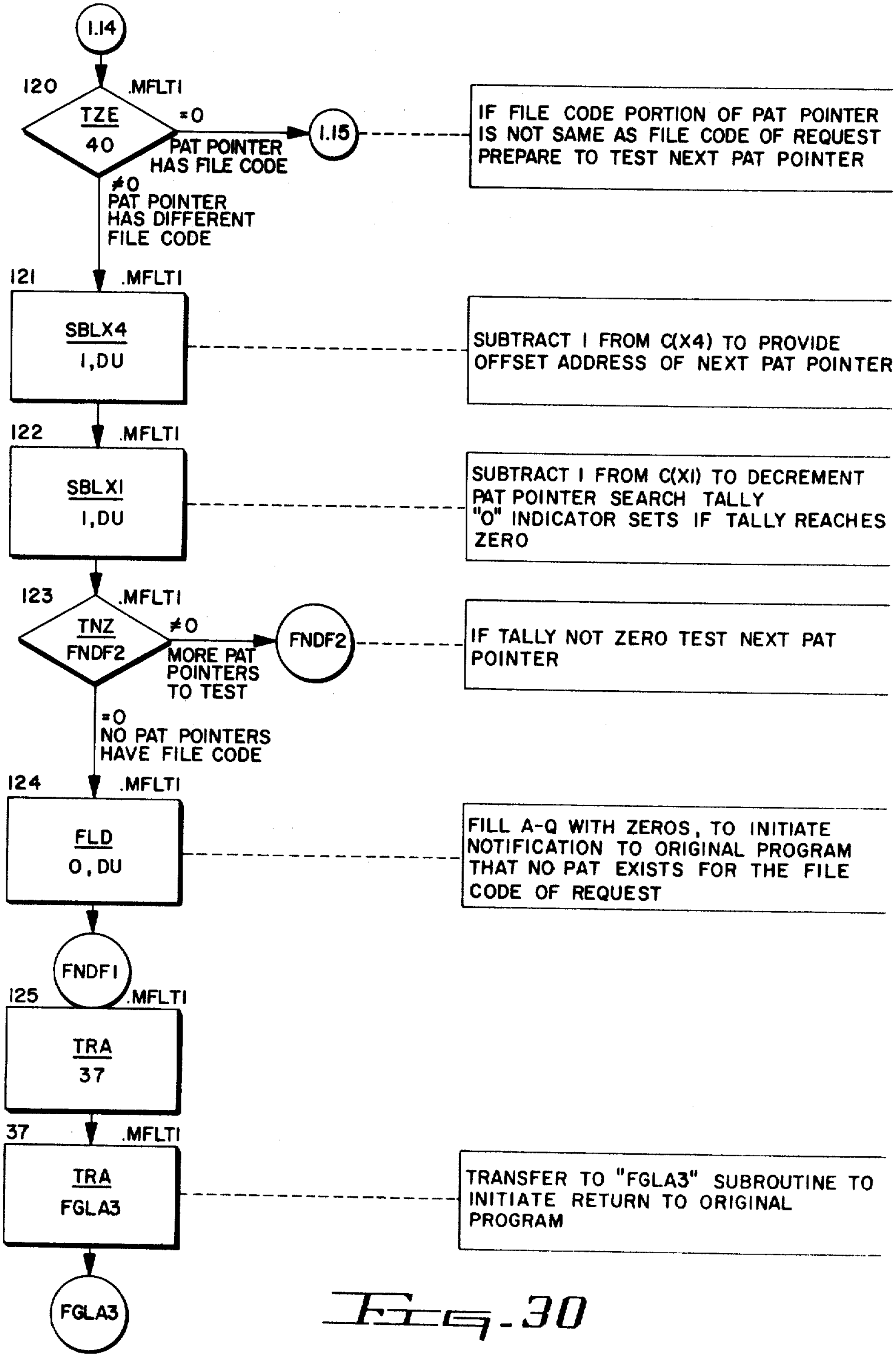
Figure 31:
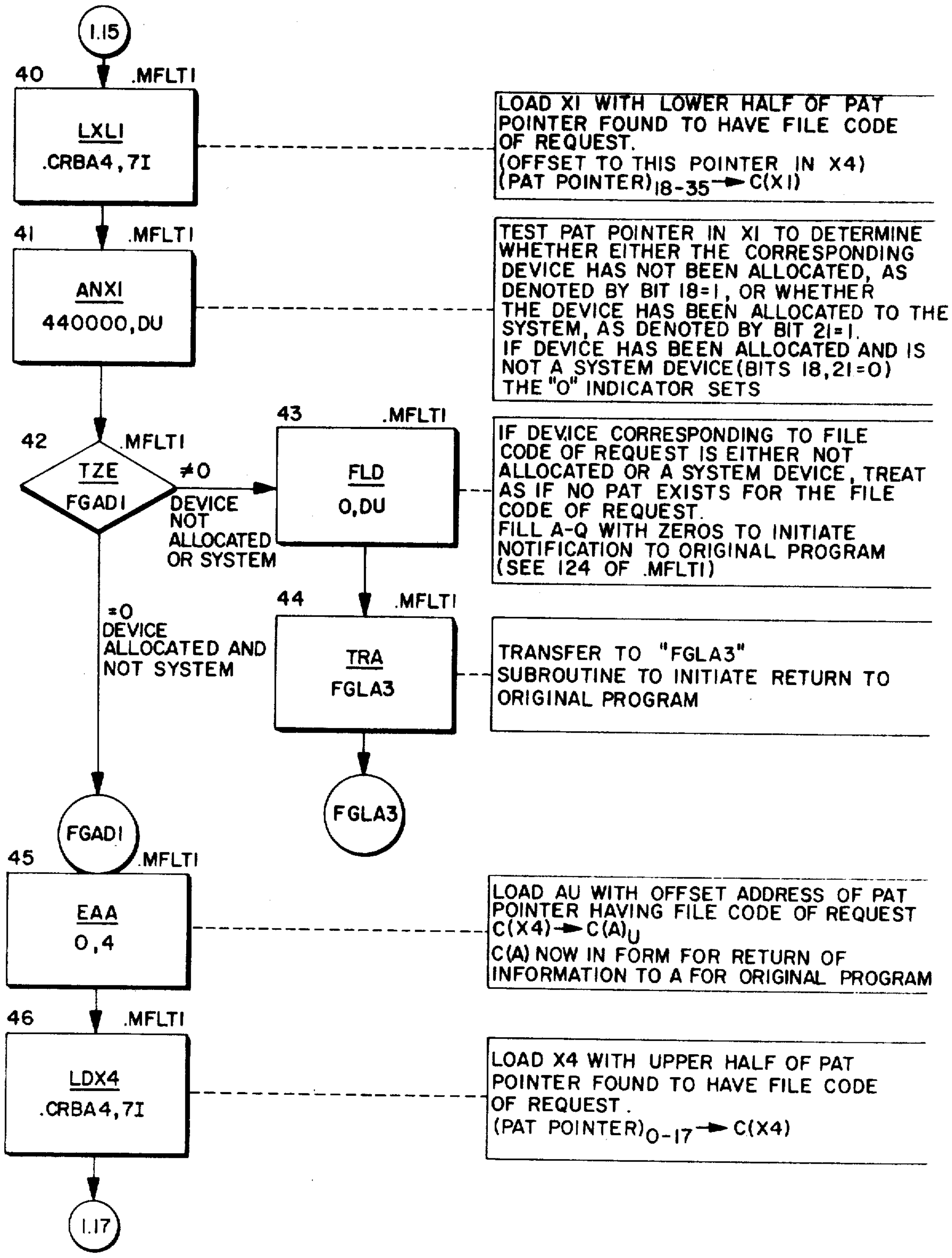
Figure 32:
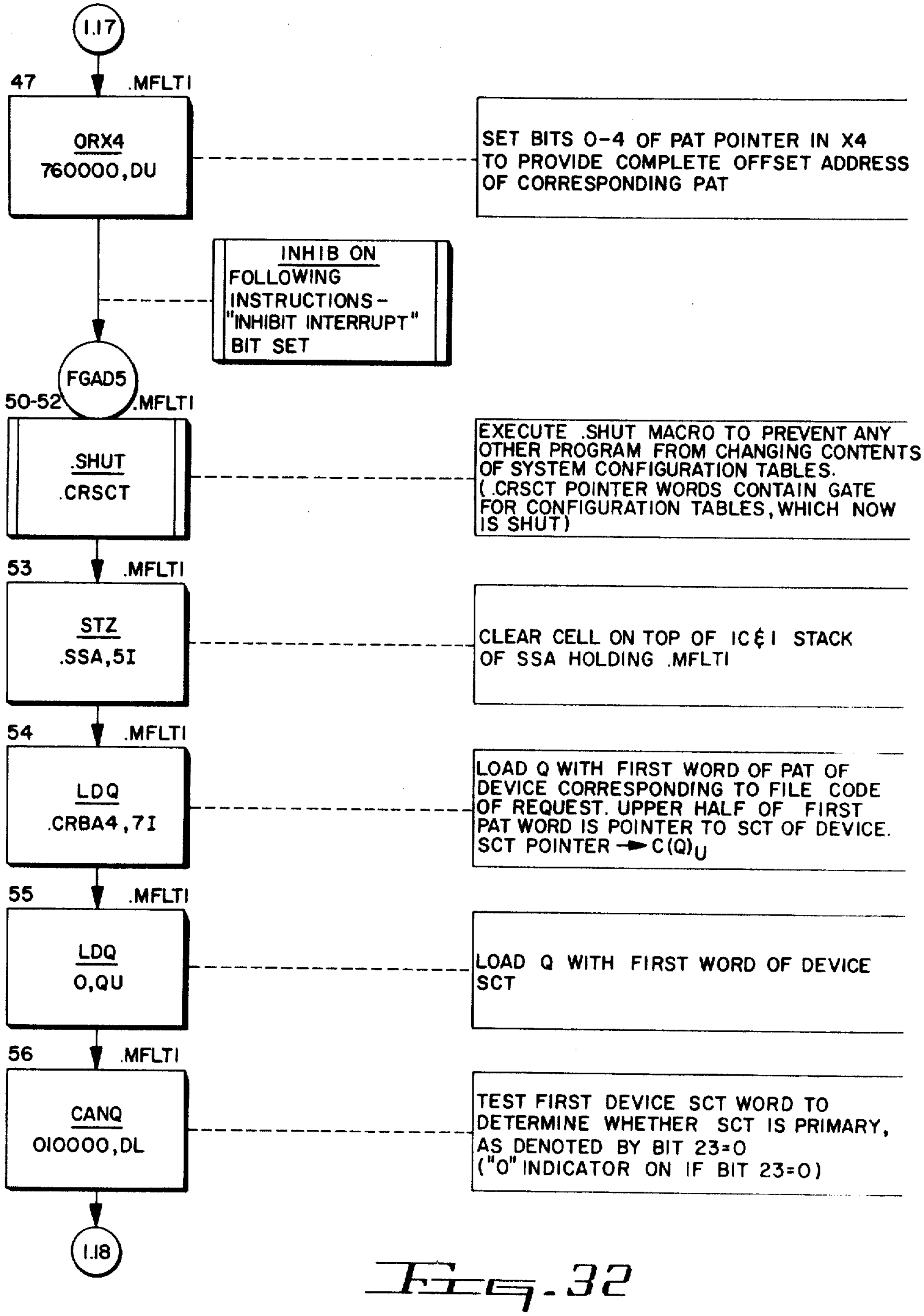
Figure 33:
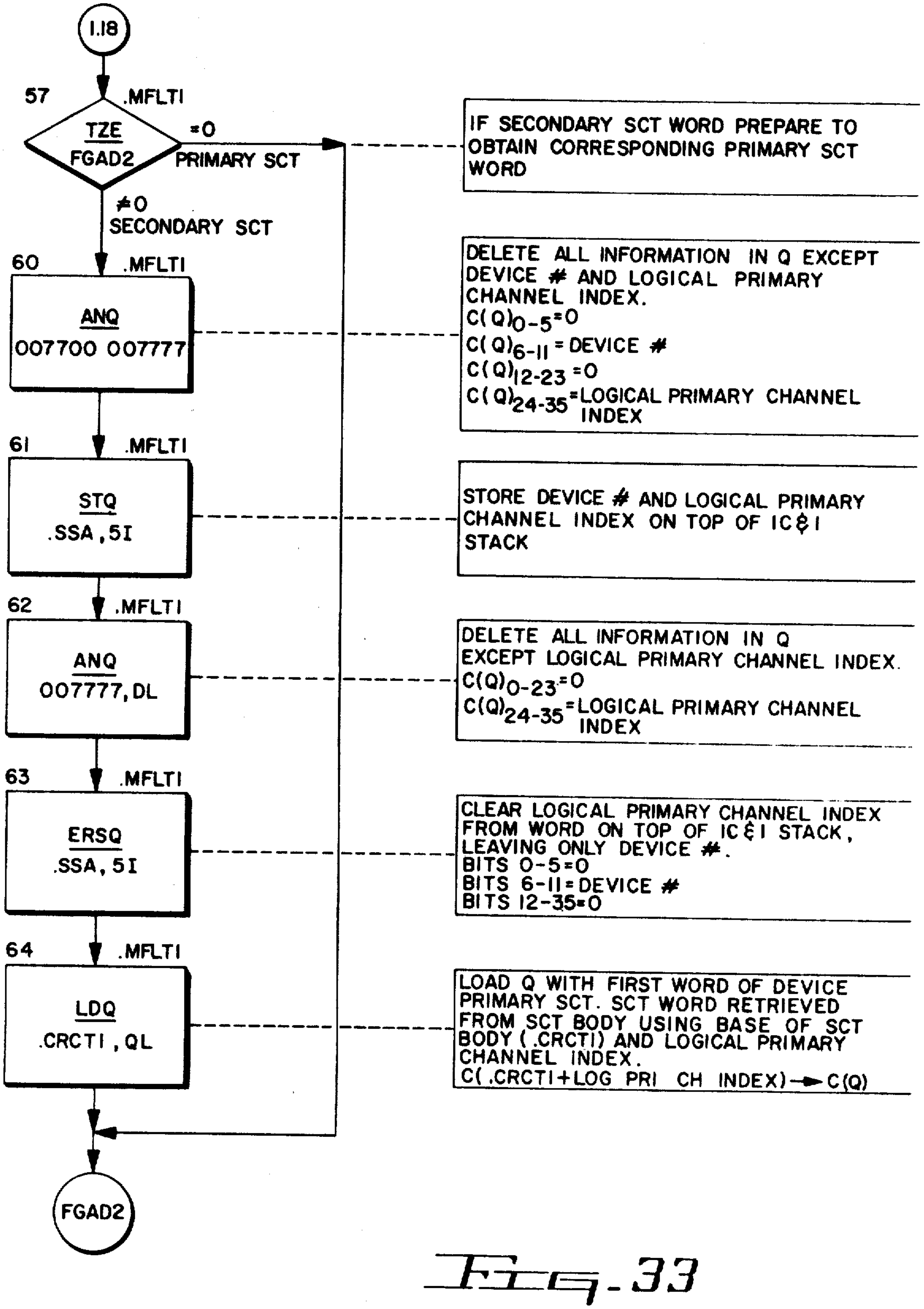
Figure 34:
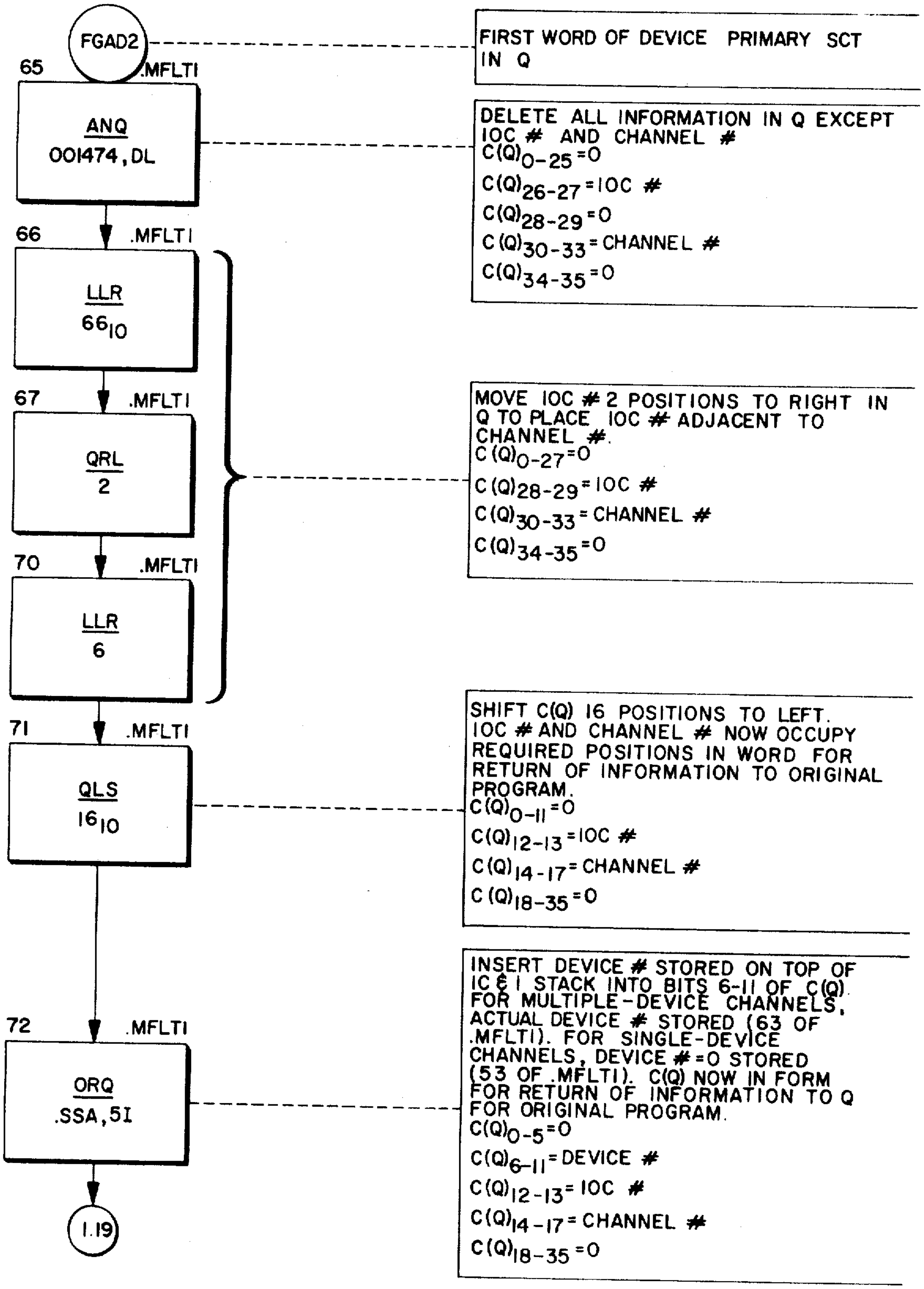
Figure 35:
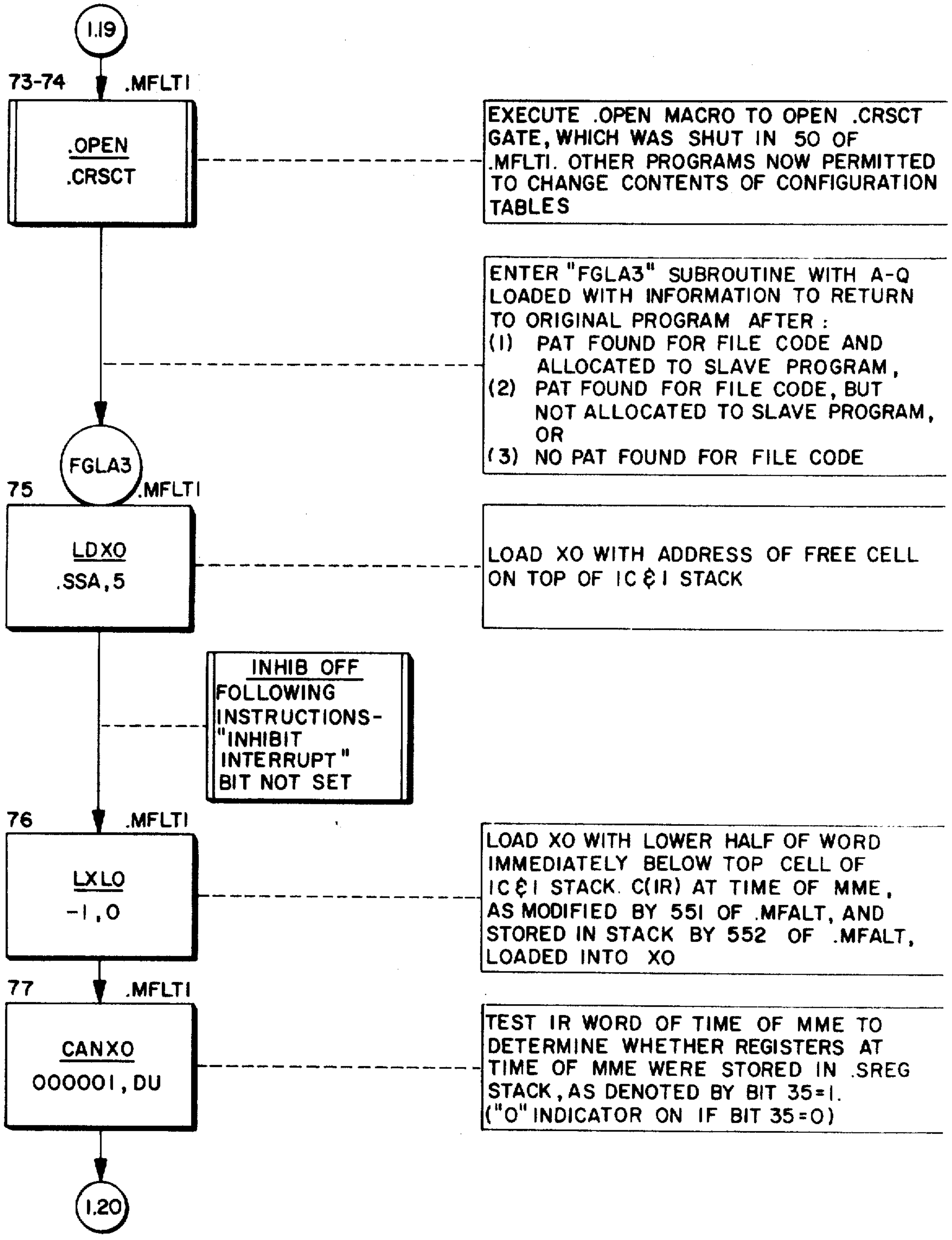
Figure 36:
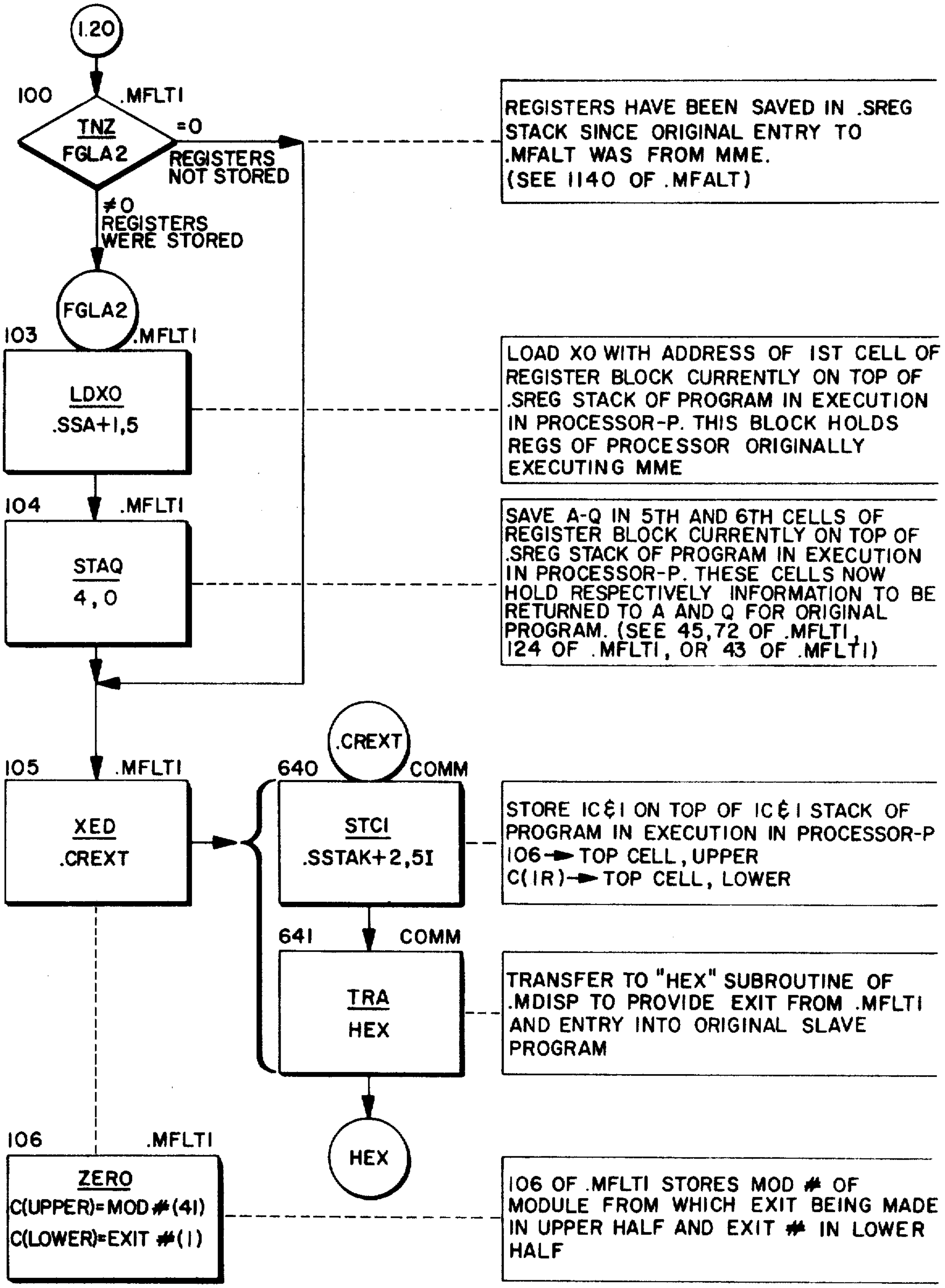
Figure 37:
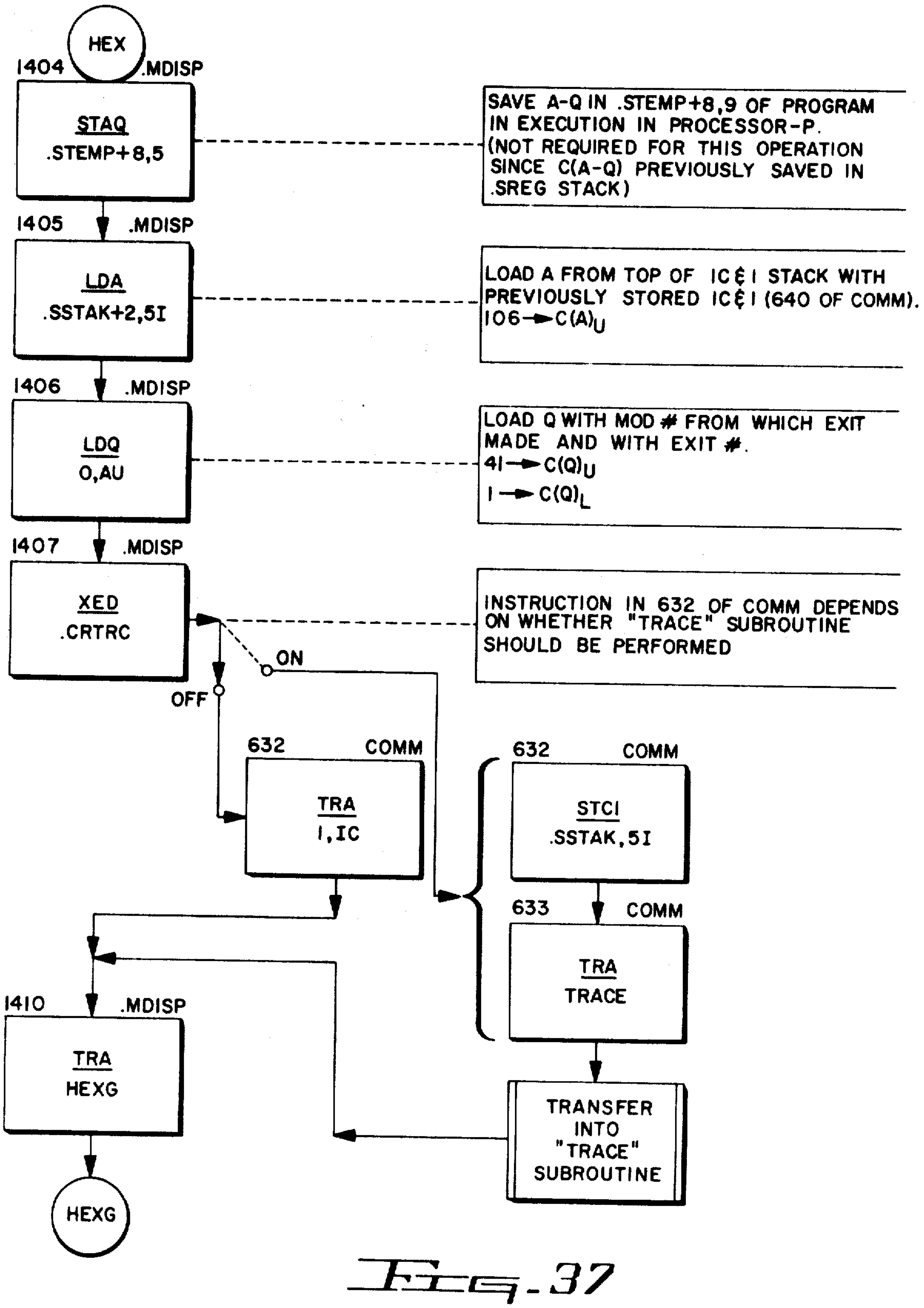
Figure 38:
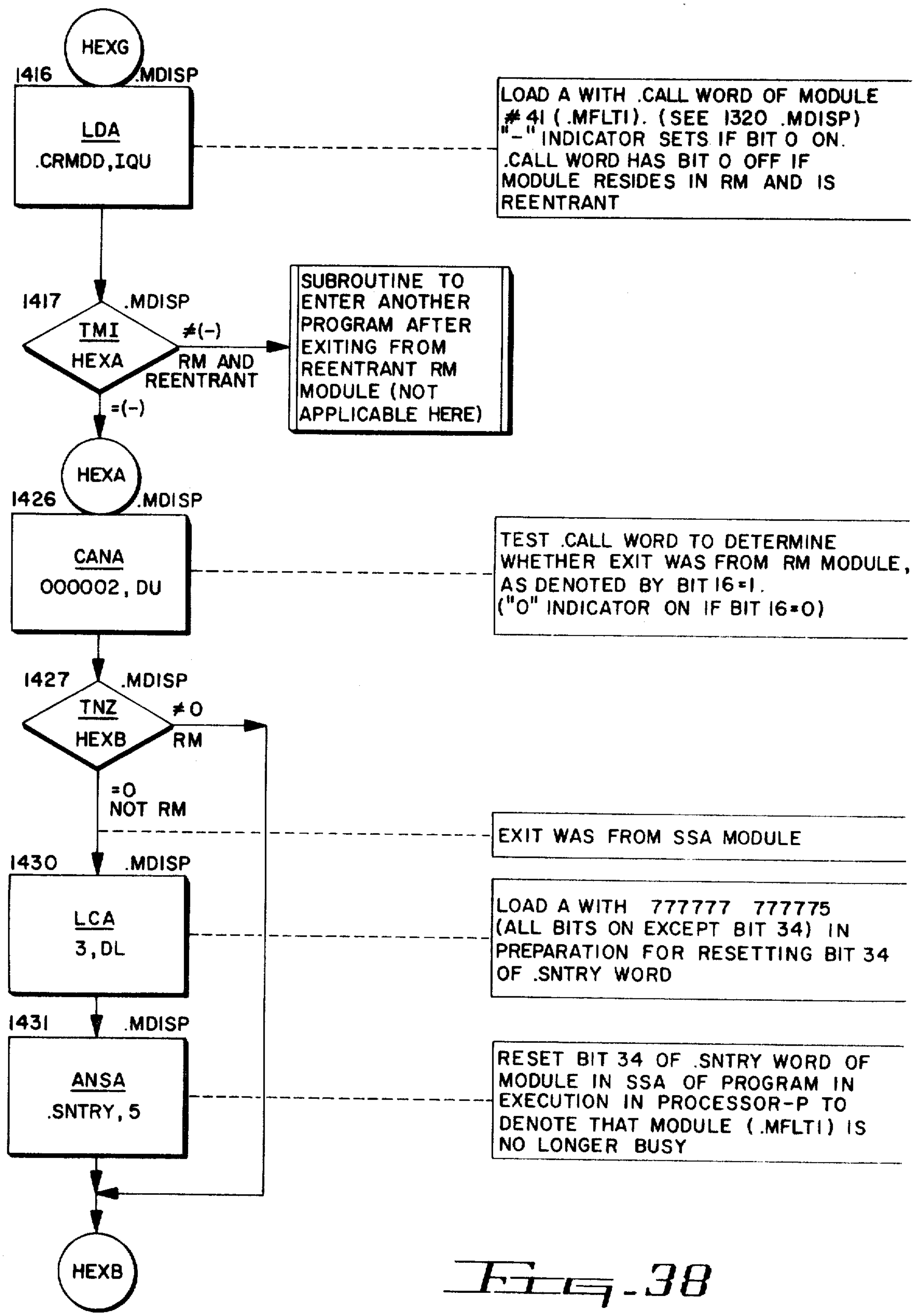
Figure 39:
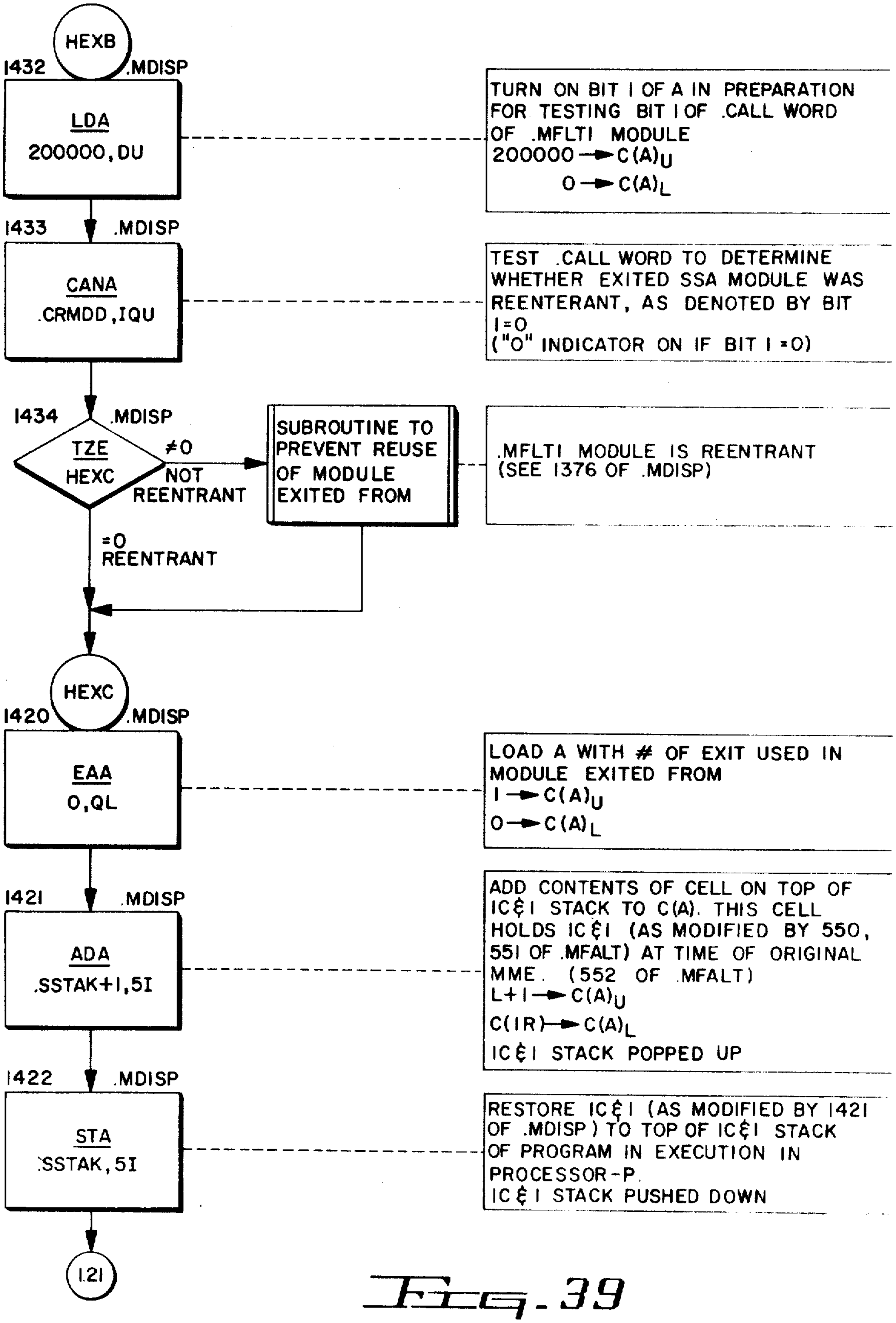
Figure 40:
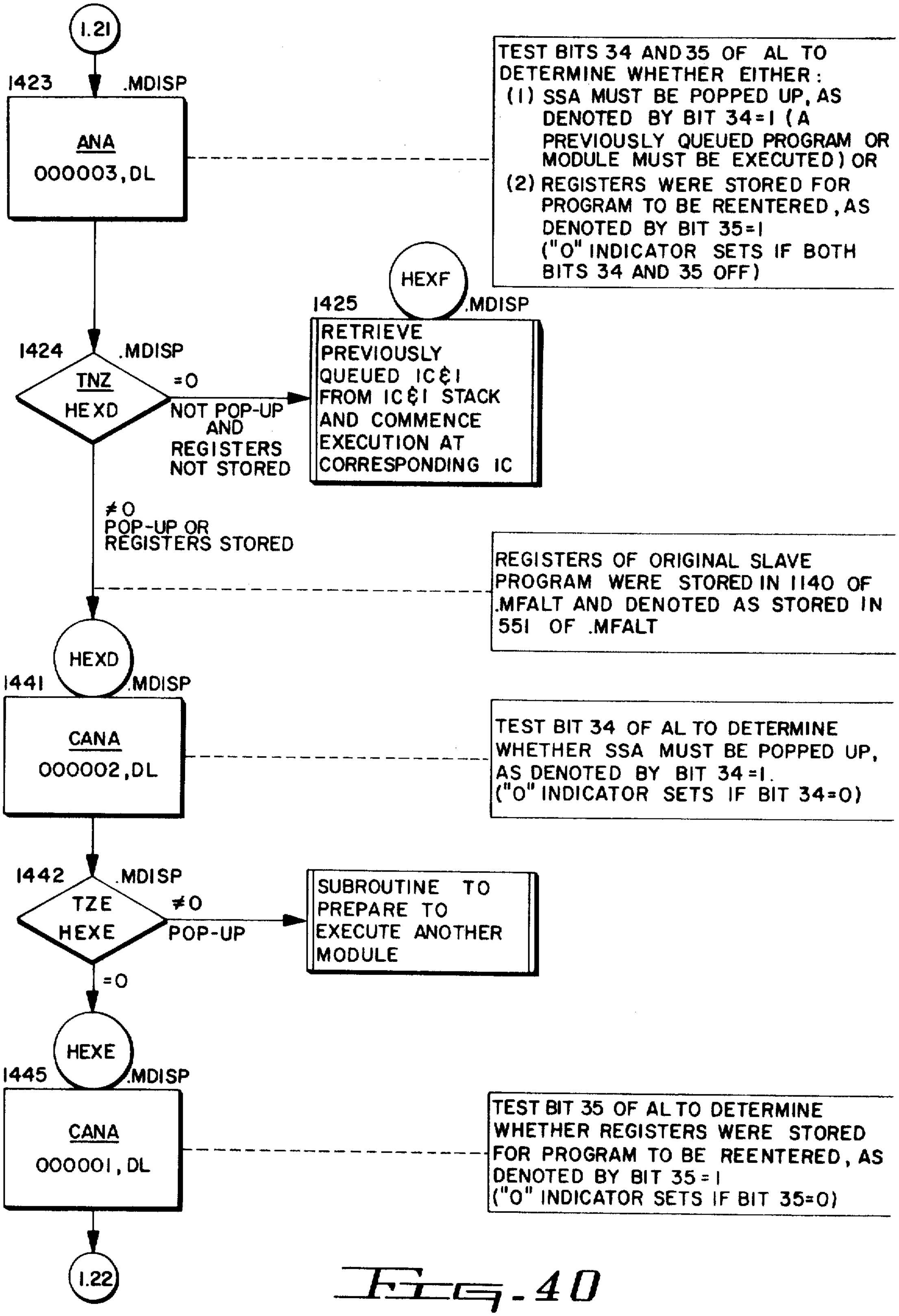
Figure 41:
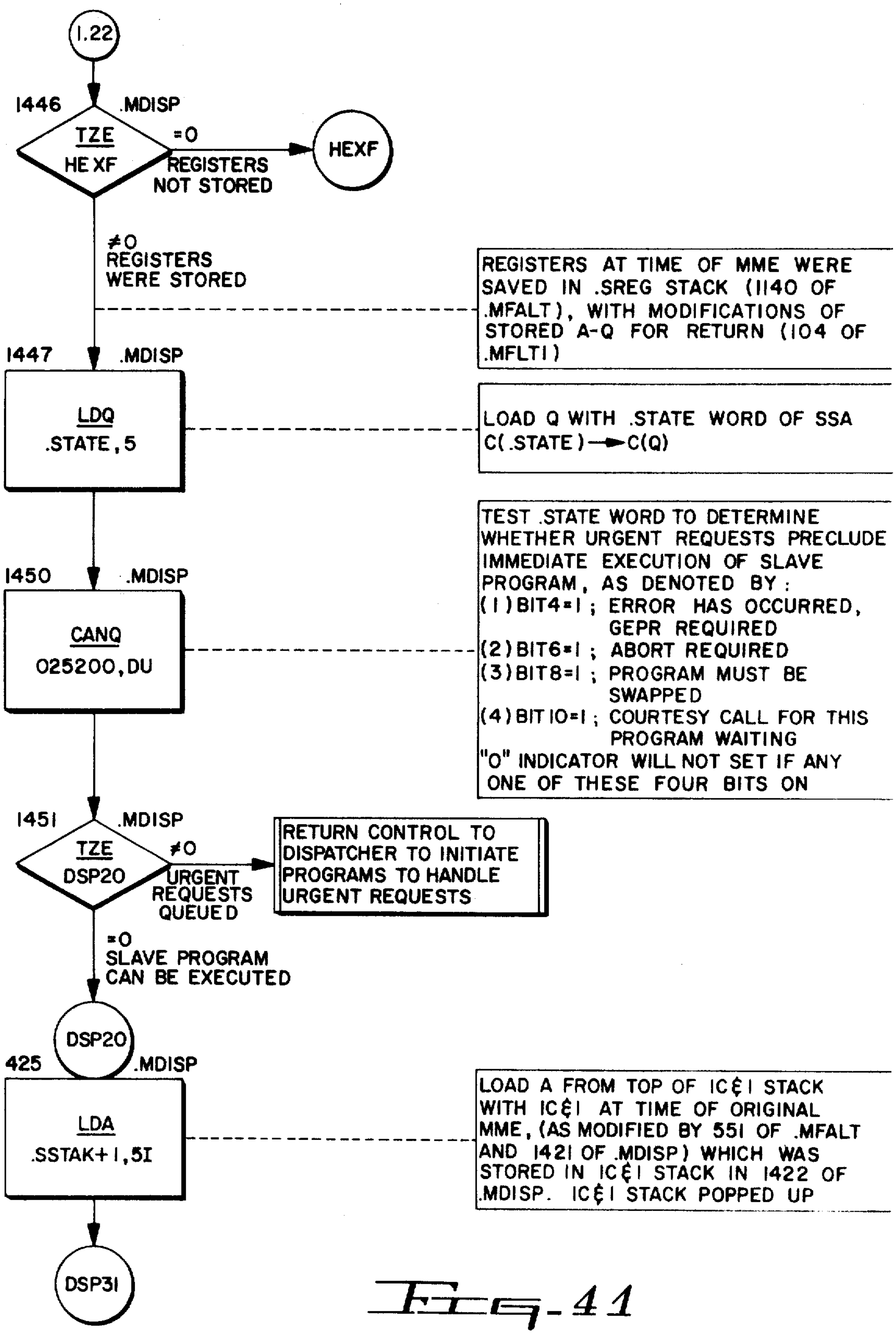

The TZE instruction in the 120.MFLT1 substep, FIG. 30, transfers control to the 40.MFLT1 substep, FIG. 31, if the file code in the PAT pointer tested is the same as the request file code, as denoted by the zero indicator being on; otherwise the next substep is executed to prepare for testing the next PAT pointer. The transfer address of the TZE instruction had been prepared in the 111.MFLT1 substep.

To prepare for testing the file code of the next PAT pointer the offset address in the X4-register is changed, and the tally in the X1-register is adjusted to account for the most recent test and employed for determining whether the list of PAT pointers has been exhausted. The SBLX4 instruction in the 121.MFLT1 substep subtracts the direct operand 1, designated by the DU-tag of the instruction, from the offset address in the X4-register. Inasmuch as this offset address represents the location of a cell in SSA X relative to the base cell of program X, the offset address is a negative number. Therefore, after completion of the SBLX4 instruction the contents in the X4-register comprises the offset address of the PAT pointer immediately below the PAT pointer employed in the most recent comparison test. The SBLX1 instruction in the 122.MFLT1 substep subtracts the direct operand 1 from the tally in the X1-register. The zero indicator is turned on if the new contents of the X1 -register is 0. Since the original value of the tally represented the number of user PAT's in SSA X and, therefore, the number of PAT pointers in the PAT body, if the tally reaches zero in the 122.MFLT1 substep all PAT pointers have been tested. The TNZ instruction in the 123.MFLT1 substep transfers control back to the FNDF2 substep, FIG. 29, if more PAT pointers remain to be tested, as denoted by the zero indicator being off; otherwise the next substep is executed to prepare for transmitting a notification to program X that no user PAT is present for file F.

A notification is transmitted to program X that no PAT exists in SSA X for file F by providing zeros in the A- and Q-registers when control is transferred back to program X. This notification is prepared by the FLD instruction in the 124.MFLT1 substep, which fills the A- and Q-registers with zeros using the direct operand 0, designated by the DU-tag of the instruction. The TRA instruction in the FNDF1 substep then transfers control to the 37.MFLT1 substep, this transfer address having been prepared in the 107.MFLT1 substep of FIG. 28. The 37.MFLT1 substep transfers control to the FGLA3 subroutine, FIG. 35, for preparing to exit from the .MFLT1 module.

When a PAT pointer is found to have the same file code as the request file code, a determination is first made as to whether particular I/O apparatus is allocated to the file. If bit 18 of the PAT pointer is a binary 1, I/O apparatus is not allocated to perform services for the file. If bit 21 is a binary 1, the I/O apparatus performing services for the file is allocated to the operating system and no particular I/O apparatus is allocated to the file. In preparation for the test, the LXL1 instruction in the 40.MFLT1 substep, FIG. 31, loads bits 18–35 of the PAT pointer having the request file code of file F into the X1-register (refer to previous description of the FNDF2 substep of FIG. 29). The ANX1 instruction in the 41.MFLT1 substep then tests for the absence of a binary 1 in both the bit 18 and 21 positions of C(X1) by performing an AND function on each bit of C(X1) and the corresponding bit of the direct operand 440000, designated by the DU-tag of the instruction. After execution of the instruction, only those of bits 18 and 21 of the X1-register which were on remain on and the remaining bits of the X1-register are turned off. If the new contents of the X1-register are zero, the zero indicator is turned on. Therefore, only if I/O apparatus has been allocated to perform services for the file (bit 18 of PAT pointer is off) and the I/O apparatus is not allocated to the operating system (bit 21 of PAT pointer is off) does the ANX1 instruction turn the zero indicator on. The TZE instruction in the 42.MFLT1 substep transfers control to the FGAD1 substep if particular I/O apparatus has been allocated to file F, as denoted by the zero indicator being on; otherwise the next substep is executed to provide an appropriate notification for transmission to program X.

In those instances wherein the PAT pointer designates that no particular I/O apparatus has been allocated to file F, a notification that no user PAT exists in SSA X for file F is transmitted to program X (refer to previous description of the 124.MFLT1 substep of FIG. 30). Accordingly, the FLD instruction in the 43.MFLT1 substep fills the A- and Q-registers with zeros using the direct operand zero, designated by the DU-tag of the instruction. The TRA instruction in the 44.MFLT1 substep then transfers control to the FGLA3 subroutine, FIG. 35, for preparing to exit from the .MFLT1 module.

In those instances wherein the PAT pointer designates that particular I/O apparatus has been allocated to file F, the offset address of the PAT pointer must be transmitted to program X along with the I/O apparatus identity.

The EAA instruction in the FGAD1 substep loads the A-register with the offset address of the PAT pointer of file F. This substep is effected by adding the offset address in the X4-register, designated by the X4 tag of the instruction, to the direct operand 0, replacing $C(A)_U$ with the sum, and loading a 0 into $C(A)_L$. The A-register now holds in proper form the information required to be provided in the A-register when control is transferred back to program X.

The FGAD subroutine next prepares to obtain the I/O apparatus identity from the Primary and Secondary SCT's. Therefore, the first word of the corresponding PAT, which holds a pointer to an SCT of the I/O apparatus serving file F, must be obtained. The LDX4 instruction in the 46.MFLT1 substep loads bits 0–17 of the PAT pointer of file F into the X4-register (refer to previous description of the FNDF2 substep of FIG. 29). The new contents of bits 5–17 of the X4-register comprises the partial offset address to the corresponding PAT, FIG. 7. The ORX4 instruction in the 47.MFLT1 substep, FIG. 32, completes the offset address in the X4-register by turning on bits 0–4 thereof. The ORX4 instruction performs an INCLUSIVE-OR function on each bit of C(X4) and the corresponding bit of the direct operand 760000, designated by the DU-tag of the instruction. Therefore, all bits of the partial offset address in the X4-register which are on remain on, and bits 0–4 are turned on as a consequence of the binary 1's in the bit 0–4 positions of the direct operand.

The series of instructions which follow the ORX4 instruction of the 47.MFLT1 substep have their inhibit interrupt bits on, so that the Processor executing this series cannot be interrupted by the operating system.

The block designated by the FGAD5 notation represents a small set of instructions termed a "macro." The detailed operation of such macro will not be shown herein. The FGAD5 macro is a .SHUT macro, which prevents access to a specified portion of the working store by other programs until a corresponding .OPEN macro is executed by the program which executed the .SHUT macro. The .SHUT macro shown in FIG. 32 references a .CRSCT word, FIG. 5, which controls access to the SCT's, FIG. 5. Therefore, execution of the FGAD5 macro prevents access by other programs to the SCT's, thereby insuring that the I/O apparatus identity obtained from the SCT's will remain unchanged until it has been prepared for transmittal to program X.

The first free cell on top of the IC&I stack is now cleared for use as temporary storage. The STZ instruction in the 53.MFLT1 substep stores zeros in all bit positions of the first free cell on top of the IC&I stack. This substep is effected by utilizing the .SSA control word in SSA X, which provides access to the first free cell on top of the IC&I stack without pushing down or popping up the stack.

The LDQ instruction in the 54.MFLT1 substep loads the first word of the PAT of file F into the Q-register. This substep is effected by using an address prepared by adding the offset address of the PAT, held in the X4-register, to the base cell address of program X, held in the .CRBA4 word of the particular Processor executing the .MFLT1 module. Bits 0–17 of the Q-register now hold the pointer to an SCT of the I/O apparatus serving file F, FIG. 7. The LDQ instruction in the 55.MFLT1 substep then employs the SCT pointer in $C(Q)_U$ to load the first word of the corresponding SCT into the Q-register. The first word of this SCT is obtained from its cell in working storage by using an address prepared by adding the SCT pointer contents of $C(Q)_U$, designated by the QU-tag of the LDQ instruction, to the address portion of the instruction, which has the value 0.

The SCT word in the Q-register is tested to determine whether it is the first word of a Primary SCT or the first word of a Secondary SCT. A binary 1 in the bit 23 position of this SCT word denotes that it is the first word of a Secondary SCT. The CANQ instruction in the 56.MFLT1 substep performs an AND function on each bit of $C(Q)_L$ and the corresponding bit of the direct operand 010000, designated by the DL-tag of the instruction. If bit 23 of $C(Q)_L$ is a binary 1, the corresponding AND-bit Zi is a binary 1 and the zero indicator is off at the conclusion of the instruction, otherwise the zero indicator is on. The TZE instruction in the 57.MFLT1 substep, FIG. 33, then transfers control to the FGAD2 substep if the Q-register holds the first word of a Primary SCT, as denoted by the zero indicator being on; otherwise the next substep is executed.

If the Q-register holds the first word of a Secondary SCT, the I/O device number is prepared for transmission to program X. The first word of a Secondary SCT holds the corresponding I/O device number in bits 6–11 and a logical primary channel index in bits 24–35, FIG. 5. The logical primary channel index is a representation of the location of the corresponding Primary SCT relative to the base cell of the Primary SCT block 125, FIG. 4. The ANQ instruction 60.MFLT1 substep then clears the Q-register of all information but the I/O device number and the channel index by performing an AND function on each bit of C(Q) and the corresponding bit of the operand 007700 007777. The operand shown in the 60.MFLT1 substep is obtained from a symbolically addressed cell, not shown. After execution of the ANQ instruction, only those of bits 6–11 and 24–35 of the Q-register which were on remain on, and the remaining bits of the Q-register are turned off. Therefore, the Q-register now holds only the I/O device number and the logical primary channel index. The STQ instruction in the 61.MFLT1 substep stores C(Q) in the first free cell on top of the IC&I stack, utilizing this cell as temporary storage (refer to previous description of the 53.MFLT1 substep of FIG. 32). The ANQ instruction in the 62.MFLT1 substep then clears the Q-register of all information but the logical primary channel index by performing an AND function on each bit of $C(Q)_L$ and the corresponding bit of the direct operand 007777, designated by the DL-tag of the instruction. Therefore, the Q-register now holds only the logical primary channel index. The ERSQ instruction in the 63.MFLT1 substep clears the cell on top of the IC&I stack of all information but the I/O device number by performing an EXCLUSIVE-OR function on each bit of the contents of this top IC&I cell and the corresponding bit of C(Q). Inasmuch as all bits of C(Q) are the same as the corresponding bits of the top IC&I cell, except for bits 6–11 which are binary 0's in the Q-register and represent the I/O device number in the top IC&I cell, after execution of the instruction the top IC&I cell holds only the I/O device number.

The LDQ instruction in the 64.MFLT1 substep next loads the Q-register with the first word of the corresponding Primary SCT. This substep is effected by using an address prepared by adding the logical primary channel index in $C(Q)_L$, designated by the QL-tag of the instruction, to the address portion of the instruction, which represents the base cell .CRCT1 of the Primary SCT block.

The FGAD2 substep is reached with the first word of the Primary SCT of the I/O apparatus serving file F in the Q-register and with the top cell of the IC&I stack holding the I/O device number in bits 6–11 for a multiple device I/O channel or holding all zeros for a single device I/O channel. Although the first Primary SCT word holds the I/O channel number and IOC number in bits 12–17, the physical channel index in bits 24–35 is also formed of these two quantities, FIG. 5, and is more convenient for use in the operation to follow. The physical channel index comprises the IOC number in the bit 26 and 27 positions and the I/O channel number in the bit 30–33 positions. The ANQ instruction in the 65.MFLT1 substep, FIG. 34, clears the Q-register of all information but the IOC number and I/O channel number by performing an AND function on each bit of $C(Q)_L$ and the corresponding bit of the direct operand 001474, designated by the DL-tag of the instruction. After execution of the ANQ instruction, only those of bits 26, 27, and 30–33 which were on remain on and the remaining bits of the Q-register are turned off. Therefore, the Q-register now holds only the IOC number and the I/O channel number.

The next three instruction shift the IOC number two bit positions to the right to place it adjacent and to the left of the I/O channel number in the Q-register. The LLR instruction in the 66.MFLT1 substep rotates the combined contents of the A- and Q-registers to the left by 66 bit positions, as designated by the control address portion of the instruction. This substep moves the IOC number into the bit 32 and 33 positions of the Q-register and the I/O channel number into the bit 0–3 positions of the A-register. The QRL instruction in the 67.MFLT1 substep shifts the contents of the Q-register to the right by two bit positions. This substep moves the IOC number from the bit 32 and 33 positions to the bit 34 and 35 positions in the Q-register. The LLR instruction in the 70.MFLT1 substep rotates the combined contents of the A- and Q-registers to the left by six bit positions. Therefore, this substep moves the IOC number from the bit 34 and 35 positions in the Q-register to the bit positions 28 and 29 in the Q-register and returns the I/O channel number from the bit 0–3 positions in the A-register to the bit 30–33 positions in the Q-register.

The I/O apparatus identity is now prepared in form for transmission to program X. The QLS instruction in the 71.MFLT1 substep shifts the contents of the Q-register to the left by 16 bit positions, filling the bit positions vacated on the right with zeros. Therefore, this substep moves the IOC-number IOC-channel-number combination from bit positions 28–33 to bit positions 12–17 of the Q-register. The ORQ instruction in the 72.MFLT1 substep then inserts the I/O device number held in the top IC&I cell into the bit 6–11 positions of C(Q) by performing an INCLUSIVE-OR function on each bit of C(Q) and the corresponding bit of the contents of the top IC&I cell (refer to previous description of the 63.MFLT1 substep of FIG. 33). After execution of the ORQ instruction, the Q-register holds the I/O device number in the bit 6–11 positions, the IOC number in the bit 12 and 13 positions, the I/O channel number in the bit 14–17 positions, and 0's in the remaining bit positions. Therefore, the Q-register now holds in proper form the information required to be provided in the Q-register when control is transferred back to program X.

Having obtained the required information from the SCT's, the FGAD subroutine now releases the SCT's to access by other programs. The .OPEN macro, referencing the .CRSCT word, is executed, FIG. 35, to remove the inhibition on access to the SCT's imposed by the .SHUT macro of FIG. 32.

The FGLA3 subroutine prepares for exiting the .MFLT1 module and returning control to the Dispatcher. The FGLA3 subroutine is entered with the A- and Q-registers holding in proper form the information required to be provided in the A- and Q-registers when control is transferred back to program X. The LDX0 instruction in the 75.MFLT1 substep loads bits 0–17 of the .SSA control word of SSA X into the X0-register. The new contents of the X0-register is the address of the top cell of the IC&I stack.

The series of instructions which follow the LDX0 instruction of the 75.MFLT1 substep have their inhibit interrupt bits off, so that the processor executing this series can be interrupted by the operating system, if necessary.

The LXL0 instruction in the 76.MFLT1 substep then loads bits 18–35 of the word immediately below the top IC&I cell into the X0-register. This word portion is retrieved from the IC&I stack by using an address prepared by adding the address of the top cell of the IC&I stack in C(X0) designated by the X0-tag of the instruction, to the address position of the instruction, which has the value −1. The new contents of the X0-register is the indicator register portion of the IC&I at the time the MME was executed by program X, modified with bit 35 turned on (refer to previous description of the 552.M-FALT substep of FIG. 16).

The indicator register portion in the X0-register now is tested to determine whether the working registers of the processor executing program X were saved when program X was suspended. A binary 1 in the bit 35 position of the indicator register of the IC&I portion, which is bit 17 in the X0-register, denotes that the working registers were so saved. The CANX0 instruction in the 77.MFLT1 substep tests whether bit 17 in the X0-register is on by performing an AND function on each bit of C(X0) and the corresponding bit of the direct operand 000001, designated by the DU-tag of the instruction. If bit 17 is a binary 1, the corresponding AND-bit Zi is a binary 1 and the zero indicator is off at the conclusion of the instruction. The TNZ instruction in the 100.MFLT1 substep, FIG. 36, then transfers control to the FGLA2 substep if the working registers had been stored, as denoted by the zero indicator being on; otherwise the next substep is executed, which is identical to the substep shown in the 105.MFLT1 substep of FIG. 36. In the instant example, the working registers at the time of the MME had been stored, so that the FGLA2 substep is executed (refer to previous description of the 1140.MFALT substep of FIG. 13).

The information held in the A- and Q-registers for use of program X is inserted into the entry on top of the .SREG stack for transmittal to program X. The LDX0 instruction in the FGLA2 substep loads bits 0–17 of the .SSA+1 control word of SSA X into the X0-register. The new contents of the X0-register is the address of the first cell of the top entry of the .SREG stack, which is the entry holding the contents of the working registers at the time of the MME of program X. The STAQ instruction in the 104.MFLT1 substep then inserts the contents of the A- and Q-registers into the respective fifth and sixth cells of the top entry of the .SREG stack, these two cells normally receiving or transmitting the A- and Q-register contents when the working registers are respectively saved or restored. This substep is effected by using an address prepared by adding the address of the first cell of the top entry of the .SREG stack in C(X0), designated by the X0-tag of the instruction, to the address portion of the instruction, which has the value 4.

Having completed the services requested by program X, the .MFLT1 module returns control to the Dispatcher in the Resident Monitor. The XED instruction in the 105.MFLT1 substep forces the execution of the two successive instructions located at the 640 and 641 addresses in the Communication Region. The cell of SSA X immediately following the cell holding the XED instruction holds an exit word, which comprises the identifying number of the .MFLT1 module and a number (exit number) representative of the point of return to program X. The first instruction of the forced pair, the STC1 instruction in the 640COMM substep, effects the storage of the IC&I of the .MFLT1 module at this time on top of the IC&I stack of SSA X by using the .SSTAK+2 control word, which provides access to the top cell of the IC&I stack without pushing down or popping up the stack. Bits 0–17 of the IC&I top entry now hold the address 106 of the exit word. The second instruction of the forced pair, the TRA instruction in the 641COMM substep, transfers control of the Data Processor to the HEX subroutine of the Dispatcher.

RETURN TO SLAVE PROGRAM

The Dispatcher prepares to return control to program X from its point of suspension. The STAQ instruction in the 1404.MDISP substep, FIG. 37, saves the contents of the A- and Q-registers in the respective ninth and tenth cells of the .STEMP block of SSA X. The LDA instruction in the 1405.MDISP substep loads the A-register with the IC&I from the top cell of the IC&I stack of SSA X, using the SSTAK+2 control word (refer to previous description of the 640COMM substep of FIG. 36). $C(A)_U$ now holds the SSA X address of the exit word from the .MFLT1 module. The LDQ instruction in the 1406.MDISP substep loads this exit word into the Q-register. The exit word is retrieved from its cell in SSA X by using an address prepared by adding the address of the exit word in $C(A)_U$, designated by the AU-tag of the instruction, to the address portion of the instruction, which has the value 0. $C(Q)_U$ now holds the value 41, which is the identifying number of the .MFLT1 module and $C(Q)_L$ holds the value 1, which is a representation of the point of return to program X.

Figure 18:
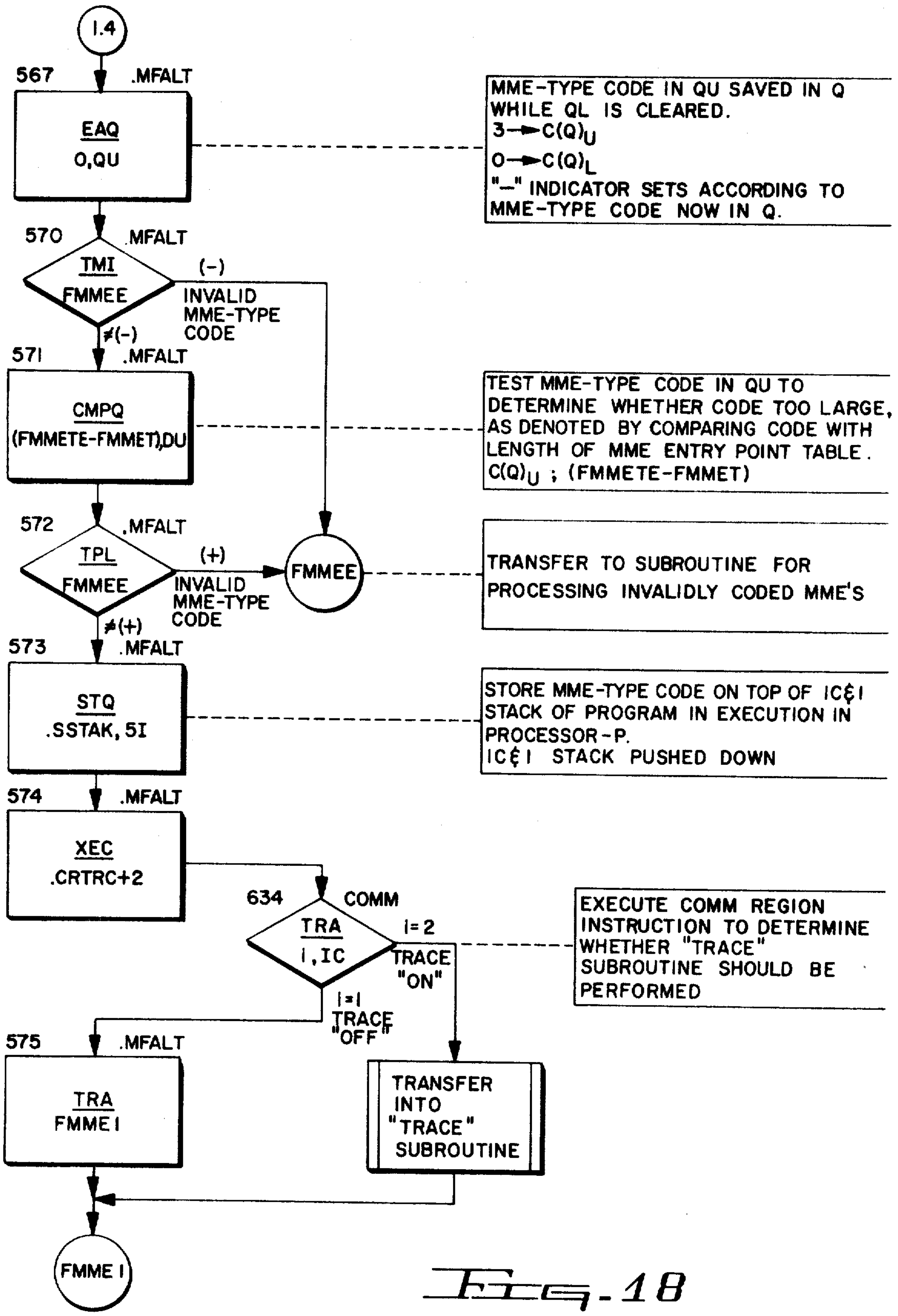
Figure 19:
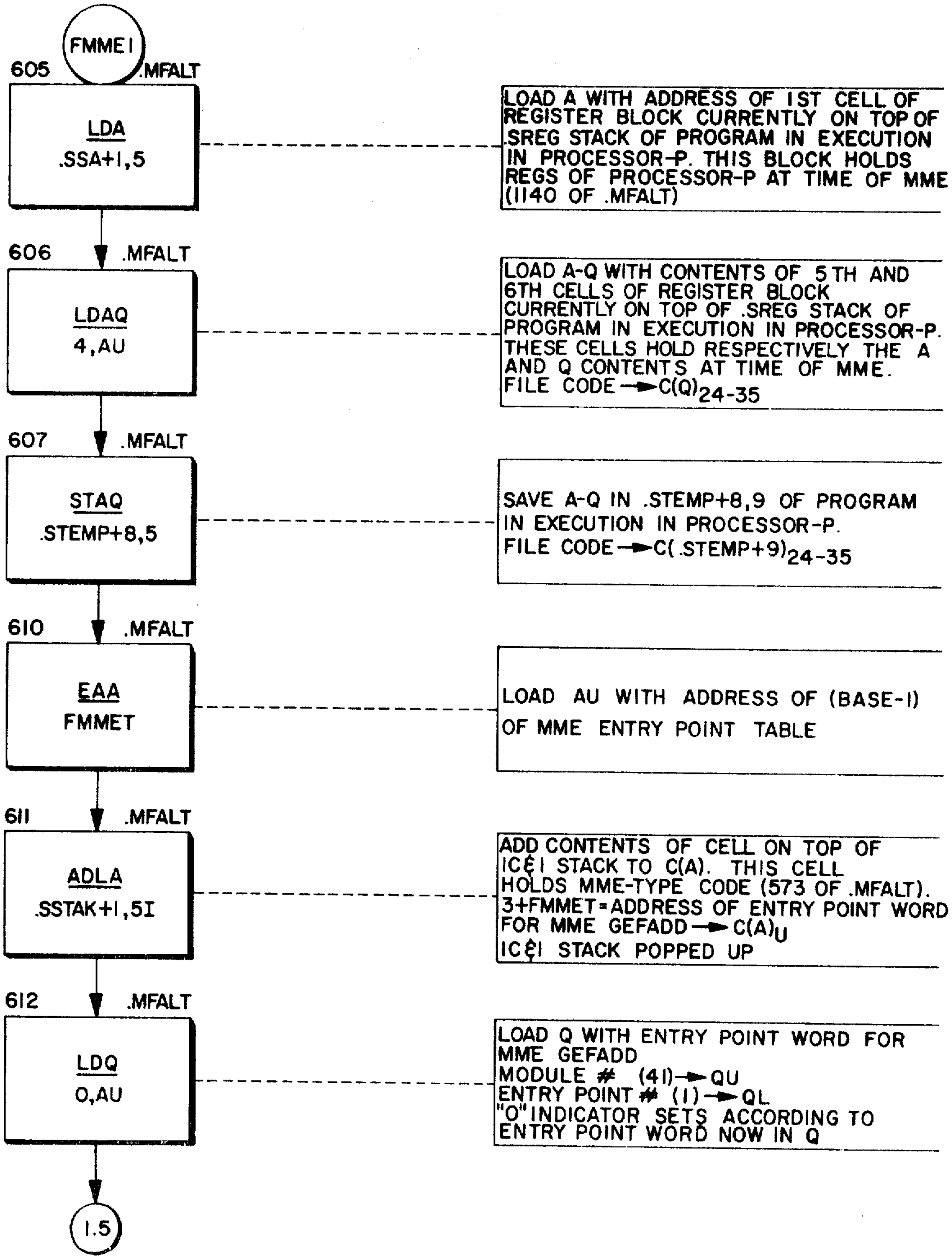
Figure 20:
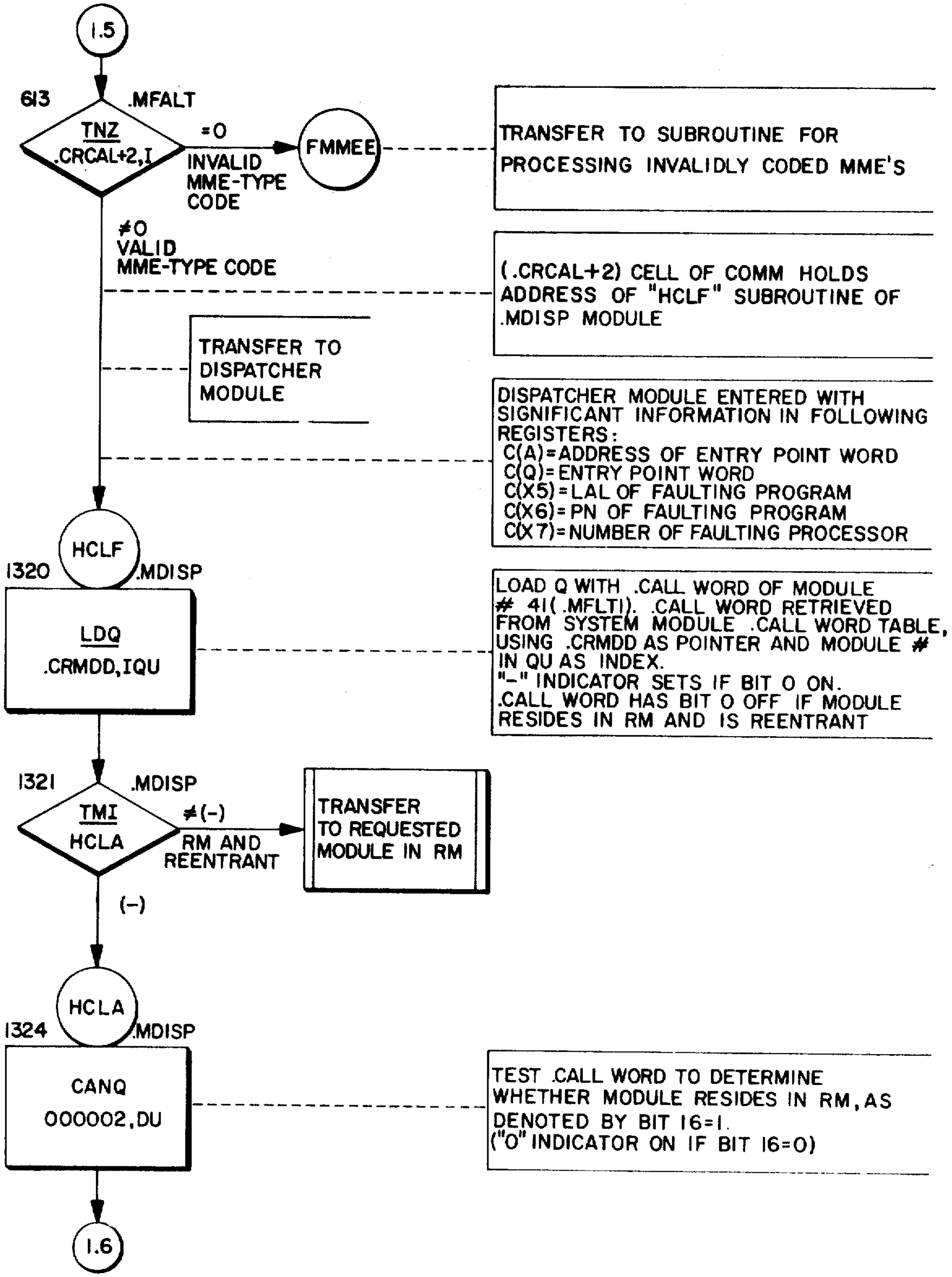
Figure 21:
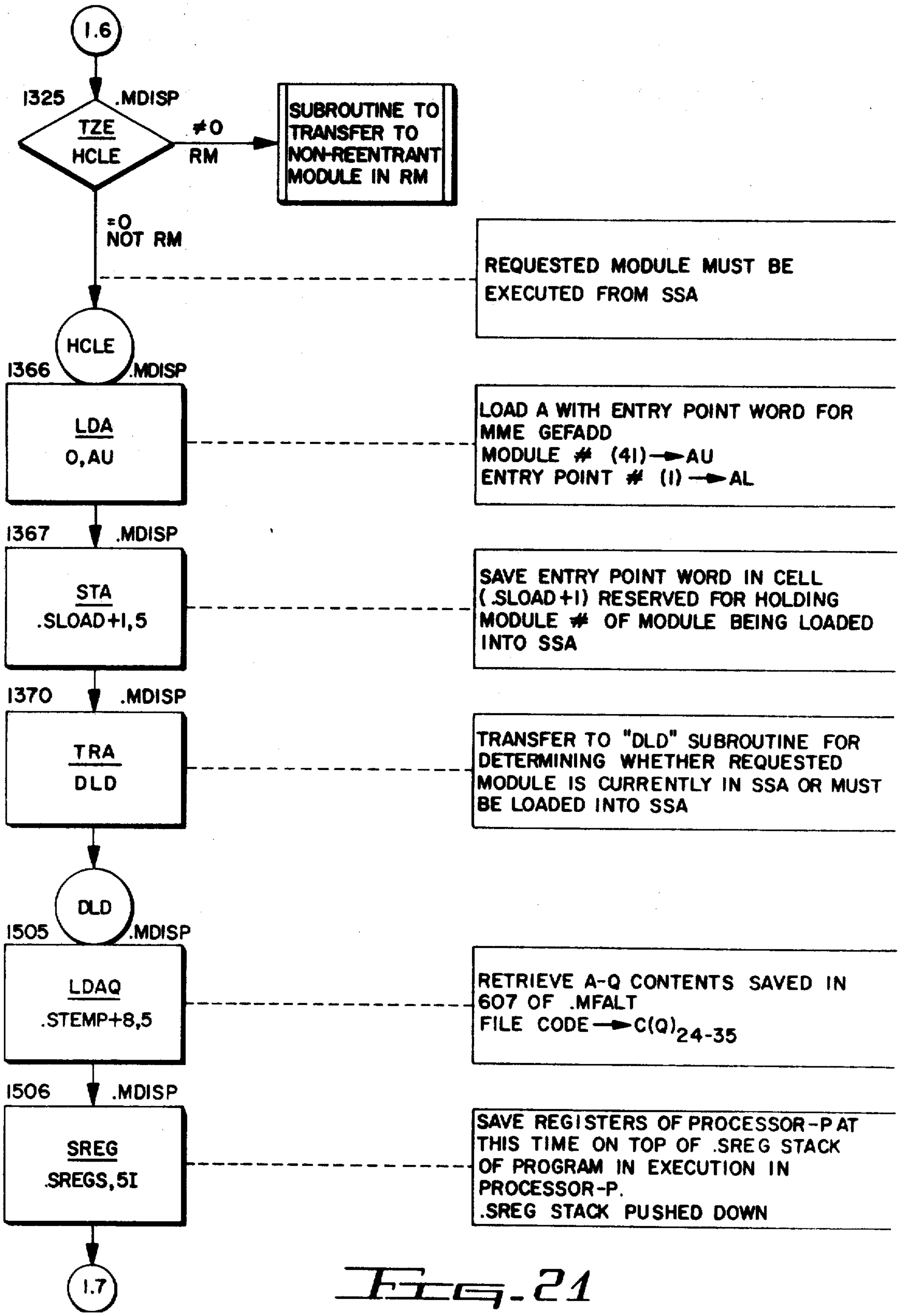
Figure 22:
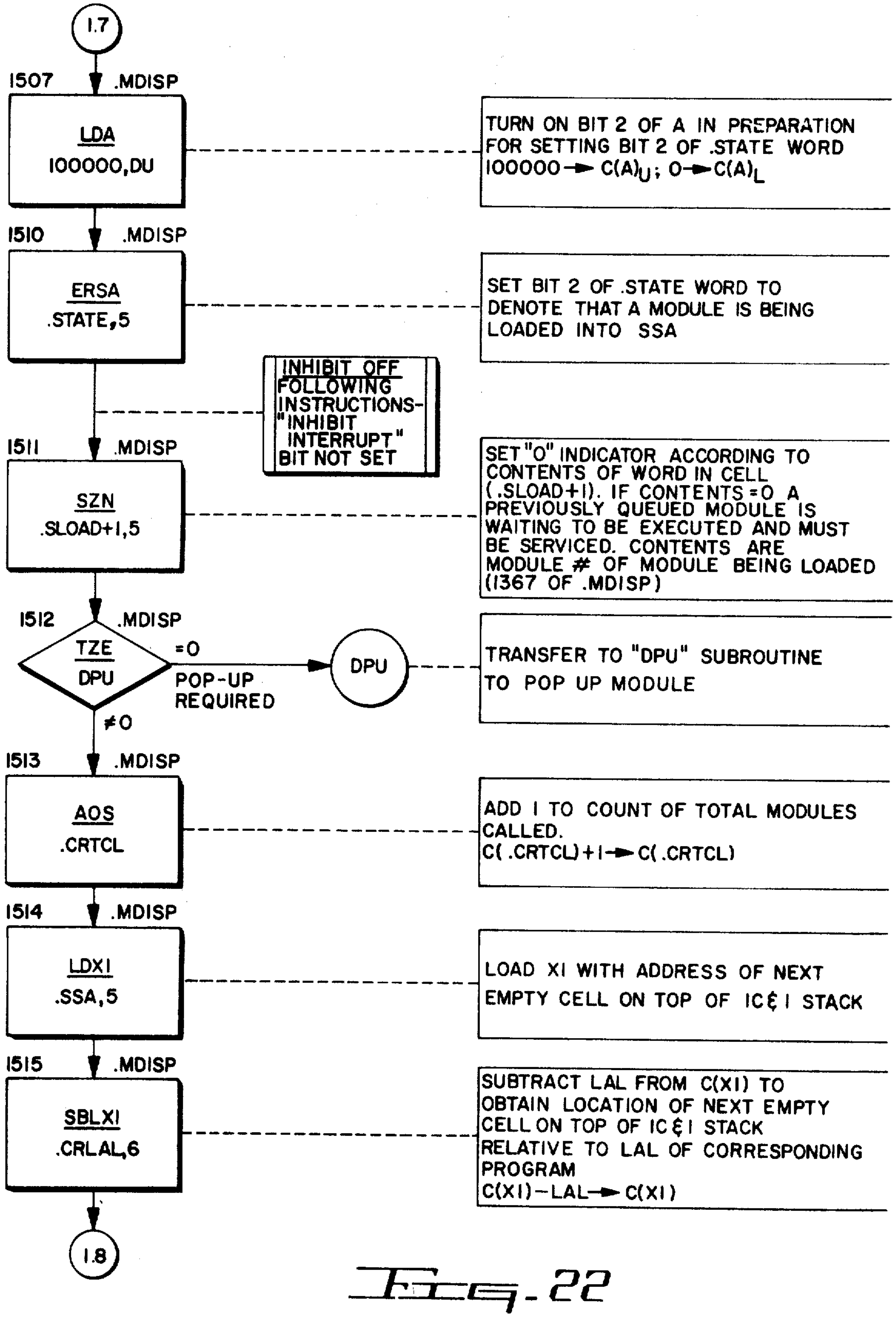

The Fault Processor once again enables the execution of the trace function, previously referred to in the description of FIG. 18. The XED instruction in the 1407.MDISP substep enables the execution of the two successive instructions located at the 632 and 633 addresses in the Communication Region. The particular instruction which has been loaded into the cell at the 632 address determines whether the trace function is to be executed or omitted at this time. If the trace function is to be executed, the first instruction of the forced pair is an STC1 instruction, which saves the IC&I on top of the IC&I stack, pushing down the stack. The following forced TRA instruction in the 633COMM substep then transfers control to the TRACE subroutine of the trace function. After completion of the trace function, control is transferred to the 1410.MDISP substep. However, if the trace function is to be omitted, the cell at the 632 address holds a TRA instruction, which immediately transfers control to the substep next following the 1407.MDISP substep, and a second forced instruction is not executed. The TRA instruction in the 1410.MDISP substep then transfers control of the Data Processor to the HEXG substep, FIG. 38.

The Dispatcher next determines whether the module exited from was executed in the Resident Monitor or in an SSA. The LDA instruction in the HEXG substep loads the .CALL word of the .MFLT1 module from the Module Directory 127 into the A-register (refer to previous description of the HCLF substep of FIG. 20). The negative indicator is turned on if the new $C(A)_0$ is a binary 1. The TMI instruction in the 1417.MDISP substep transfers control to the HEXA substep if the module is not both reentrant and to be executed in the Resident Monitor, as denoted by the negative indicator being on; otherwise, control is transferred to a subroutine for returning to another program following an exit from a reentrant module that was executed in the Resident Monitor. In the instant example, an exit has been made from an SSA module, so that the HEXA substep follows. The .CALL word in the A-register is now tested to determine whether the module exited from was executed in the Resident Monitor. The CANA instruction in the HEXA substep performs an AND function on each bit of $C(A)_U$ and the corresponding bit of the direct operand 000002, designated by the DU-tag of the instruction. If bit 16 of $C(A)_U$ is a binary 1 the corresponding AND-bit Zi is a binary 1 and the zero indicator is off at the conclusion of the instruction, otherwise the zero indicator is on. The TNZ instruction in the 1427.MDISP substep transfers control to the HEXB substep if the module exited from was executed in the Resident Monitor, as denoted by the zero indicator being off; otherwise, the next substep follows. In the instant example, the next substep is executed.

The services of the .MFLT1 module no longer being required, the module will now be designated as being not in execution. The A-register is prepared with a value for turning off bit 34 of the .SNTRY word of SSA X to denote that the module in SSA X is not in execution. The LCA instruction in the 1430.MDISP substep loads AL with the complement of the direct operand 3, designated by the DL-tag of the instruction, and AU with the complement of zero, whereby AL receives the value 777775 and AU the value 777777. Therefore, the A-register now holds a number comprising all binary 1's except in the bit 34 position, which holds a binary 0. The ANSA instruction in the 1431.MDISP substep turns off bit 34 of the .SNTRY word. The ANSA instruction performs an AND function on each bit of the .SNTRY word of SSA X and the corresponding bit of the number in the A-register. All bits of the .SNTRY word which are on remain on, except for bit 34, which is turned off as a consequence of the binary 0 in the bit 34 position of the number in the A-register.

A determination is then made as to whether the module exited from is reentrant. The A-register is prepared with a number for determining the value of bit 1 of the .CALL word of the .MFLT1 module. The LDA instruction in the HEXB substep, FIG. 39, loads the direct operand 200000 into $C(A)_U$, as designated by the DU-tag of the instruction, and 0 is loaded into $C(A)_L$. The A-register now holds a number comprising all binary 0's except in the bit 1 position, which holds a binary 1. The CANA instruction in the 1433.MDISP substep performs an AND function on each bit of C(A) and the corresponding bit of the .CALL word of the .MFLT1 module (refer to previous description of the HCLF substep of FIG. 20). If bit 1 of the .CALL word is a binary 1 the corresponding AND-bit Zi is a binary 1 and the zero indicator is off at the conclusion of the instruction, otherwise the zero indicator is on. The TZE instruction in the 1434.MDISP substep transfers control to the HEXC substep if the module exited from is reentrant, as denoted by the zero indicator being on; otherwise, control is transferred to a subroutine to prevent reuse of the module exited from. In the instant example, the .MFLT1 module is reentrant so that the HEXC substep is executed.

The address for returning control to program X is developed next. The EAA instruction in the HEXC substep transfers the exit number from $C(Q)_L$, where it was stored in the 1406.MDISP substep of FIG. 37, to $C(A)_U$. This transfer is effected by adding the exit number in $C(Q)_L$, designated by the QL-tag of the instruction, to the direct operand 0, loading $C(A)_U$ with the sum and loading 0 into $C(A)_L$. The ADA instruction in the 1421.MDISP substep adds the top entry in the IC&I stack of SSA X to C(A), thereby replacing C(A) by this top IC&I entry, but with the address portion of the entry modified by the exit number. The top entry of the IC&I stack is obtained by utilizing the .SSTAK+1 control word in SSA X, which provides for retrieving the top entry from the stack and popping up the stack. In the particular IC&I entry obtained, bits 0–17 represent the address, L, of the MME instruction, and bits 18–35 represent the Indicator Register contents at the time of execution of the MME, but modified with bit 35 turned on (refer to previous description of the 552.MFALT substep of FIG. 16). Therefore, after execution of the ADA instruction, $C(A)_U$ holds the address L+1 and $C(A)_L$ holds the modified Indicator Register contents. The STA instruction in the 1422.MDISP substep then saves the return IC&I in C(A) on top of the IC&I stack of SSA X by utilizing the .SSTAK control word in SSA X, which provides for storing the A-register contents on top of the IC&I stack and pushing down the stack.

The Dispatcher next determines whether a module must be popped up from an SSA module stack for transfer of control thereto; or, if a slave program is being returned to execution, whether the working registers were stored when the slave program was suspended. The indicator register portion in the A-register is tested to determine whether an SSA module must be popped up or whether the working registers of a slave program being returned to execution were stored. A binary 1 in the bit 34 position of the indicator register portion denotes that the SSA module stack of program X has been pushed down, whereas a binary 1 in the bit 35 position denotes that the working registers of program X have been stored. The ANA instruction in the 1423.MDISP substep, FIG. 40, turns off all bits in $C(A)_L$ except those of bits 34 and 35 which are on, by performing an AND function on each bit of $C(A)_L$ and the corresponding bit of the direct operand 000003, designated by the DL-tag of the instruction. If either bit 34 or 35 of the indicator register portion in C(A) was a binary 1, the corresponding AND-bit Zi is a binary 1 and the zero indicator is off at the conclusion of the instruction. The TNZ instruction in the 1424.MDISP substep transfers control to the HEXD substep if either an SSA module must be popped up or the working registers of a slave program being returned to execution have been stored, as denoted by the zero indicator being off; otherwise control is transferred to a subroutine to employ the next IC&I in the IC&I stack to place a program in execution. In the instant example, the HEXD substep follows.

The remaining contents of $C(A)_L$ are then tested to determine whether an SSA module must be popped up from the SSA module stack of program X. If bit 34 of $C(A)_L$ is a binary 1, the SSA module which was recently exited from had been entered from a suspended SSA module, now the top entry in the SSA module stack of program X, in which instance control must be returned to the suspended SSA module. This test is shown at $S_3$ in block 407 of FIG. 8*b*, $S_{31}$ in block 432 of FIG. 9*c*, and $S_{33}$ in block 437 of FIG. 9*d*. The CANA instruction in the HEXD substep performs an AND function on each bit of $C(A)_L$ and the corresponding bit of the direct operand 000002, designated by the DL-tag of the instruction. If bit 34 of AL is on, the corresponding AND-bit Zi is a binary 1 and the zero indicator is off at the conclusion of the instruction. The TZE instruction in the 1442.MDISP substep transfers control to the HEXE substep if an SSA module is not required to be popped up, as denoted by the zero indicator being on; otherwise, control is transferred to a subroutine for preparing to pop up a suspended module from an SSA module stack and for returning the suspended module to execution. In the instant example, the HEXE substep follows. The remaining contents of $C(A)_L$ are again tested to determine whether the working register contents of the program being returned to execution have been stored, as denoted by a binary 1 in the bit 35 position. The CANA instruction in the HEXE substep performs an AND function on each bit of $C(A)_L$ and the corresponding bit of the direct operand 000001, designated by the DL-tag of the instruction. If bit 35 of C(A) is on, the corresponding AND-bit Zi is a binary 1, and the zero indicator is off at the conclusion of the instruction. The TZE instruction in the 1446.MDISP substep, FIG. 41, transfers control to the HEXF substep for processing the return to execution of a program for which the working registers were not stored, as denoted by the zero indicator being on; otherwise the next substep is executed. In the instant example, the Fault Processor stored the working register contents of program X following execution of the MME instruction (refer to previous description of the 1140.MFALT substep of FIG. 13 and the 551.MFALT substep of FIG. 16), so that the next substep is executed.

A determination is now made as to whether urgent requirements on the operating system preclude returning program X to execution. If any one of bits 4, 6, 8, or 10 of the .STATE word of SSA X is on, there exists a corresponding urgent request that the operating system perform at once an operation related to program X, and, therefore, the Dispatcher cannot place program X in execution at this time (refer to previous description herein of the contents of the .STATE word). In preparation for the test, the LDQ instruction in the 1447.MDISP substep loads the Q-register with the .STATE word of SSA X. The CANQ instruction in the 1450.MDISP substep then performs an AND function on each bit of the upper half of the .STATE word and the corresponding bit of the direct operand 025200, designated by the DU-tag of the instruction. If any one of bits 4, 6, 8, or 10 in the A-register is a binary 1, the corresponding AND-bit Zi is a binary 1 and the zero indicator is off at the conclusion of the instruction. The TZE instruction in the 1451.MDISP substep transfers control to the DSP20 substep if there is no present urgent requirement on the operating system relating to program X, as denoted by the zero indicator being on; otherwise the next substep is executed for transferring control to a subroutine of the Dispatcher to place in execution the appropriate operating system program to satisfy the requirement.

The top entry in the IC&I stack of program X, the return IC&I entered into the stack in the 1422.MDISP substep, is now obtained. The LDA instruction in the DSP20 substep loads the A-register with the top entry of the IC&I stack of program X utilizing the .SSTAK+1 control word in SSA X, which provides for retrieving the top entry of the IC&I stack of SSA X and popping up the stack. Bits 18–35 of the A-register now hold the indicator register contents at the time the MME instruction of program X was executed.

Figure 15:
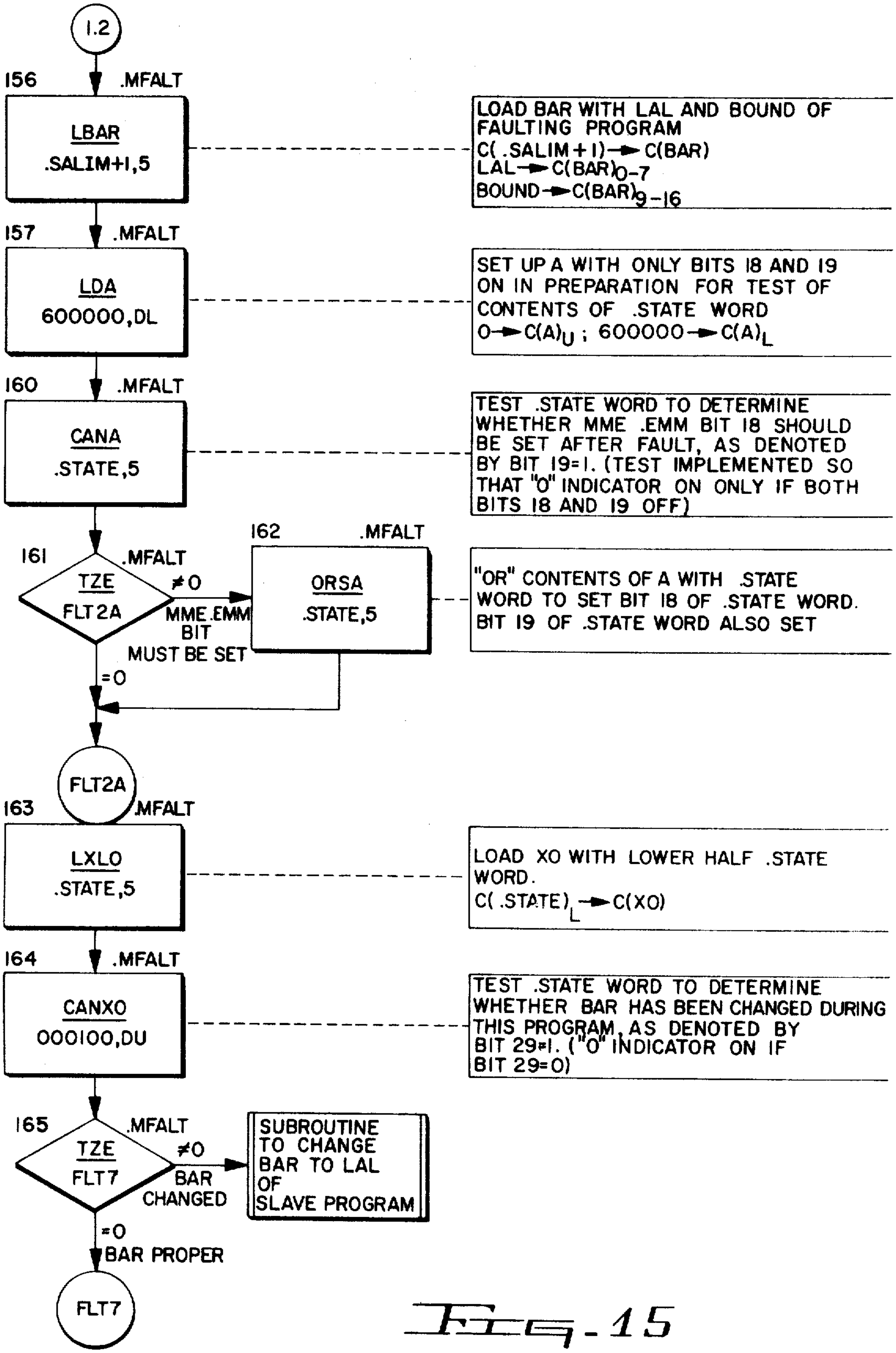
Figure 42:
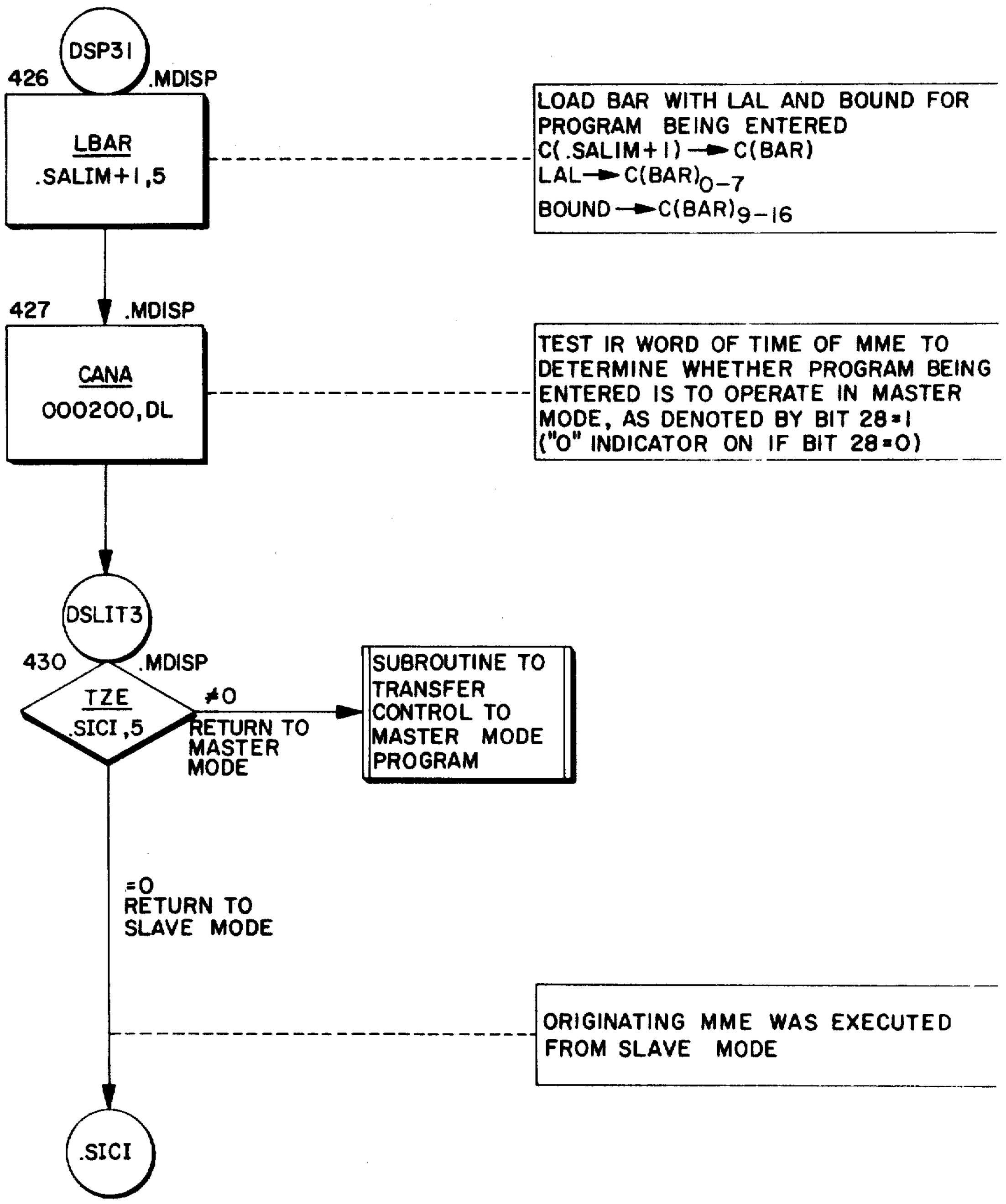
Figure 43:
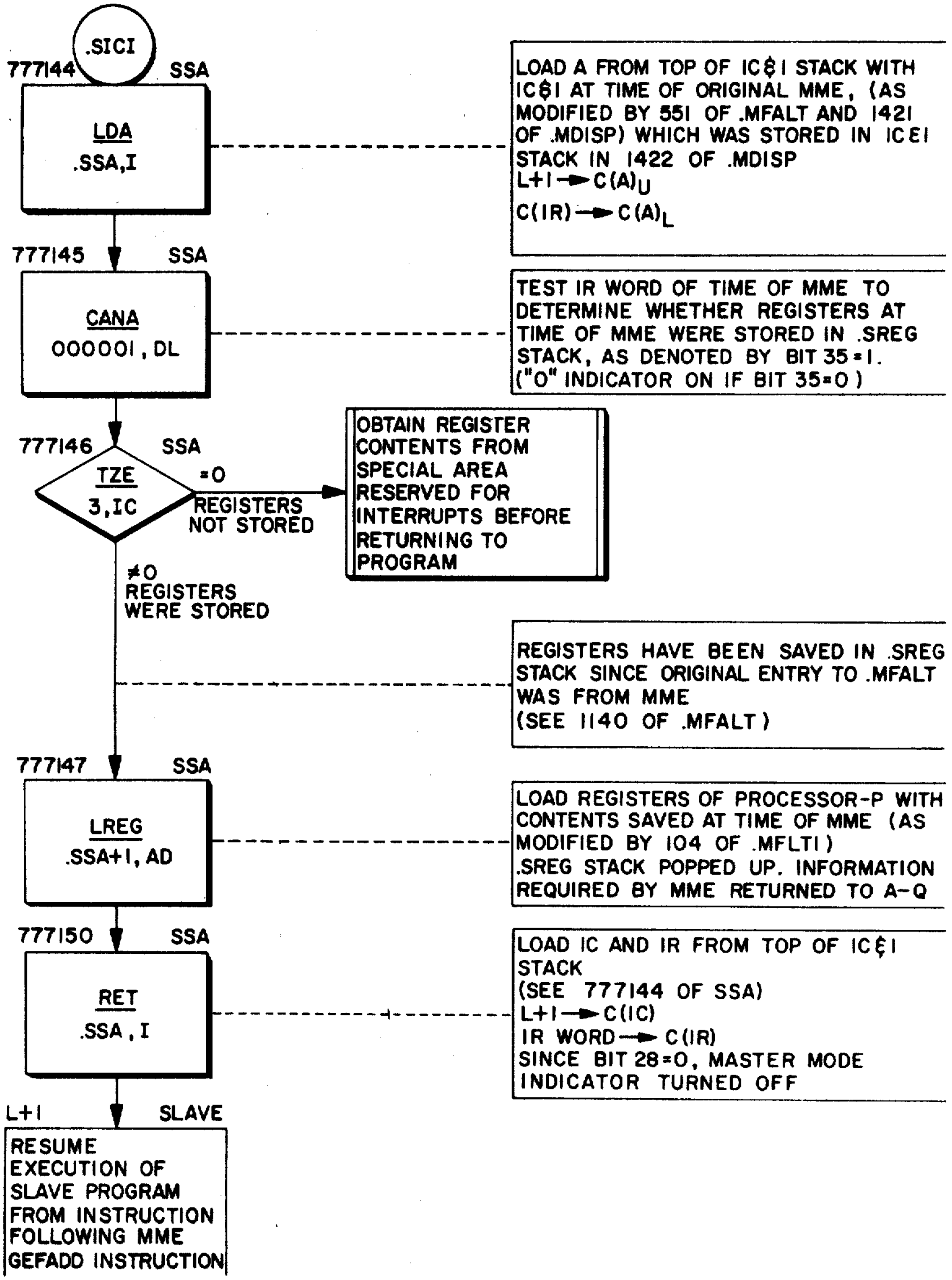

The LBAR instruction in the 426.MDISP substep, FIG. 42, loads the base Address Register of the processor executing the dispatcher at this time with the base cell address and bounds check of program X from the .SALIM+1 cell of SSA X (refer to previous description of the 156.MFALT substep of FIG. 15).

A determination next is made as to whether the program being returned to execution is to be executed in the master or slave mode. A binary 1 in the bit 28 position of the indicator register portion of the program's IC&I denotes that the program is to be executed in the master mode. The CANA instruction in the 427.MDISP substep performs an AND function on each bit of the indicator register portion in $C(A)_L$ and the corresponding bit of the direct operand 000200, designated by the DL-tag of the instruction. If bit 28 of the A-register is a binary 1, the corresponding AND-bit Zi is a binary 1 and the zero indicator is off at the conclusion of the instruction. The TZE instruction in the 430.MDISP substep then transfers control to a .SICI instruction set if the program being returned to execution is to be executed in the slave mode, as denoted by the zero indicator being on; otherwise the next substep is executed for transferring control to a subroutine for placing in execution a master mode program. In the instant example, program X is executed in the slave mode, so that the TZE instruction branches to the .SICI instruction set of SSA X, which provides for transferring final control for execution from the Dispatcher to program X.

Before returning control to program X, the working registers of the Processor executing the .SICI set must have entered therein the contents of the working registers at the time program X was suspended. The first instruction of the .SICI set, the LDA instruction in the 777144SSA substep, FIG. 43, loads the A-register with the IC&I developed in the 1421.MDISP substep of FIG. 39 for returning control to program X. The LDA instruction retrieves this IC&I utilizing the .SSA control word, which provides the address of the cell above the present top of the IC&I stack, such cell still holding the IC&I retrieved when the stack was popped up in the DSP20 substep of FIG. 41. The indicator register portion of the IC&I in the A-register is again tested to determine whether the working register contents of program X had been stored at the time of the program's suspension, as denoted by a binary 1 in the bit 35 position. The CANA instruction in the 777145SSA substep performs an AND function of each bit of $C(A)_L$ and the corresponding bit of the direct operand 000001, designated by the DL-tag of the instruction. If bit 35 of C(A) is on, the corresponding AND-bit Zi is a binary 1 and the zero indicator is off at the conclusion of the instruction. The TZE instruction in the 777146SSA substep transfers control to the third-following substep to initiate a subroutine for returning an interrupted program to execution when the working register contents were not stored in the .SREG stack at the time of interruption, as denoted by the zero indicator being on; otherwise the next substep is executed. As described previously, in the instant example the working register contents of program X were stored in the .SREG stack at the time of suspension so that the next substep is executed.

The working register contents of the Processor executing the .SICI instruction set are now replaced with the contents of the working registers at the time program X executed the MME instruction. These working register contents were saved in the .SREG stack of SSA X by the 1140.MFALT substep of FIG. 13. The LREG instruction in the 777147SSA substep replaces the contents of the working registers of the Processor executing the .SICI set with the top entry of the .SREG stack of SSA X and the stack is popped up. The top entry of the .SREG stack is obtained utilizing the .SSA+1 stack control word in SSA X. The information requested by program X in its execution of the MME instruction is now in the A- and Q-registers.

With its working registers in the condition of the working registers at the time of the MME instruction of program X, the Processor executing the .SICI set now returns program X to execution. The RET instruction in the 777150SSA substep loads the Instruction Counter from bits 0–17 and the Indicator Register from bits 18–35 of the return IC&I in the IC&I stack (refer to previous description of the 777144SSA substep). Thus, the Instruction Counter receives the return address L+1, which is the address of the instruction next following the MME instruction, and the Indicator Register has been substantially restored to its condition at the time the MME instruction was executed.

Program X now resumes execution from the instruction at the L+1 address, utilizing the I/O apparatus identity information returned in the A- and Q-registers.

While principles of the invention have now been made clear in an illustrated embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are, therefore, intended to cover and embrace any such modifications, within the limits only of the true spirit and scope of the invention.

We claim:

1. In a multiprogrammed system including a storage member adapted to store slave program parts and privileged slave program parts, the data words comprising each of said program parts member in a block of contiguous cells and including a plurality of instructions, each of said instructions including an order portion denoting the type of operation the instruction is to control and an address portion representing the address of a cell of said storage member whose contents are to be affected by said operation and a data processor coupled to said storage member for executing program parts by retrieving the instructions thereof in succession from said storage member and by performing the operation denoted by the order portion of each of said instructions on the contents of the cell represented by the address portion of said instruction, a process comprising said processor during execution of each one of said slave program parts interpreting all of said address portions thereof as representing the location of corresponding cells relative to a predetermined reference cell of the block holding said one slave program part, and said processor during execution of each one of said privileged slave program parts interpreting said address portions thereof (a) as representing the location of corresponding cells relative to a predetermined reference cell of the block holding said one privileged slave program part if a first instruction is present in said privileged slave program part or (b) as the actual addresses of the corresponding cells if a second instruction is present in said privileged slave program part.

2. The process of claim 1, wherein at least one of said slave program parts and at least one of said privileged slave program parts concurrently occupy said storage member in respective blocks of contiguous cells of said member.

3. In a multiprogrammed system including a storage member adapted to store slave program parts and privileged slave program parts, the data words comprising each of said program parts including a plurality of instructions, each of said instructions including an order portion denoting the type of operation the instruction is to control and an address portion representing the address of a cell of said storage member whose contents are to be affected by said operation and a data processor coupled to said storage member for executing program parts by retrieving the instructions thereof in succession from said storage member and by performing the operation denoted by the order portion of each of said instructions on the contents of the cell represented by the address portion of said instruction, a process comprising said processor during execution of each one of said slave program parts interpreting all of said address portions thereof as representing the location of corresponding cells relative to a predetermined reference cell of the block holding said one slave program part, and said processor during execution of each one of said privileged slave program parts normally interpreting said address portions thereof as representing the location of corresponding cells relative to a predetermined reference cell of the block holding said one privileged slave program part and interpreting said address portions as the actual addresses of the corresponding cells in response to predetermined instructions of said privileged slave program part.

4. In a multiprogrammed system including a storage member adapted to store slave program parts and privileged slave program parts, the data words comprising each of said program parts including a plurality of instructions, each of said instructions including an order portion denoting the type of operation the instruction is to control and an address portion representing the address of a cell of said storage member whose contents are to be affected by said operation and a data processor coupled to said storage member for executing program parts by retrieving the instructions thereof in succession from said storage member and by performing the operation denoted by the order portion of each of said instructions on the contents of the cell represented by the address portion of said instruction, a process comprising the steps of said processor generating a first control signal in response to predetermined instructions of certain of said program parts, storing a control indicium in said storage member for each of said program parts permitted to employ said predetermined instructions, said processor generating a second control signal in response to said first control signal and a control indicium for the corresponding program part, and said processor during execution of each one of said program parts normally interpreting said address portions thereof as representing the location of corresponding cells relative to a predetermined reference cell of the block holding said one program part and interpreting said address portions as the actual address of the corresponding cells in response to said second control signal.

5. The process of claim 4, wherein said control indicia are stored in said storage member only for said privileged slave program parts.

6. In a multiprogrammed system including a storage member adapted to store slave program parts and privileged slave program parts, the data words comprising each of said program parts including a plurality of instructions, each of said instructions including an order portion denoting the type of operation the instruction is to control and an address portion representing the address of a cell of said storage member whose contents are to be affected by said operation and a data processor coupled to said storage member for executing program parts by retrieving the instruction thereof in succession from said storage member and by performing the operation denoted by the order portion of each of said instructions on the contents of the cell represented by the address portion of said instruction, a process comprising generating a base address for the program part being executed by said processor, said base address being the address of a cell of the block holding said program part being executed, said processor during execution of each one of said slave program parts adding said address portions thereof to the corresponding base address to provide the location of corresponding cells, and selectively controlling said processor during execution of each one of said privileged slave program parts to either (a) add said address portions thereof to the corresponding base address to provide the location of corresponding cells or (b) utilize said address portions as the actual addresses of the corresponding cells.

7. In a multiprogrammed system including a storage member adapted to store slave program parts, privileged slave program parts, and management control program parts, the data words comprising each of said program parts including a plurality of instructions, each of said instructions including an order portion denoting the type of operation the instruction is to control and an address portion representing the address of a cell of said storage member whose contents are to be affected by said operation and a data processor coupled to said storage member for executing program parts by retrieving the instructions thereof in succession from said storage member and by performing the operation denoted by the order portion of each of said instructions on the contents of the cell represented by the address portion of said instruction, a process comprising said processor during execution of each one of said slave program parts interpreting all of said address portions thereof as representing the location of corresponding cells relative to a predetermined reference cell of the block holding said one slave program part, said processor during execution of each one of said privileged slave program parts selectively interpreting said address portions thereof either (a) as representing the location of corresponding cells relative to a predetermined reference cell of the block holding said one privileged slave program part or (b) as the actual addresses of the corresponding cells, and said processor during execution of each one of said management control program parts interpreting all of said address portions thereof as the actual addresses of the corresponding cells.

8. The process of claim 7, wherein at least one of said management control program parts and at least one of said slave or privileged slave program parts concurrently occupy said storage member in respective blocks of contiguous cells of said member.

9. In a multiprogrammed system including a storage member adapted to store a plurality of program parts, the data words comprising each of said program parts including a plurality of instructions, each of said instructions including an order portion denoting the type of operation the instruction is to control and an address portion representing the address of a cell of said storage member whose contents are to be affected by said operation and a data processor coupled to said storage member for executing program parts by retrieving the instructions thereof in succession from said storage member and by performing the operation denoted by the order portion of each of said instructions on the contents of the cell represented by the address portion of said instruction, a process comprising storing a plurality of operating system program parts in a predetermined first portion of said storage member, storing at least one of a user program part or an operating system program part in any available block of contiguous cells of the remaining portion of said storage member, said processor during execution of a user program part interpreting all of said address portions thereof as representing the location of corresponding cells relative to a predetermined reference cell of the block holding said user program part, said processor during execution of an operating system program part stored in said remaining portion of said storage member selectively interpreting said address portions thereof either (a) as representing the location of corresponding cells relative to a predetermined reference cell of the block holding said operating system program part or (b) as the actual addresses of the corresponding cells, and said processor during execution of an operating system program part stored in said first portion of said storage member interpreting all of said address portions thereof as the actual addresses of the corresponding cells.

10. In a multiprogrammed system including a storage member adapted to store slave program parts and privileged slave program parts, the data words comprising each of said program parts including a plurality of instructions, each of said instructions including an order portion denoting the type of operation the instruction is to control and an address portion representing the address of a cell of said storage member whose contents are to be affected by said operation and a data processor coupled to said storage member for executing program parts by retrieving the instructions thereof in succession from said storage member and by performing the operation denoted by the order portion of each of said instructions on the contents of the cell represented by the address portion of said instruction, said processor comprising a base address register and an adder, said base address register holding the actual address of a reference cell of the block holding the program part being executed by said processor, a process comprising said processor during execution of each one of said slave program parts controlling said adder to add the address portion of each of said instructions to the contents of said base address register to provide the location of the corresponding cell, and said processor during execution of each one of said privileged slave program parts selectively operating either (a) to control said adder to add the address portion of each of said instructions to the contents of said base address register to provide the location of the corresponding cell part or (b) to utilize said address portions as the actual addresses of the corresponding cells.

* * * * *